(12) United States Patent
Nogami et al.

(10) Patent No.: US 9,094,846 B2
(45) Date of Patent: Jul. 28, 2015

(54) TERMINAL DEVICE, BASE STATION DEVICE, COMMUNICATION SYSTEM, AND COMMUNICATION METHOD

(75) Inventors: Toshizo Nogami, Osaka (JP); Kimihiko Imamura, Osaka (JP); Kazuyuki Shimezawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 399 days.

(21) Appl. No.: 13/704,128

(22) PCT Filed: Jun. 9, 2011

(86) PCT No.: PCT/JP2011/063254
§ 371 (c)(1),
(2), (4) Date: Dec. 13, 2012

(87) PCT Pub. No.: WO2011/158730
PCT Pub. Date: Dec. 22, 2011

(65) Prior Publication Data
US 2013/0083735 A1 Apr. 4, 2013

(30) Foreign Application Priority Data

Jun. 14, 2010 (JP) ................................. 2010-135055

(51) Int. Cl.
*H04W 24/02* (2009.01)
*H04B 7/06* (2006.01)
(Continued)

(52) U.S. Cl.
CPC ............. *H04W 24/02* (2013.01); *H04B 7/0639* (2013.01); *H04B 7/0647* (2013.01); *H04L 1/0027* (2013.01); *H04B 7/063* (2013.01); *H04B 7/0632* (2013.01); *H04J 11/0033* (2013.01)

(58) Field of Classification Search
CPC ... H04W 72/085; H04W 24/10; H04W 24/02; H04L 1/0026; H04L 1/003; H04L 5/0057; H04L 5/0053; H04B 7/0417; H04B 7/063; H04B 7/0639; H04J 11/0033

USPC ................... 370/328, 329, 241; 375/219, 296
See application file for complete search history.

(56) References Cited

U.S. PATENT DOCUMENTS

2006/0120403 A1* 6/2006 Murata et al. ................. 370/468
2009/0207784 A1* 8/2009 Lee et al. ....................... 370/328
(Continued)

FOREIGN PATENT DOCUMENTS

DE WO 2009/135574 * 11/2009 ............... H04L 1/00
JP 2009-089188 A 4/2009

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213, V8.8.0, Sep. 2009.*

(Continued)

*Primary Examiner* — Andrew Lai
*Assistant Examiner* — Mahmudul Hasan
(74) *Attorney, Agent, or Firm* — Birch, Stewart, Kolasch & Birch, LLP

(57) ABSTRACT

A terminal communicating with a base station includes: a switching partswitching between a first feedback mode in which one precoder information specifying a preferred precoder and a reception quality indicator specifying a preferred transmission rate are reported periodically and a second feedback mode in which first partial precoder information among first and second partial precoder information specifying the preferred precoder and a set of the second partial precoder information and the reception quality indicator are reported periodically. A report part uses, in the second feedback mode, a periodic resource for reporting the precoder information and reception quality indicator in the first feedback mode, reporting one of the first partial precoder information and the set of the second partial precoder information and the reception quality indicator alternately and in a period two times a report period of the precoder information and reception quality indicator in the first feedback mode.

11 Claims, 42 Drawing Sheets

(51) Int. Cl.
*H04L 1/00* (2006.01)
*H04J 11/00* (2006.01)

(56) References Cited

U.S. PATENT DOCUMENTS

| | | | | |
|---|---|---|---|---|
| 2010/0296463 A1* | 11/2010 | Taoka et al. | ............... | 370/329 |
| 2011/0237270 A1* | 9/2011 | Noh et al. | ............... | 455/450 |
| 2011/0268067 A1* | 11/2011 | Seo et al. | ............... | 370/329 |
| 2012/0020288 A1* | 1/2012 | Liu et al. | ............... | 370/328 |
| 2012/0093089 A1* | 4/2012 | Park et al. | ............... | 370/328 |
| 2012/0201282 A1* | 8/2012 | Li et al. | ............... | 375/219 |

OTHER PUBLICATIONS

NTT DOCOMO, Views on CSI Reporting Scheme Based on Double Codebook Structure for LTE-Advanced, 3GPP TSG RAN WG1 Meeting #61, R1-103259, May 10-14, 2010, Montreal, Canada.*

Samsung, Control signaling to support feedback enhancements in Rel. 10, R1-103379, 63GPP TSG RAN WG1 Meeting #61, May 10-14, 2010, Montreal, Canada.*

Sharp, "CQI, PMI, and rank report feedback interval", R1-080764, 3GPP TSG RAN WG1 Meeting #52, Feb. 11-15, 2008, Sorrento, Italy.*

Nokia Siemens Networks, Nokia, "CSI Reporting for CarrierAggregation", 3GPP TSG RAN WG1 Meeting #60bis, Beijing, China, Apr. 6, 2010, R1-101894, pp. 1-2.*

Panasonic, "Periodic CQI Reporting for Carrier Aggregation", 3GPP TSG-RAN WG1 Meeting 60bis, Apr. 6, 2010, Beijing, China, R1-102028, pp. 1-3.*

Nokia Siemens Networks, Nokia, "CSI Reporting for Carrier Aggregation", 3GPP TSG RAN WG1 Meeting #60bis, Beijing, China, Apr. 6, 2010, R1-101894, pp. 1-2.

"3rd Generation Partnership Project; Technical Specification Group Radio Access Network; Evolved Universal Terrestrial Radio Access (E-UTRA); Physical layer procedures (Release 8)", 3GPP T5 36.213, V8.8.0 , Sep. 2009.

NTT DOCOMO, Views on CSI Reporting Scheme Based on Double Codebook Structure for LTE-Advanced, 3GPP TSG RAN WG1 Meeting #61, May 10-14, 2010, Montreal, Canada.

Samsung, Control signaling to support feedback enhancements in Rel. 10, R1-103379, 63GPP TSG RAN WG1Meeting #61, May 10-14, 2010, Montreal, Canada.

* cited by examiner

FIG.8

| $I_{CQI}$ | $N_P$ | $N_{OFFSET,CQI}$ |
|---|---|---|
| $0 \leq I_{CQI} \leq 1$ | 2 | $I_{CQI}$ |
| $2 \leq I_{CQI} \leq 6$ | 5 | $I_{CQI} - 2$ |
| $7 \leq I_{CQI} \leq 16$ | 10 | $I_{CQI} - 7$ |
| $17 \leq I_{CQI} \leq 36$ | 20 | $I_{CQI} - 17$ |
| $37 \leq I_{CQI} \leq 76$ | 40 | $I_{CQI} - 37$ |
| $77 \leq I_{CQI} \leq 156$ | 80 | $I_{CQI} - 77$ |
| $157 \leq I_{CQI} \leq 316$ | 160 | $I_{CQI} - 157$ |
| $I_{CQI} = 317$ | | — |
| $318 \leq I_{CQI} \leq 349$ | 32 | $I_{CQI} - 318$ |
| $350 \leq I_{CQI} \leq 413$ | 64 | $I_{CQI} - 350$ |
| $414 \leq I_{CQI} \leq 541$ | 128 | $I_{CQI} - 414$ |
| $542 \leq I_{CQI} \leq 1023$ | | — |

FIG.9

| $I_{RI}$ | $M_{RI}$ | $N_{OFFSET,RI}$ |
|---|---|---|
| $0 \leq I_{RI} \leq 160$ | 1 | $-I_{RI}$ |
| $161 \leq I_{RI} \leq 321$ | 2 | $-(I_{RI} - 161)$ |
| $322 \leq I_{RI} \leq 482$ | 4 | $-(I_{RI} - 322)$ |
| $483 \leq I_{RI} \leq 643$ | 8 | $-(I_{RI} - 483)$ |
| $644 \leq I_{RI} \leq 804$ | 16 | $-(I_{RI} - 644)$ |
| $805 \leq I_{RI} \leq 965$ | 32 | $-(I_{RI} - 805)$ |
| $966 \leq I_{RI} \leq 1023$ | — | — |

FIG.10

| Index | Matrix |
|---|---|
| 0 | $W^1_0$ |
| 1 | $W^1_1$ |
| 2 | $W^1_2$ |
| 3 | $W^1_3$ |
| 4 | $W^1_4$ |
| ⋮ | ⋮ |
| 15 | $W^1_{15}$ |

FIG.11

| Index | Matrix |
|---|---|
| 0 | $W^2_0$ |
| 1 | $W^2_1$ |
| 2 | $W^2_2$ |
| 3 | $W^2_3$ |

FIG.27

| $I_{PI}$ | $N_{OFFSET,PI}$ |
|---|---|
| $0 \leq I_{PI} \leq 160$ | $-I_{PI}$ |
| $161 \leq I_{PI} \leq 256$ | Reserved |

US 9,094,846 B2

TERMINAL DEVICE, BASE STATION DEVICE, COMMUNICATION SYSTEM, AND COMMUNICATION METHOD

TECHNICAL FIELD

The present invention relates to a terminal device, a base station device, a communication system, and a communication method.

BACKGROUND ART

In a mobile radio communication system such as WCDMA (Wideband Code Division Multiple Access), LTE (Long Term Evolution), LTE-A (LTE-Advanced) and WiMAX (Worldwide Interoperability for Microwave Access) by 3GPP (Third Generation Partnership Project), the communication area can be increased by establishing a cellular configuration in which the area covered by a base station device (base station, transmission station, downlink transmission device, uplink reception device, eNodeB) or a transmission station conforming to the base station device is arranged as a plurality of cells. Furthermore, by using a frequency differing between adjacent cells or sectors, even a terminal device (mobile station, receiving station, uplink transmission device, downlink reception device, mobile terminal, UE: User Equipment) located in a cell edge region or a sector edge region can communicate without suffering interference by a transmitted signal from a plurality of base stations. However, such a scheme had the problem that the frequency usage efficiency is low. Although the frequency usage efficiency can be improved by using the same frequency between adjacent cells or sectors, measures against interference for the terminal device located in the cell edge region will be required.

By adaptively controlling a modulation and coding scheme (MCS), the number of spatial multiplex (layers, rank), precoder and the like according to the state of the transmission path between a base station and a terminal device, a more efficient data transmission can be realized. Non-Patent Literature 1 discloses a method of performing such control.

FIG. 43 represents a base station 4301 and a terminal device 4302 adaptively controlling a precoder in LTE. When a precoder is adaptively controlled with respect to a downlink transmission signal 4303 that is transmitted in LTE, terminal device 4302 refers to a downlink reference signal (RS) included in downlink transmission signal 4303 that is transmitted from base station 4301 to calculate a precoding matrix information PMI (Precoding Matrix Indicator) specifying a preferred precoder, and reports to base station 4301 via an uplink channel 4304. Non-Patent Literature 1 teaches a feedback mode in which the precoder information is reported periodically. A terminal device that is set with a feedback mode in which the precoder information is reported periodically uses a code book that is a table including a plurality of predetermined precoding matrixes to calculate periodically and report to the base station a PMI that is an index corresponding to a preferred precoding matrix in the relevant code book.

CITATION LIST

Non Patent Literature

Non-Patent Literature 1: 3rd Generation Partnership Project; Technical Specification Group Radio Access Network; Evolved Universal Terrestrial Radio Access (E-UTRA); Physical layer procedures (Release 8), December, 2008, 3GPP TS 36.213 V8.8.0 (2009-9).

SUMMARY OF INVENTION

Technical Problem

The conventional communication scheme is disadvantageous in that specification and application of a preferred precoder are difficult since information indicating a precoding matrix defined in only one code book could be reported. This was the cause of preventing the transmission efficiency from being improved.

In view of the foregoing, an object of the present invention is to provide a terminal device, a base station device, a communication system, and a communication method that can specify and apply precoder information efficiently using a plurality of partial precoder information.

Solution to Problem (A1) The present invention is directed to solving the aforementioned problem. A terminal device according to an aspect of the present invention carries out communication with a base station device, and includes switching means for switching between a first feedback mode in which one precoder information specifying a preferred precoder and a reception quality indicator specifying a preferred transmission rate are reported periodically to the base station device and a second feedback mode in which first partial precoder information among first and second partial precoder information specifying the preferred precoder and a set of the second partial precoder information and the reception quality indicator are reported periodically to the base station device; and report means using, in the second feedback mode, a periodic resource for reporting the precoder information and reception quality indicator in the first feedback mode, for reporting one of the first partial precoder information and the set of the second partial precoder information and the reception quality indicator alternately and in a period two times a report period of the precoder information and reception quality indicator in the first feedback mode.

(A2) Preferably, the reception quality indicator is for a downlink component carrier bandwidth.

(A3) Preferably, the first partial precoder information and second partial precoder information are for a downlink component carrier bandwidth.

(A4) Preferably, the terminal device includes obtaining means for obtaining control data indicating a period and an offset in timing of the periodic resource used in reporting the reception quality indicator.

(A5) A terminal device according to another aspect of the present invention carries out communication with a base station device, and includes obtaining means for obtaining control data indicating a value of Np that is a report period of one precoder information specifying a preferred precoder and a reception quality indicator specifying a preferred transmission rate; switching means for switching between a first feedback mode in which the reception quality indicator is periodically reported to the base station device in the period of Np and a second feedback mode in which first partial precoder information among first and second partial precoder information specifying the preferred precoder and a set of the second partial precoder information and the reception quality indicator are reported periodically to the base station device; and report means using, in the second feedback mode, a periodic resource for reporting the precoder information and reception quality indicator in the first feedback mode, for reporting one of the first partial precoder information and the set of the second partial precoder information and the reception quality indicator in a period of X·Np.

(A6) Preferably, the obtaining means obtains control data indicating a value of X.

(A7) A terminal device according to a further aspect of the present invention carries out communication with a base station device via a plurality of cells, and includes obtaining means for obtaining control data indicating a period that is set individually for each of the plurality of cells and that is a report period of a reception quality indicator specifying a preferred transmission rate; and report means for periodically reporting to a base station device first partial precoder information among first and second partial precoder information specifying a preferred precoder and second partial precoder information and/or reception quality indicator, in each of the plurality of cells.

(A8) Preferably, the report means reports the first partial precoder information by priority in a case that the subframe in which the first partial precoder information is reported and the subframe in which the reception quality indicator is reported coincide with each other.

(A9) Preferably, the report means reports the first partial precoder information by priority in a case that the subframe in which the first partial precoder information is reported and the subframe in which the second partial precoder information is reported coincide with each other.

(A10) A base station device according to still another aspect of the present invention carries out communication with a terminal device. The base station device includes setting means for setting a parameter indicating one of a first feedback mode and a second feedback mode at the terminal device, wherein the terminal device reports periodically one precoder information specifying a preferred precoder and a reception quality indicator specifying a preferred transmission rate in the first feedback mode, and the terminal device reports periodically first partial precoder information among first and second partial precoder information specifying the preferred precoder and a set of the second partial precoder information and the reception quality indicator in the second feedback mode; and reception means for receiving one of the first partial precoder information and the set of the second partial precoder information and the reception quality indicator alternately and in a period two times a report period of the precoder information and reception quality indicator in the first feedback mode via a periodic resource for reporting the precoder information and reception quality indicator in the first feedback mode.

(A11) Preferably, the reception quality indicator is for a downlink component carrier bandwidth.

(A12) Preferably, the first partial precoder information and second partial precoder information are for the downlink component carrier bandwidth.

(A13) Preferably, the setting means sets a period and an offset in timing of the periodic resource used for reporting a reception quality indicator.

(A14) A base station device according to still a further aspect of the present invention carries out communication with a terminal device. The base station device includes setting means for setting a parameter indicating one of a first feedback mode and a second feedback mode and a value of Np that is a report period of the reception quality indicator at the terminal device, wherein the terminal device reports periodically one precoder information specifying a preferred precoder and a reception quality indicator specifying a preferred transmission rate in the first feedback mode, and the terminal device reports periodically first partial precoder information among first and second partial precoder information specifying the preferred precoder and a set of the second partial precoder information and the reception quality indicator in the second feedback mode; and reception means for receiving one of the first partial precoder information and the set of the second partial precoder information and the reception quality indicator in a period of X·Np via a periodic resource of a period of Np for reporting the precoder information and reception quality indicator in the first feedback mode.

(A15) Preferably, the setting means sets the value of X.

(A16) A base station device according to still another aspect of the present invention carries out communication with a terminal device via a plurality of cells, and includes setting means for setting a report period of a reception quality indicator specifying a preferred transmission rate individually for each of the plurality of cells, and reception means for periodically receiving first partial precoder information among first and second partial precoder information specifying a preferred precoder and second partial precoder information and/or reception quality indicator, in each of the plurality of cells.

(A17) A communication system according to still another aspect of the present invention carries out communication between a base station device and a terminal device. The base station device includes setting means for setting a parameter indicating one of a first feedback mode and a second feedback mode at the terminal device, wherein the terminal device reports periodically one precoder information specifying a preferred precoder and a reception quality indicator specifying a preferred transmission rate in the first feedback mode, and the terminal device reports periodically first partial precoder information among first and second partial precoder information specifying the preferred precoder and a set of the second partial precoder information and the reception quality indicator in the second feedback mode; and reception means for receiving, in the second feedback mode, one of the first partial precoder information and the set of the second partial precoder information and the reception quality indicator alternately and in a period two times a report period of the precoder information and reception quality indicator in the first feedback mode via a periodic resource for reporting the precoder information and reception quality indicator in the first feedback mode. The terminal device includes switching means for switching between the first feedback mode and the second feedback mode, and report means for reporting, in the second feedback mode using the periodic resource, one of the first partial precoder information and the set of the second partial precoder information and the reception quality indicator alternately and in a period two times a report period of the precoder information and reception quality indicator in the first feedback mode.

(A18) A communication method according to still another aspect of the present invention at a terminal device communicating with a base station device includes the steps of: switching between a first feedback mode in which one precoder information specifying a preferred precoder and a reception quality indicator specifying a preferred transmission rate are reported periodically to the base station device and a second feedback mode in which first partial precoder information among first and second partial precoder information specifying the preferred precoder and a set of the second partial precoder information and the reception quality indicator are reported periodically to the base station device; and reporting, in the second feedback mode, using a periodic resource for reporting the precoder information and reception quality indicator in the first feedback mode, one of the first partial precoder information and the set of the second partial precoder information and the reception quality indicator alternately and in a period two times a report period of the precoder information and reception quality indicator in the first feedback mode.

(A19) A communication method according to still another aspect of the present invention at a base station device communicating with a terminal device includes the steps of setting a parameter indicating one of a first feedback mode and a second feedback mode at the terminal device, wherein the terminal device reports periodically one precoder information specifying a preferred precoder and a reception quality indicator specifying a preferred transmission rate in the first feedback mode, and the terminal device reports periodically first partial precoder information among first and second partial precoder information specifying the preferred precoder and a set of the second partial precoder information and the reception quality indicator in the second feedback mode; and receiving, in the second feedback mode, one of the first partial precoder information and the set of the second partial precoder information and the reception quality indicator alternately and in a period two times a report period of the precoder information and reception quality indicator in the first feedback mode via a periodic resource for reporting the precoder information and reception quality indicator in the first feedback mode.

(B1) A terminal device according to still another aspect of the present invention includes communication means for carrying out communication with a base station device, and switching means for switching between a first feedback mode in which one precoder information specifying a preferred precoder is reported periodically to the base station device and a second feedback mode in which a plurality of partial precoder information specifying the preferred precoder are reported periodically to the base station device.

(B2) Preferably, the terminal device reports periodically to a base station device, in the first feedback mode, a rank indicator specifying a preferred number of spatial multiplex.

(B3) Further preferably, the terminal device reports, in the second feedback mode, partial precoder information using a resource used in reporting the rank indicator in the first feedback mode.

(B4) Alternatively preferably, the terminal device reports periodically to the base station device, in the first feedback mode, a reception quality indicator specifying a preferred transmission mode.

(B5) Further preferably, the terminal device reports, in the second feedback mode, partial precoder information using a resource used in reporting the reception quality indicator in the first feedback mode.

(B6) Alternatively and preferably, the terminal device reports periodically to the base station device, in the second feedback mode, a rank indicator specifying a preferred number of spatial multiplex.

(B7) Further preferably, the terminal device reports, in the second feedback mode, partial precoder information in a period identical to the period of the rank indicator.

(B8) Alternatively and further preferably, the terminal device reports, in the second feedback mode, partial precoder information at a timing differing from the timing of the rank indicator.

(B9) Alternatively and further preferably, the control device reports, in the second feedback mode, the rank indicator and the partial precoder information alternately.

(B10) Alternatively and preferably, the terminal device reports periodically to the base station device, in the second feedback mode, a reception quality indicator specifying a preferred transmission rate.

(B11) Further preferably, the terminal device reports, in the second feedback mode, partial precoder information in a period identical to the period of the reception quality indicator.

(B12) Alternatively and further preferably, the terminal device reports, in the second feedback mode, partial precoder information at a timing different from the timing of the reception quality indicator.

(B13) Alternatively and further preferably, the terminal device reports, in the second feedback mode, a reception quality indicator and partial precoder information alternately.

(B14) A base station device according to still another aspect of the present invention includes communication means for carrying out communication with a terminal device, and setting means for setting a parameter indicating one of a first feedback mode in which one precoder information specifying a preferred precoder is reported periodically to the base station device and a second feedback mode in which a plurality of partial precoder information specifying the preferred precoder are reported periodically to the base station device.

(B15) A base station device according to still another aspect of the present invention includes means for carrying out communication with a terminal device, and setting means for setting at the terminal device one of a first feedback mode in which one precoder information specifying a preferred precoder is reported periodically to the base station device and a second feedback mode in which a plurality of partial precoder information specifying the preferred precoder are reported periodically to the base station device. The setting means sets at the terminal device a first parameter specifying a period in which precoder information is reported in a case that the first feedback mode is set, and sets at the terminal device the first parameter and a second parameter indicating an offset in timing of reporting partial precoder information in a case that the second feedback mode is set.

(B16) A communication system according to still another aspect of the present invention carries out communication between a base station device and a terminal device. The base station device includes setting means for setting at the terminal device one a first feedback mode in which one precoder information specifying a preferred precoder is reported periodically to the base station device and a second feedback mode in which a plurality of partial precoder information specifying the preferred precoder are reported periodically to the base station device. The terminal device includes report means for reporting, according to the set feedback mode, one of the precoder information or partial precoder information to the base station device.

(B17) A communication method according to still another aspect of the present invention at a terminal device communicating with a base station device includes the step of switching between a first feedback mode in which one precoder information specifying a preferred precoder is reported periodically to the base station device and a second feedback mode in which a plurality of partial precoder information specifying the preferred precoder are reported periodically to the base station device.

(B18) A communication method according to still another aspect of the present invention at a base station device communicating with a terminal device includes the step of setting at the terminal device a parameter indicating one of a first feedback mode in which one precoder information specifying a preferred precoder is reported periodically to the base station device and a second feedback mode in which a plurality of partial precoder information specifying the preferred precoder are reported periodically to the base station device.

(B19) A communication method according to still another aspect of the present invention at a base station device communicating with a terminal device includes the steps of: setting at the terminal device one of a first feedback mode in which one precoder information specifying a preferred precoder is reported periodically to the base station device and a second feedback mode in which a plurality of partial precoder information specifying the preferred precoder are reported periodically to the base station device; setting at the terminal device a first parameter specifying a period in which precoder information is reported in a case that the first feedback mode is set; and setting the first parameter and a second parameter indicating an offset in timing of reporting partial precoder information in a case that the second feedback mode is set.

Advantageous Effects of Invention

According to the present invention, precoder information can be specified and applied efficiently using a plurality of partial precoder information.

BRIEF DESCRIPTION OF DRAWINGS

FIG. 8 represents an exemplary parameter table related to CQI report according to the first embodiment of the present invention.

FIG. 9 represents an exemplary parameter table related to RI report according to the first embodiment of the present invention.

FIG. 10 represents an exemplary code book of partial precoder information according to the first embodiment of the present invention.

FIG. 11 represents an exemplary code book according to the first embodiment of the present invention.

FIG. 27 represents an exemplary parameter table related to PI report according to the second embodiment of the present invention.

DESCRIPTION OF EMBODIMENTS

Figure 1:
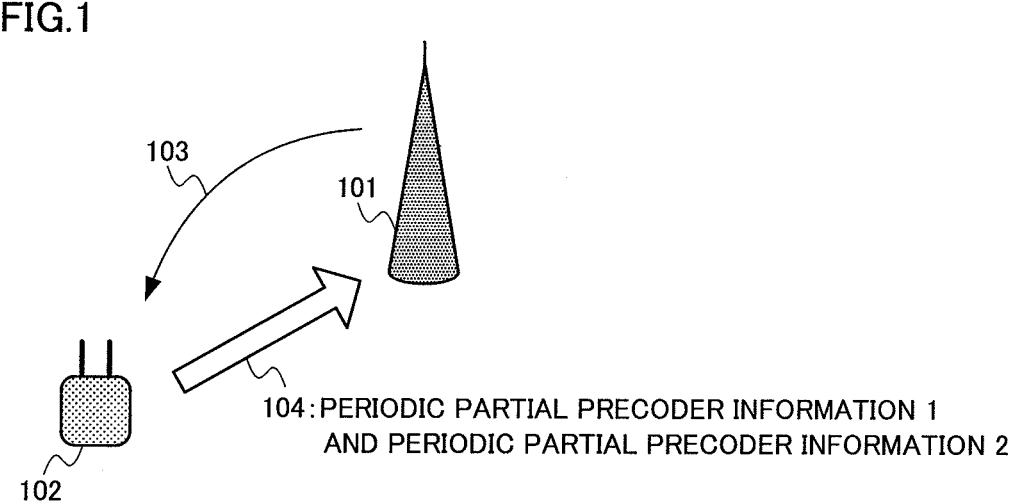
FIG. 1 is a schematic view of a configuration of a communication system according to a first embodiment of the present invention.

Embodiments of the present invention will be described in detail hereinafter with reference to the drawings. In the drawings, the same or corresponding elements have the same reference characters allotted, and description thereof will not be repeated.

First Embodiment

A first embodiment of the present invention will be described hereinafter with reference to the drawings.

FIG. 1 is a schematic view of a configuration of a communication system according to the first embodiment of the present invention. The communication system in this drawing envisages an LTE-A system, and includes a base station device (base station, transmission station, downlink transmission device, uplink reception device, eNodeB) 101 constituting a cell, and a terminal device (mobile station, receiving station, uplink transmission device, downlink reception device, mobile terminal, UE: User Equipment) 102. When a precoder is controlled adaptively with respect to a downlink transmission signal 103 that is to be transmitted, terminal device 102 refers to a downlink reference signal (RS) included in downlink transmission signal 103 transmitted from base station 101 to calculate a plurality of partial precoder information specifying a preferred precoder, and reports respective partial precoder information periodically to base station 101 via uplink channel 104. Here, the case where partial precoder information 1 (PI1) and partial precoder information 2 (PI2) are reported as a plurality of partial precoder information PI (Precoder Information) will be described. In the context of a preferred precoder, a method of determining a precoder such that the reception signal power of the downlink is increased, for example, can be used, taking into account the downlink propagation path.

Figure 2:
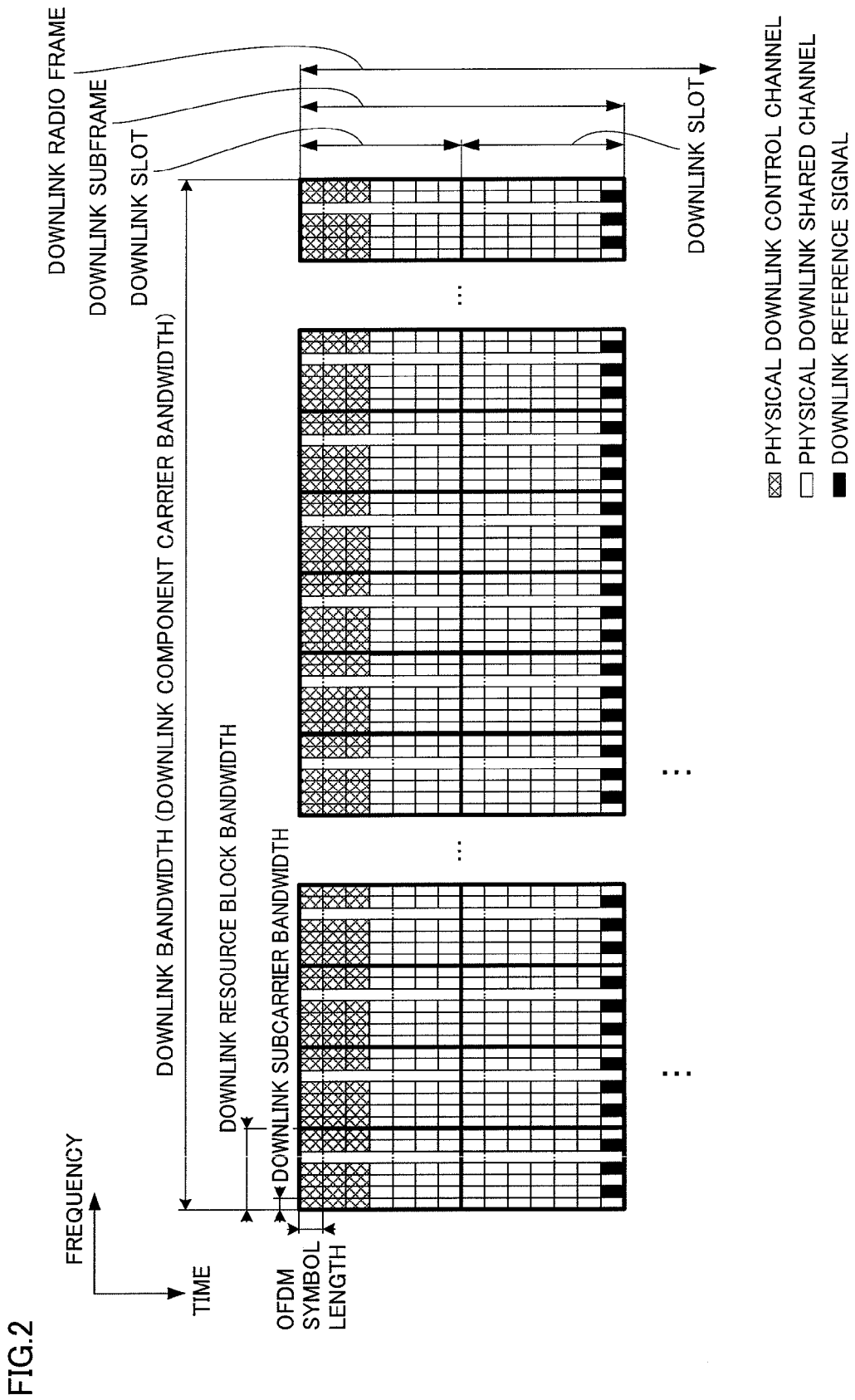
FIG. 2 represents an exemplary radio frame configuration of a downlink according to the first embodiment of the present invention.

FIG. 2 represents an exemplary radio frame configuration of a downlink according to a present embodiment. In the downlink, an OFDM (Orthogonal Frequency-Division Multiplex) access scheme is used. The downlink has a physical downlink control channel (PDCCH) and a physical downlink shared channel (PDSCH), and the like assigned. A downlink reference signal (RS) is multiplexed on some of PDSCH. A downlink radio frame is constituted of a downlink resource block (RB) pair. The RB pair of the downlink is the unit of downlink radio resource allocation and the like, and is constituted of a frequency band (RB bandwidth) and a time zone (two slots=one subframe) of a predetermined width. One downlink RB pair is formed of two downlink RBs (RB bandwidth×slot) continuous in the time region. One downlink RB is formed of 12 subcarriers in the frequency region, and formed of 7 OFDM symbols in the time region. The physical downlink control channel is a physical channel for the transmission of downlink control information such as a terminal device identifier, scheduling information of a downlink shared channel, scheduling information of an uplink shared channel, a modulation and coding scheme, retransmission parameter, and the like.

Figure 3:
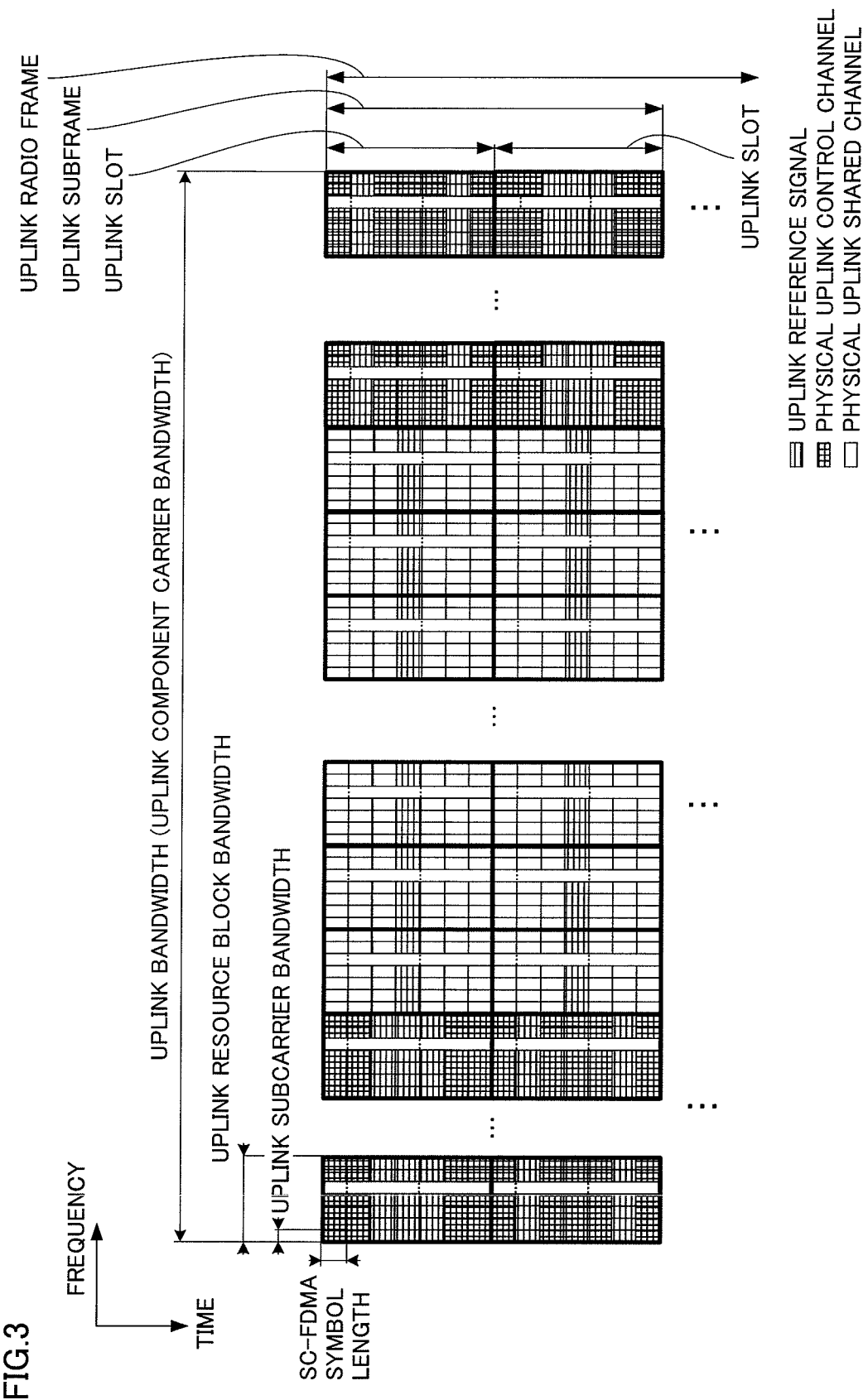
FIG. 3 represents an exemplary radio frame configuration of an uplink according to the first embodiment of the present invention.

FIG. 3 represents an exemplary radio frame configuration of an uplink according to the present embodiment. In the uplink, an SC-FDMA (Single Carrier-Frequency-Division Multiple Access) scheme is used. The uplink has a physical uplink shared channel (PUSCH), a physical uplink control channel (PUCCH) and the like assigned. Furthermore, an uplink reference signal is allocated to some of the PUSCH and PUCCH. The uplink radio frame is constituted of an uplink RB pair. The uplink RB pair is the unit of uplink radio resource allocation and the like, and is constituted of a frequency band (RB bandwidth) and a time zone (two slots=one subframe) of a predetermined width. One uplink RB pair is formed of two uplink RBs (RB bandwidth×slot) continuous in the time region. One uplink RB is formed of 12 subcarriers in the frequency region, and 7 SC-FDMA symbols in the time region.

Figure 4:
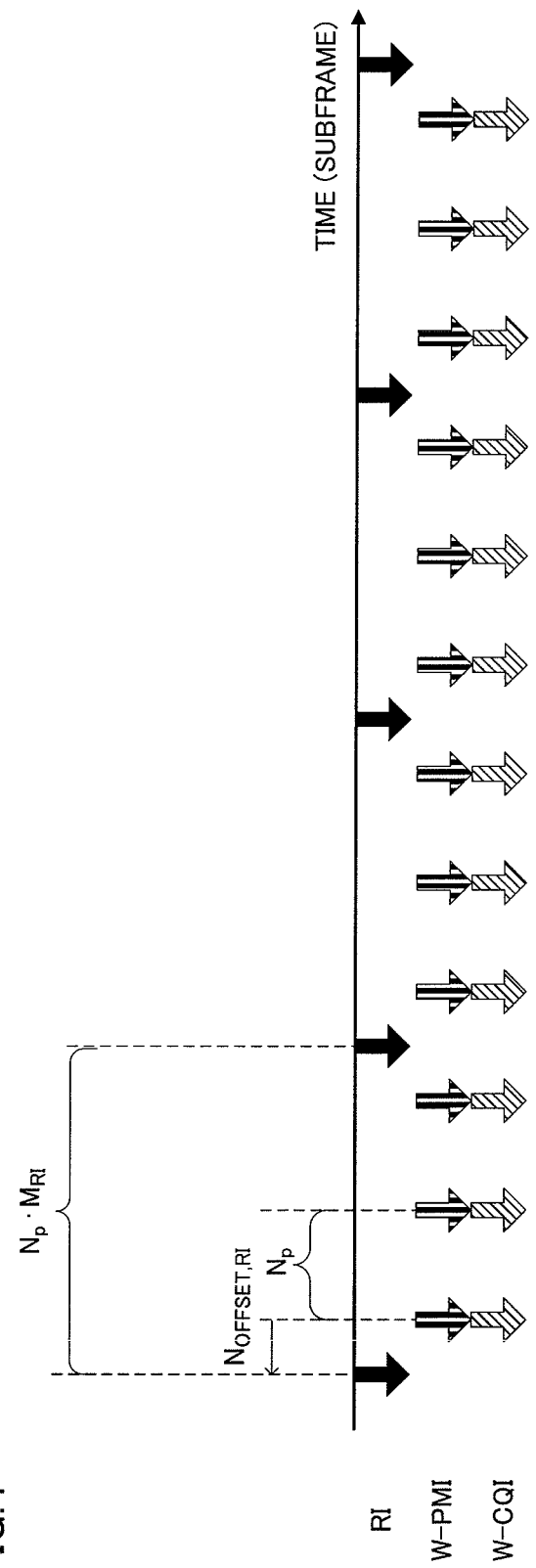
FIG. 4 represents an exemplary feedback mode according to the first embodiment of the present invention.

FIG. 4 represents an exemplary feedback mode (feedback mode 1) according to the present embodiment. In the present specification, a feedback mode includes the variation of a combination of contents of the reception quality information to be fed back from the terminal device to the base station device, the method of generating respective contents, and the method of feeding back respective contents.

Feedback mode 1 of FIG. 4 is a backward compatible feedback mode (first feedback mode) for reporting in the unit of a downlink bandwidth (or a downlink component carrier bandwidth). In feedback mode 1, RI (Rank Indicator), PMI (Precoding Matrix Indicator), and CQI (Channel Quality Indicator) are reported periodically. As used herein, RI is the indicator representing the number of spatial multiplex (a rank indicator specifying the preferred number of spatial multiplex). PMI is an indicator indicating a preferred precoding matrix (precoder information specifying a preferred precoder). CQI is an indicator indicating the transmission rate to maintain a predetermined transmission quality (reception quality indicator specifying a preferred transmission rate). Specifically, in the subframe meeting equation (1), W-CQI (Wideband-CQI) that is the CQI for the downlink bandwidth and W-PMI (Wideband-PMI) that is the PMI for the downlink bandwidth are fed back; in the subframe meeting equation (2), RI is fed back.

$$(10 \times n_f + \lfloor n_s/2 \rfloor - N_{OFFSET, CQI}) \bmod N_P = 0 \quad (1)$$

$$(10 \times n_f + \lfloor n_s/2 \rfloor - N_{OFFSET, CQI} - N_{OFFSET, RI}) \bmod (N_P \cdot M_{RI}) = 0 \quad (2)$$

In the equations, $n_f$ is the system frame number assigned to each radio frame; $n_s$ is the slot number assigned to each slot in the radio frame; and $N_P$, $M_{RI}$, $N_{OFFSET, CQI}$, and $N_{OFFSET, RI}$ are predetermined values. The parentheses applied to $n_s/2a$ represent the floor function, and mod represents the modulo operation.

In feedback mode 1 of FIG. 4, W-CQI and W-PMI are reported in the period of $N_P$ subframes, and at a subframe shifted (offset) from the reference subframe by $N_{OFFSET, CQI}$. RI is reported in the period of $N_P \cdot M_{RI}$ that is $M_{RI}$ times the period of W-CQI and W-PMI, and at a subframe shifted from the reference subframe by $N_{OFFSET, CQI} + N_{OFFSET, RI}$. In other words, RI is reported at a subframe further shifted from W-CQI and W-PMI by $N_{OFFSET, RI}$.

Figure 5:
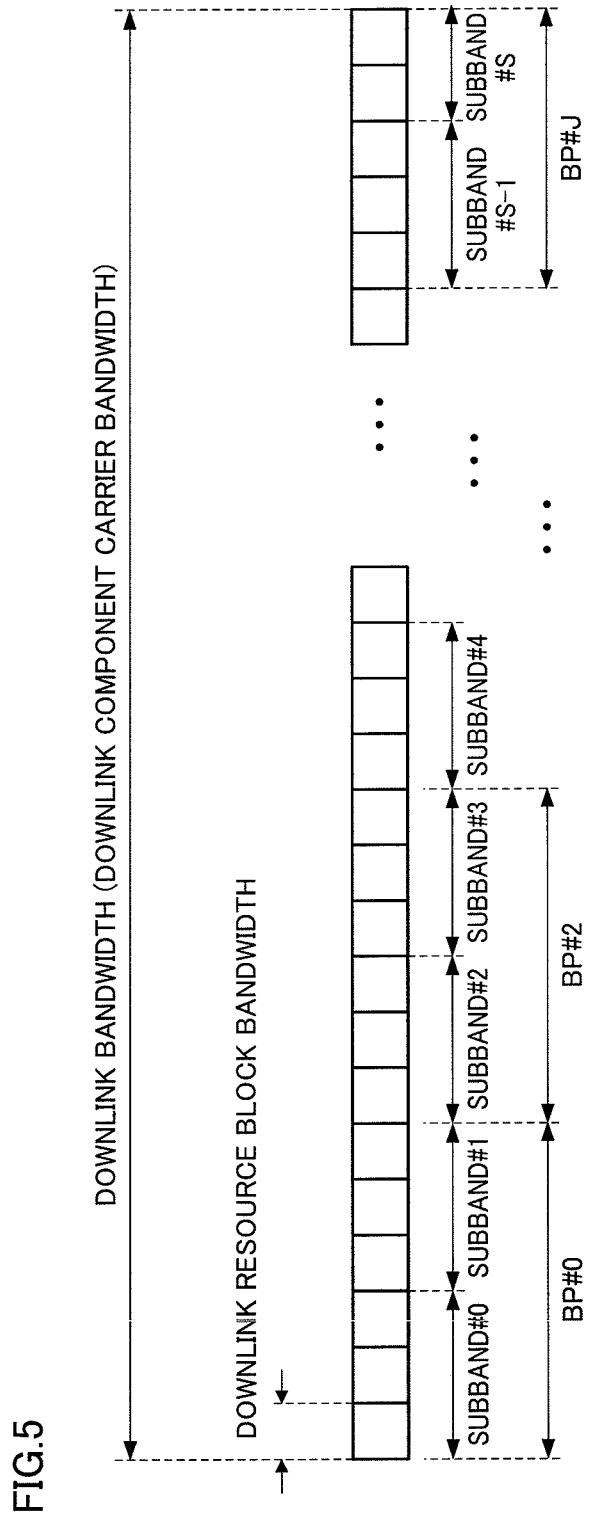
FIG. 5 represents an exemplary subband configuration according to the first embodiment of the present invention.

FIG. 5 represents an exemplary subband configuration according to the present embodiment. The bandwidth of a plurality of adjacent RBs together constitute a subband. A plurality of subbands together constitute a BP (Bandwidth Part). In the configuration of FIG. 5, S subbands and J BPs are arranged in the downlink bandwidth.

Figure 6:
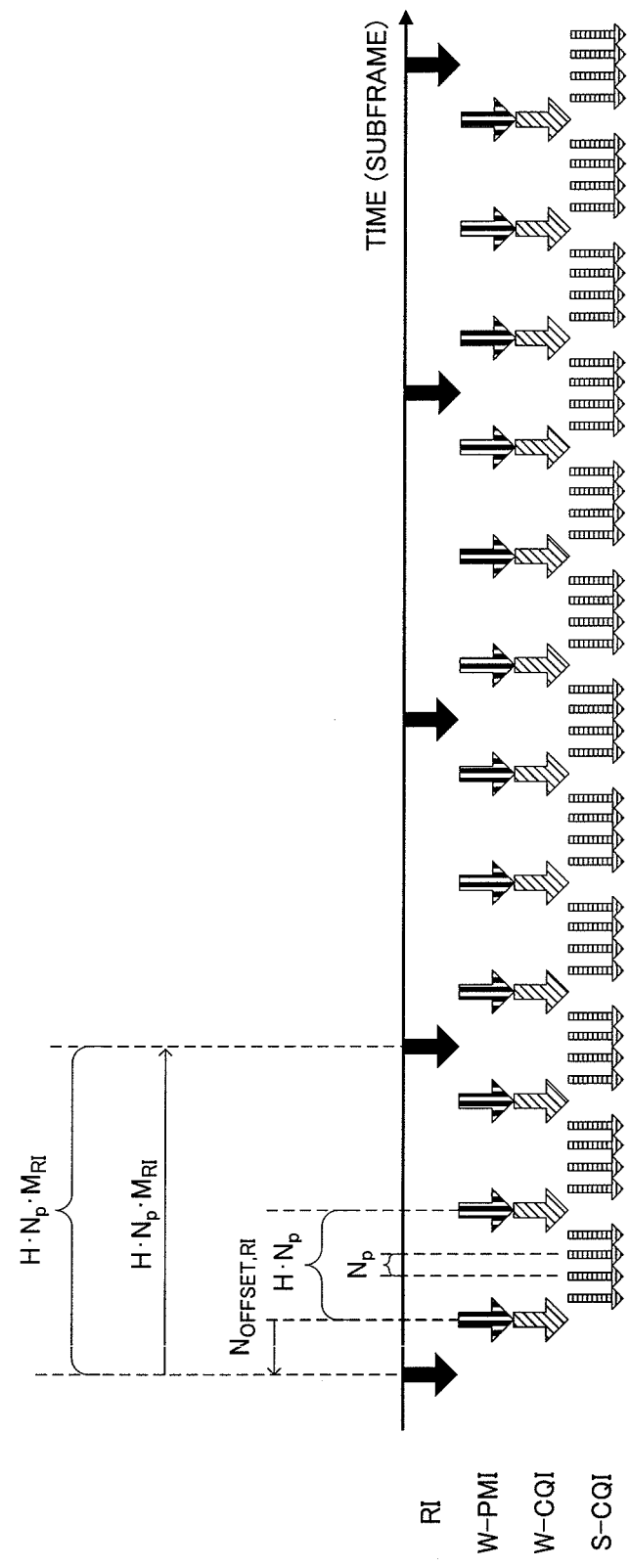
FIG. 6 represents another exemplary feedback mode according to the first embodiment of the present invention.

FIG. 6 represents another example of a feedback mode (feedback mode 2) according to the present embodiment. Feedback mode 2 of FIG. 6 is a backward compatible feedback mode (first feedback mode) for reporting in the downlink bandwidth (or downlink component carrier bandwidth) unit and the BP unit. In this feedback mode 2, RI, PMI and CQI are reported periodically. Specifically, in the subframe meeting equation (3), W-CQI that is the CQI for the downlink bandwidth and W-PMI that that is the PMI for the downlink bandwidth are fed back; in the subframe meeting equation (4); RI is fed back. Furthermore, between the reports of W-CQI, S-CQI (Subband-CQI) that is the CQI for the subband is reported.

$$(10 \times n_f + \lfloor n_s/2 \rfloor - N_{OFFSET,CQI}) \bmod (H \cdot N_P) = 0 \quad (3)$$

$$(10 \times n_f + \lfloor n_s/2 \rfloor - N_{OFFSET,CQI} - N_{OFFSET,RI}) \bmod (H \cdot N_P \cdot M_{RI}) = 0 \quad (4)$$

In the equations, $n_f$ is the system frame number assigned to each radio frame; $n_s$ is the slot number assigned to each slot in the radio frame; and $N_P$, $M_{RI}$, $N_{OFFSET, CQI}$, $N_{OFFSET, RI}$, and H are predetermined values.

In feedback mode 2 shown in FIG. 6, W-CQI and W-PMI are reported in the period of H·Np subframes, and at a subframe shifted from the reference subframe by $N_{OFFSET, CQI}$. RI is reported in a period of H·Np·$M_{RI}$ that is $M_{RI}$ times the period of W-CQI and W-PMI, and at a subframe shifted from the reference subframe by $N_{OFFSET, CQI}$+$N_{OFFSET, RI}$. In other words, RI is reported at a subframe further shifted from W-CQI and W-PMI by $N_{OFFSET, RI}$. S-CQI is reported J·K times in the period of $N_P$ during the term of H·$N_P$ subframes that is the report period of W-CQI. Here, H=J·K+1 is established, where J is the number of BPs, and K is a predetermined value. Each S-CQI reported J·K times is the CQI typical of BP, The CQI in the J BPs is sequentially reported, starting from the CQI in the BP of lower frequency. This report of CQI is carried out J times to cover the downlink bandwidth. By further repeating the report of J times for K cycles, the report of J·K times is carried out during the term of H·Np subframes.

Figure 7:
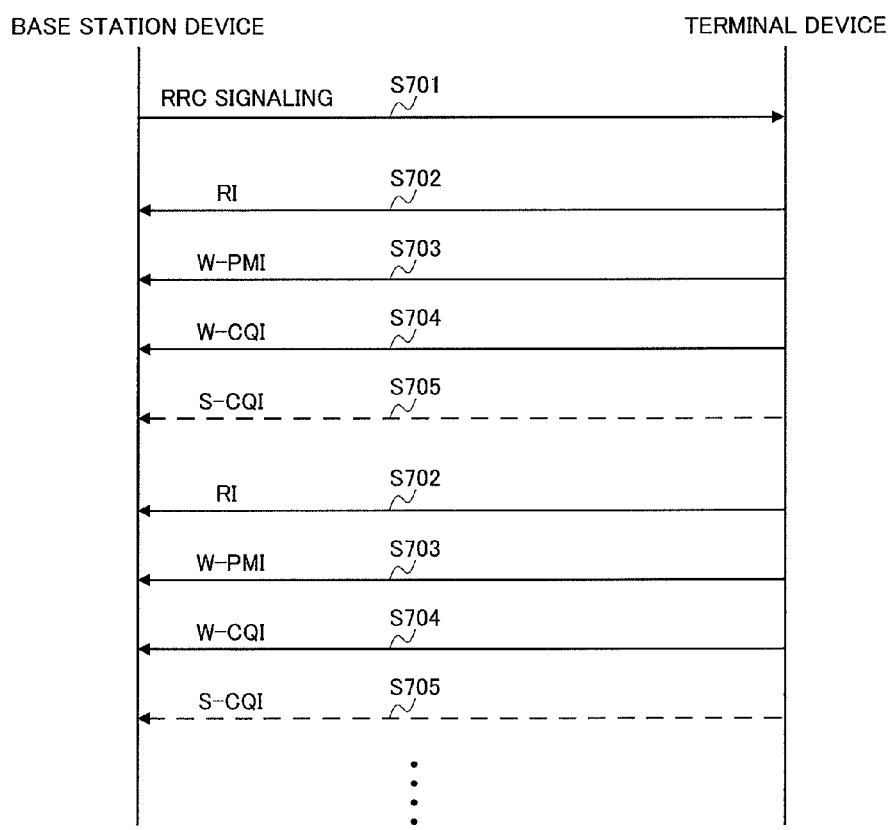
FIG. 7 represents an exemplary procedure according to the first embodiment of the present invention.

FIG. 7 represents an exemplary procedure according to the present embodiment. The procedure of FIG. 7 is an example in feedback mode 1 or feedback mode 2 (backward compatible feedback mode). First, the base station uses RRC (Radio Resource Control) signaling to set the parameter for feedback at the terminal device, and designates a periodic feedback (step S701). The terminal device having a periodic feedback designated reports to the base station device periodically RI (step S702), W-PMI (step S703), and W-CQI (step S704) according to the parameter for the set feedback. In the case of feedback mode 2, the terminal device also reports S-CQI periodically (step S705).

There may be the case where the subframe in which W-CQI or S-CQI is reported and the subframe in which RI is reported coincide with each other. In this case, the terminal device reports RI without reporting W-CQI or S-CQI. In the RRC signaling at step S701, the setting can be established to prohibit feedback of RI or W-PMI. In this case, the terminal device reports only CQI.

FIG. 8 represents an exemplary parameter table related to the report of CQI according to the present embodiment. The parameter table of FIG. 8 relates to W-CQI report. The base station device and terminal device are sharing the parameter table. The base station device calculates $N_P$ and $N_{OFFSET, CQI}$ from the period and offset value of W-CQI or W-PMI preferred for any of the terminal devices based on the feedback resource scheduling between a plurality of terminal devices, the transition in the reception power value for each terminal device, and the like. The base station terminal refers to the parameter table to select and set at the terminal device an $I_{CQI}$ corresponding to the calculated Np and $N_{OFFSET, CQI}$ (first parameter specifying the period in reporting the precoder information). By way of example, description will be provided with $I_{CQI}$ as an index of 10 bits (1024 levels), The terminal device having $I_{CQI}$ set uses the set $I_{CQI}$ and the parameter table to obtain $N_P$ and $N_{OFFSET, CQI}$. The terminal device uses the obtained $N_P$ and $N_{OFFSET, CQI}$ to determine the subframe in which W-CQI and W-PMI are to be reported, and then reports the W-CQI and W-PMI.

FIG. 9 represents an exemplary parameter table related to RI report according to the present embodiment. Likewise with the parameter table related to CQI report in FIG. 8, the base station device and terminal device are sharing the parameter table. The base station device calculates $M_{RI}$ and $N_{OFFSET, RI}$ from the period and offset value of RI preferred for any of the terminal devices based on the feedback resource scheduling between the plurality of terminal devices, the transition of the reception power value for each terminal device, and the like. The base station device refers to the parameter table to select and set at the terminal device an $I_{RI}$ (parameter specifying the period in reporting the rank indicator) corresponding to the calculated $M_{RI}$ and $N_{OFFSET, RI}$. By way of example, description will be provided with $I_{RI}$ as an index of 10 bits (1024 levels). The terminal device having $I_{RI}$ set uses the set $I_{RI}$ and parameter table to obtain $M_{RI}$ and $N_{OFFSET, RI}$. The terminal device uses the obtained $M_{RI}$ and $N_{OFFSET, RI}$, and $N_P$ and $N_{OFFSET, CQI}$ obtained from $I_{CQI}$ to determine the subframe in which RI is to be reported, and then reports the RI.

Next, an extended feedback mode in which a plurality of partial precoder information PI are reported (second feedback mode) will be described hereinafter. The description is based on the case where partial precoder information 1 (PI1) and partial precoder information 2 (PI2) are reported as partial precoder information PI. In the extended feedback mode, the PMI in the backward compatible feedback mode does not have to be fed back. Therefore, the following example will be described corresponding to the case where PMI is not fed back, although PMI may be fed back in the extended feedback mode.

FIG. 10 represents an exemplary code book of partial precoder information according to the present embodiment. The size of this code book is 16. By specifying an index i that can be represented in 4 bits as PI1, $W^1_i$ corresponding to i can be determined in one-to-one correspondence.

FIG. 11 represents an exemplary code book according to the present embodiment. The size of this code book is 4. By specifying an index j that can be represented in 2 bits as PI2, $W^2_j$ corresponding to j can be determined in one-to-one correspondence.

The code books shown in FIGS. 10 and 11 are merely examples and other code books may be employed. For example, a code book having a size differing from those of the code books shown in FIGS. 10 and 11 may be used.

In the extended feedback mode, a preferred precoder can be specified using $W^1_i$ indicated by PI1 and $W^2_j$ indicated by PI2. As a preferred precoder, a precoder such that the downlink reception signal power, downlink reception quality, and downlink transmission rate are increased can be employed, in consideration of the downlink propagation path, for example.

More specifically, the system is arranged such that a preferred precoder F is represented as F=A(i)B(j), assuming that i is reported as PI1 and j is reported as PI2. As used herein, F is a matrix having the size of the number of layers×the number of antenna ports. A and B are matrixes with a predetermined size. The matrix in the present specification may include the concept of both vector and scalar. For the A and B, an arbitrary matrix that can be determined in one-to-one correspondence by specifying i and j as set forth below may be used.

(1) It is assumed that A(i)=$W^1_i$, B(j)=$V_1$+$V_2$ $W^2_j$, where $V_1$ and $V_2$ are each predetermined matrix formed of the elements of 0 or 1, $W^1_i$ is a matrix specified by a predetermined code book, and $W^2_j$ is a scalar specified by a predetermined code book.

(2) It is assumed that $A(i)=W^1_i$, $B(j)=W^2_j$, where $W^2_j$, and $W^2_j$ are matrixes specified by a predetermined code book.

(3) It is assumed that $A(i)=[W^1_i \ W^1_i]B(j)=W^2_j$, where $W^1_i$ and $W^2_j$ are matrixes specified by a predetermined code book.

(4) It is assumed that $A(i)=K(U, W^1_i)$, $B(j)=[IW^2_j{}^T]^T$, where U is a predetermined matrix, I is a unitary matrix, $W^1_i$ and $W^2_j$ are matrixes specified by a predetermined code book. K (X, Y) is an operator representing the Kronecker product of a matrix X and a matrix Y, and $X^T$ is an operator representing the transposed matrix of matrix X.

A preferred precoder that is expressed using PI1 and PI2 may also be represented as a coupled precoder based on a precoder expressed by PI1 and a precoder expressed by PI2. Although the description is based on the ease where the system is arranged to express such a coupled precoder as F=A(i)B(j), a similar advantage can be achieved by arranging a system with another precoder coupling method such as expressed by F=B(i)A(j) or F=K(A(i), B(j)).

Figure 12:
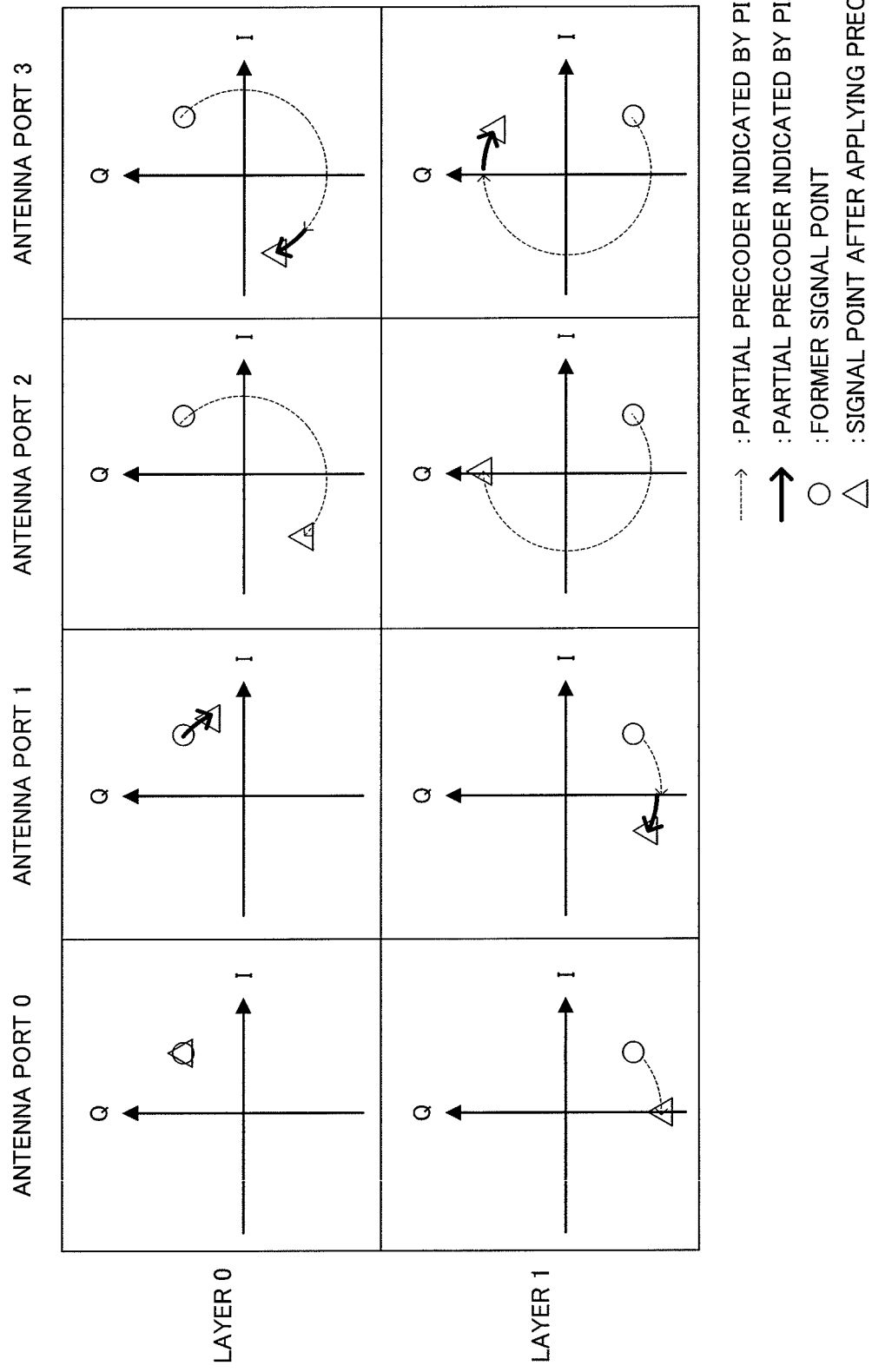
FIG. 12 schematically represents precoding processing according to the first embodiment of the present invention.

FIG. 12 represents the concept of precoding processing according to the present embodiment. The description is provided based on the case where the number of antenna ports is 4 and the number of layers is 2 for $F=W^1_i \ W^2_j$. The signal point at each antenna port in each layer is displaced (here, the phase rotates in the range from 0 to $2\pi$) by $W^1_i$ that is the precoder represented by PI1, and the signal point at each antenna point in each layer is displaced (here, the phase rotates in the range from 0 to $2\pi$) by $W^2_j$ that is a precoder represented by PI2. The displacement of the signal point shown in FIG. 12 is by way of example, and not limited thereto. In the reporting of PI1, the terminal device determines a preferred precoder (a precoder that has a preferred signal point after applying the precoder) from a code book corresponding to a group of precoders that apply a unique displacement to a signal point at each antenna port in each layer. Here, the code book as shown in FIG. 10 is used for determining PI1. Then, in reporting PI2, the terminal device further determines a precoder that has a preferred signal point after the precoder is applied, relative to the signal point after the precoder represented by the reported PI1 is applied, and reports that index as PI2. Here, a code book as shown in FIG. 11 is used for determining PI2. Alternatively, PI1 may be determined after PI2 is determined.

Further alternatively, the terminal device can determine PI1 and PI2 simultaneously. In this case, a precoder having $W^1_i$ and $W^2_j$ combined is evaluated for various combinations of PI1 and PI2 to determine a combination of PI1 and PI2 that represents a preferred precoder therefrom.

In the extended feedback mode, PI1 and PI2 in the unit of the downlink bandwidth (or, downlink component carrier bandwidth) may be reported, or PI1 and PI2 in the subband unit may be reported. Alternatively, PI1 in the downlink bandwidth unit and a PI2 in the subband unit may be reported.

Figure 13:
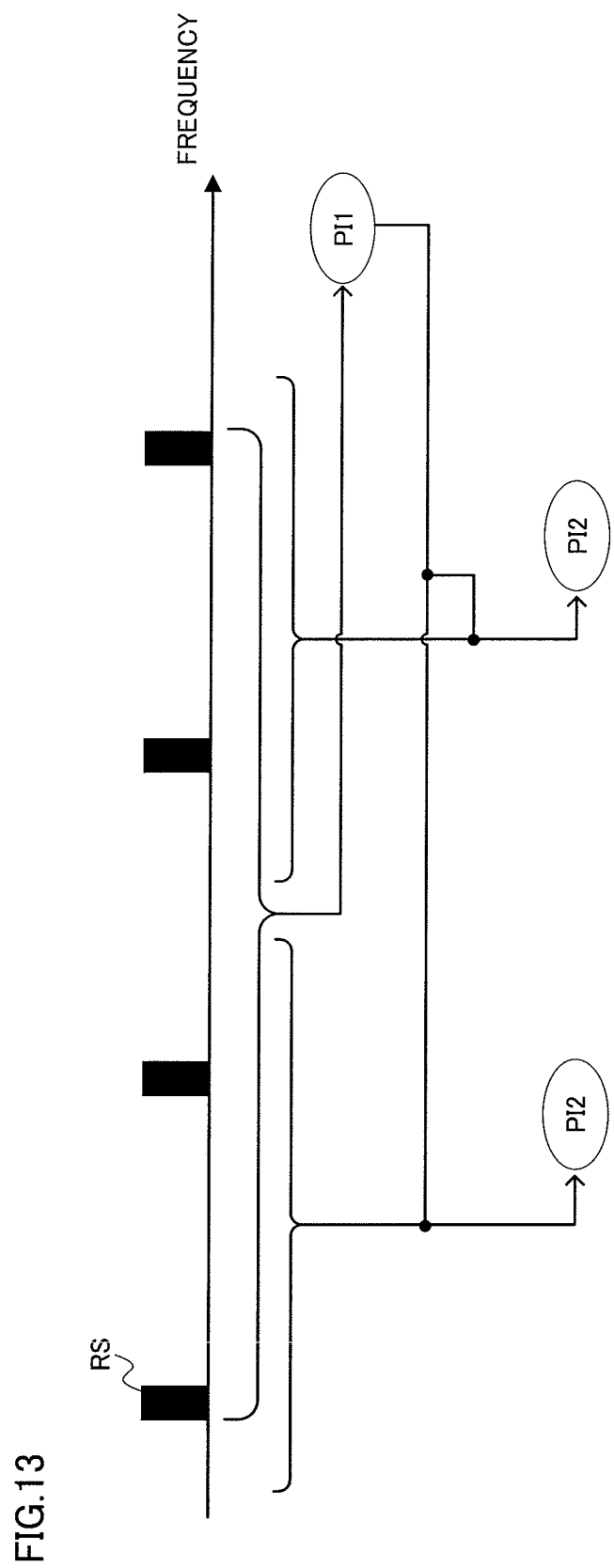
FIG. 13 schematically represents an exemplary RS to measure PI according to the first embodiment of the present invention.

FIG. 13 represents an exemplary RS for measuring PI. Using the measured result of RS arranged over a wide bandwidth, PI1 in the downlink bandwidth unit is determined. Using the determined PI1 and the measured result of RS in the subband, PI2 in the subband unit is determined.

Figure 14:
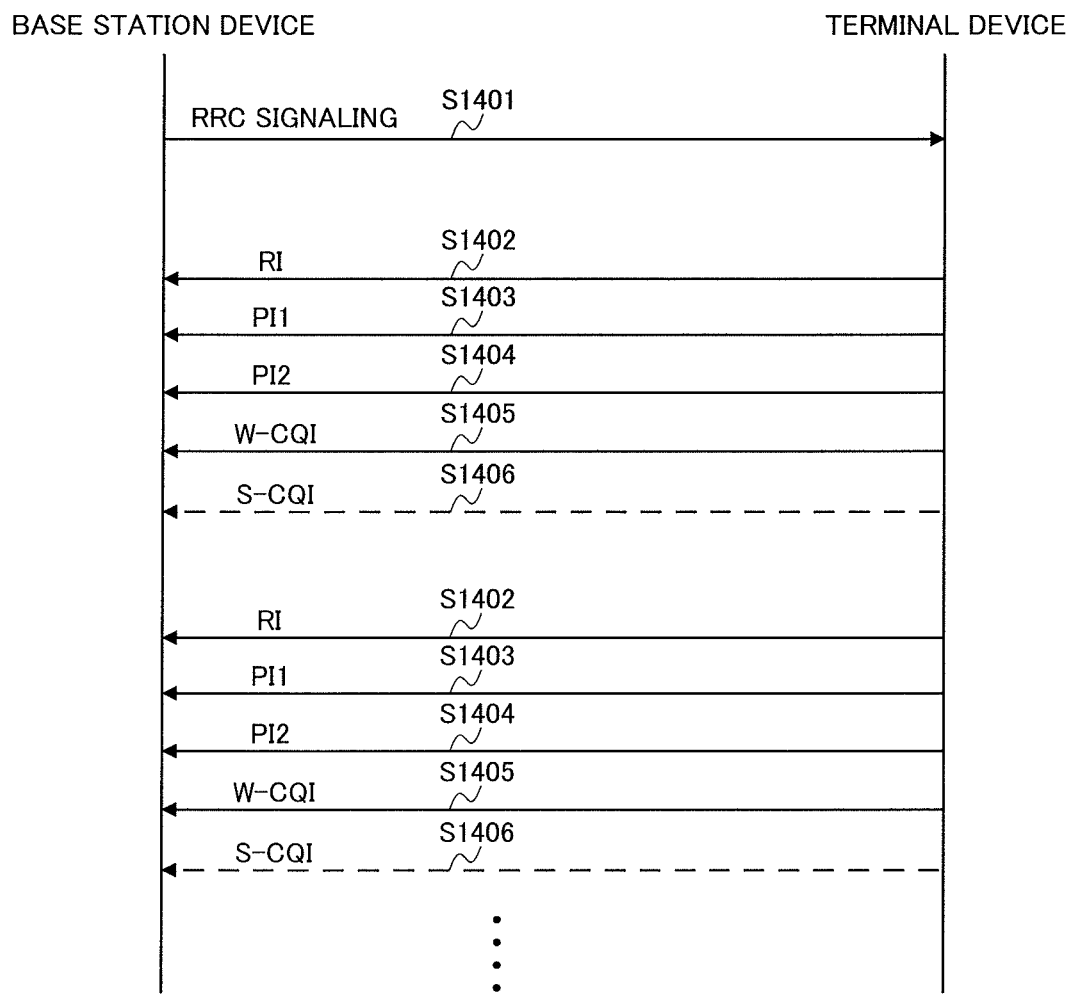
FIG. 14 represents another exemplary procedure according to the first embodiment of the present invention.

FIG. 14 represents another exemplary procedure according to the present embodiment. The procedure of FIG. 14 is an example of a procedure in an extended feedback mode. First, the base station uses RRC signaling to set the parameter for the feedback at the terminal device, and designates a periodic feedback (step S1401). The terminal device having the periodic feedback designated reports RI (step S1402), PI1 (step S1403), PI2 (step 1404), and W-CQI (step S1405) periodically to the base station device according to the parameters of the set feedback. In the case of an extended feedback mode in which S-CQI is fed back, the terminal device also reports S-CQI periodically (step S1406). Description is provided based on, but not limited to the case where the setting of a parameter in feedback at the terminal device and designation of a periodic feedback at step S1401 are carried out using RRC signaling. For example, a similar advantage can be achieved by using dynamic signaling or the like via a downlink physical control channel for the parameter setting and/or periodic feedback designation.

Here there may be the case where the subframe in which W-CQI or S-CQI is reported and the subframe in which PI1 and/or PI2 is reported (or the subframe in which RI is reported) coincide with each other. In this case, the terminal device sets the priority level for the contents to be fed back, and reports the contents given the higher priority level. For an example of such priority level setting, the order of RI>PI1>PI2>W-CQI>S-CQI, the order of RI>W-CQI>PI1>PI2>S-CQI, or the order of RI>PI1>W-CQI>PI2>S-CQI can be cited. Thus, even in the case where the subframes for reporting coincide, which contents is to be reported can be determined in one-to-one correspondence. Furthermore, since the priority level can be configured according to the level of importance of the contents, the contents having a higher level of importance can be reported by priority. Furthermore, in the RRC signaling at step S1401, a setting for prohibiting feedback of R1, PI1 or PI2 can be established. Such setting may be established individually for each of R1, PI1 and PI2 or established together by one index.

Figure 15:
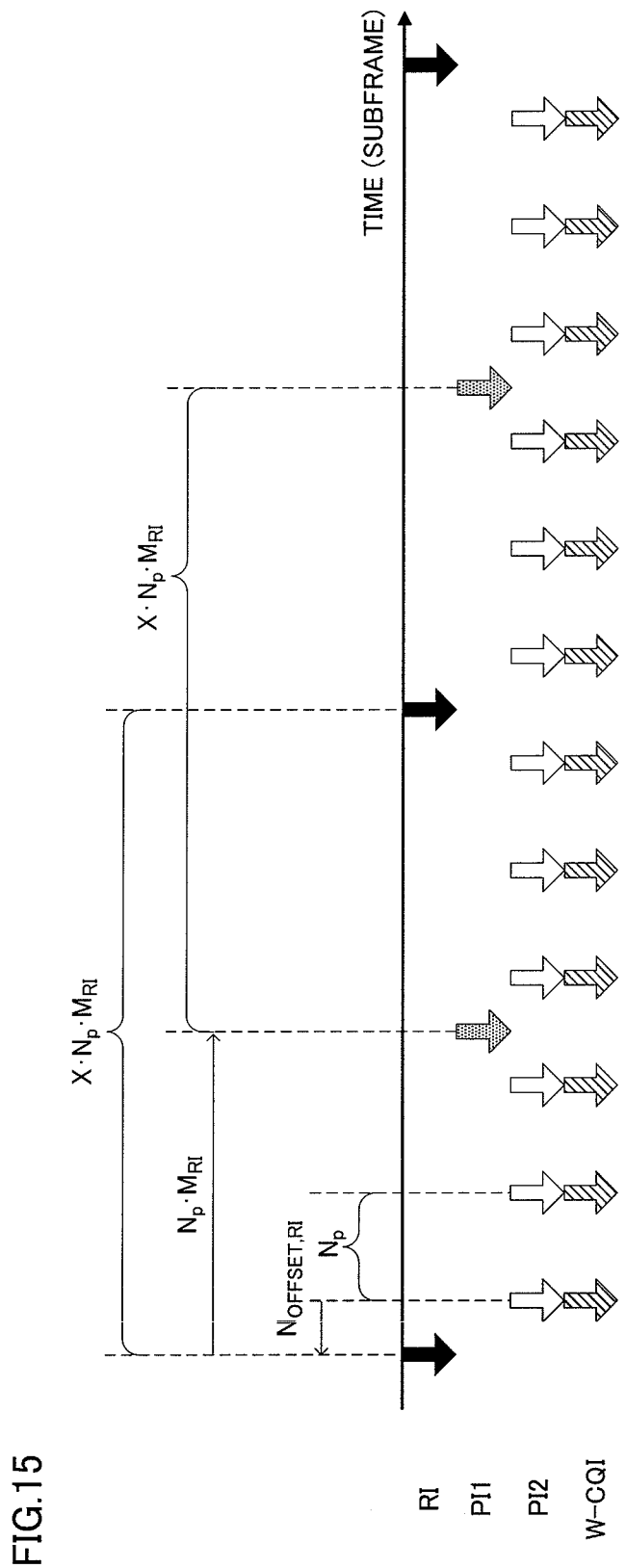
FIG. 15 represents still another exemplary feedback mode according to the first embodiment of the present invention.

FIG. 15 represents a further another exemplary feedback mode according to the present embodiment (feedback mode 1A). Feedback mode 1A of FIG. 15 is an extended feedback mode (second feedback mode). In this feedback mode 1A, RI, PI1, PI2, and W-CQI are reported periodically. More specifically, in the subframe meeting equation (1), W-CQI and PI2 are fed back; in the subframe meeting equation (5), RI is fed back; in the subframe meeting equation (6), PI1 is fed back.

$$(10 \times n_f + \lfloor n_s/2' - N_{OFFSET,CQI} - N_{OFFSET,RI} \rfloor) \bmod (X \cdot N_P \cdot M_{RI}) = 0 \quad (5)$$

$$(10 \times n_f + \lfloor n_s/2 \rfloor - N_{OFFSET,CQI} - N_{OFFSET,RI} - (N_P \cdot M_{RI})) \bmod (X \cdot N_P \cdot M_{RI}) = 0 \quad (6)$$

In the equations, $n_f$ is the system frame number assigned to each radio frame; $n_s$ is the slot number assigned to each slot in the radio frame; and $N_P$, $M_{RI}$, $N_{OFFSET, CQI}$, and $N_{OFFSET, RI}$ are values set for the terminal device by the base station device, as set forth above, X is a value corresponding to whether the mode is an extended feedback mode or a backward compatible feedback mode (a parameter indicating either an extended feedback mode or a backward compatible feedback mode). By way of example, X is set to the value of 2 or 1.

When X is set at 1, equation (5) and equation (6) both become equivalent to equation (2). The parameter setting of RI, W-CQI (W-PMI) in feedback mode 1 coincides with the parameter setting of RI (PI1), W-CQI (PI2) in feedback mode 1A. Here, in the subframe in which RI is transmitted, PI1 may be transmitted together with RI, or not transmitted. When X is set at 2, the transmission interval of RI becomes two times the transmission interval in feedback mode 1, leading to an extended version of transmitting PI1 in an available subframe. Thus, in feedback mode 1A, PI2 is reported instead of W-PMI in feedback mode 1 that is a backward compatible feedback mode, and RI and PI1 are reported using the resource of RI reporting in feedback mode 1. Thus, the overhead of the uplink required for reporting can be alleviated. Furthermore, the collision between the reports of different terminal devices can be reduced. In addition, since the report period of PI1 and PI2 can be configured different from each other, efficient feedback of partial precoder information conforming to the role of respective partial precoder information is allowed.

X can be configured at the terminal device in step S1401 of FIG. 14. Alternatively, X can be configured in association with another parameter such as the transmission mode. For example, processing such that the terminal device sets the value of X at 2 when the base station terminal sets an extended transmission mode for the terminal device, and the terminal device sets the value of X at 1 when the backward compatible transmission mode is set may be carried out. Accordingly, X does not have to be specified individually.

Figure 16:
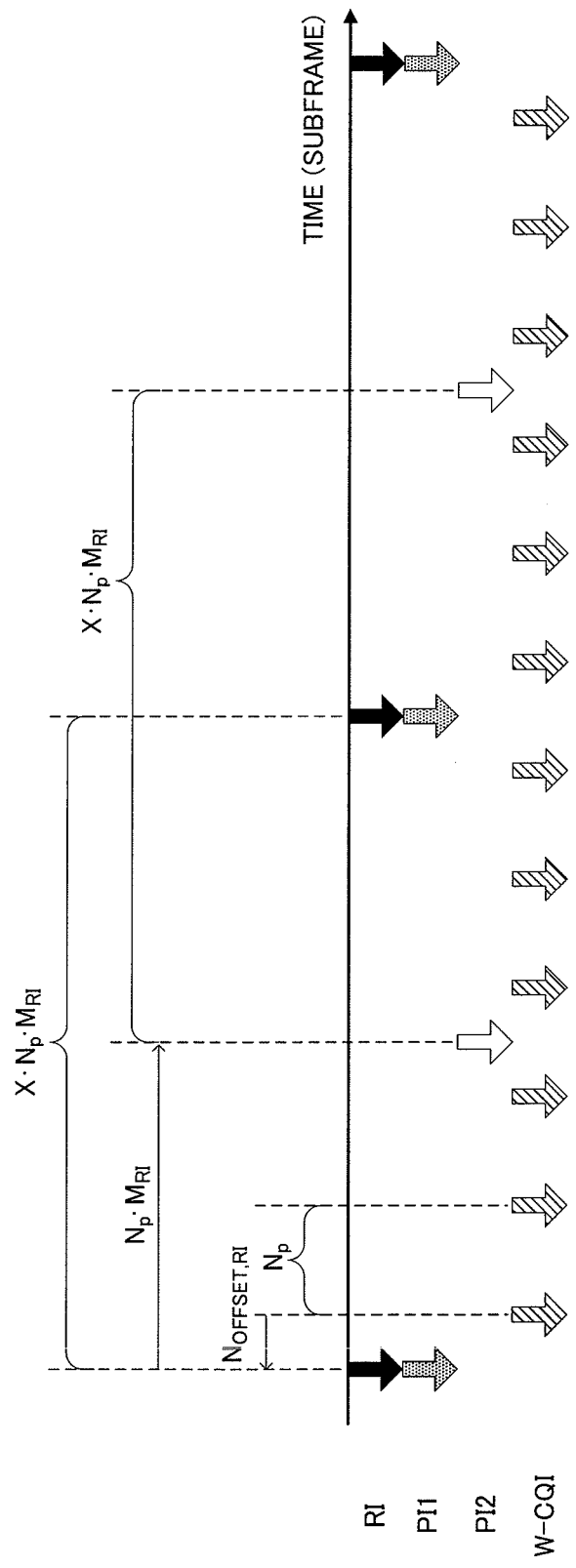
FIG. 16 represents still another exemplary feedback mode according to the first embodiment of the present invention.

FIG. 16 represents a further exemplary feedback mode according to the present embodiment (feedback mode 1B). Feedback mode 1B of FIG. 16 is an extended feedback mode (second feedback mode). In this feedback mode 1B, RI, PI1, PI2, and W-CQI are reported periodically. Specifically, in the subframe meeting equation (1), W-CQI is fed back; in the subframe meeting equation (5), RI and PI1 are fed back; in the subframe meeting equation (6), PI2 is fed back.

When X is set at 1, equation (5) and equation (6) both become equivalent to equation (2). The parameter setting of RI, W-CQI (W-PMI) in feedback mode 1 coincides with the parameter setting of RI (PI1, PI2) and W-CQI in feedback mode 1B. Here, in the subframe in which RI is transmitted, PI1 or PI2 may be transmitted together with RI, or not transmitted. When X is set at 2, the transmission interval of RI becomes two times the transmission interval in feedback mode 1, leading to an extended version of transmitting PI2 in an available subframe, and reporting PI1 in the same subframe as RI. Thus, in feedback mode 1B, RI, PI1, and PI2 are reported using the resource of the RI report in feedback mode 1 that is a backward compatible feedback mode. Accordingly, the overhead of the uplink required for reporting can be alleviated. Furthermore, the collision between the reports of different terminal devices can be reduced. Moreover, the amount of information of PI2 can be increased, as compared to PI1 reported simultaneous to RI. Therefore, efficient feedback of partial precoder information conforming to the role of respective partial precoder information is allowed.

Figure 17:
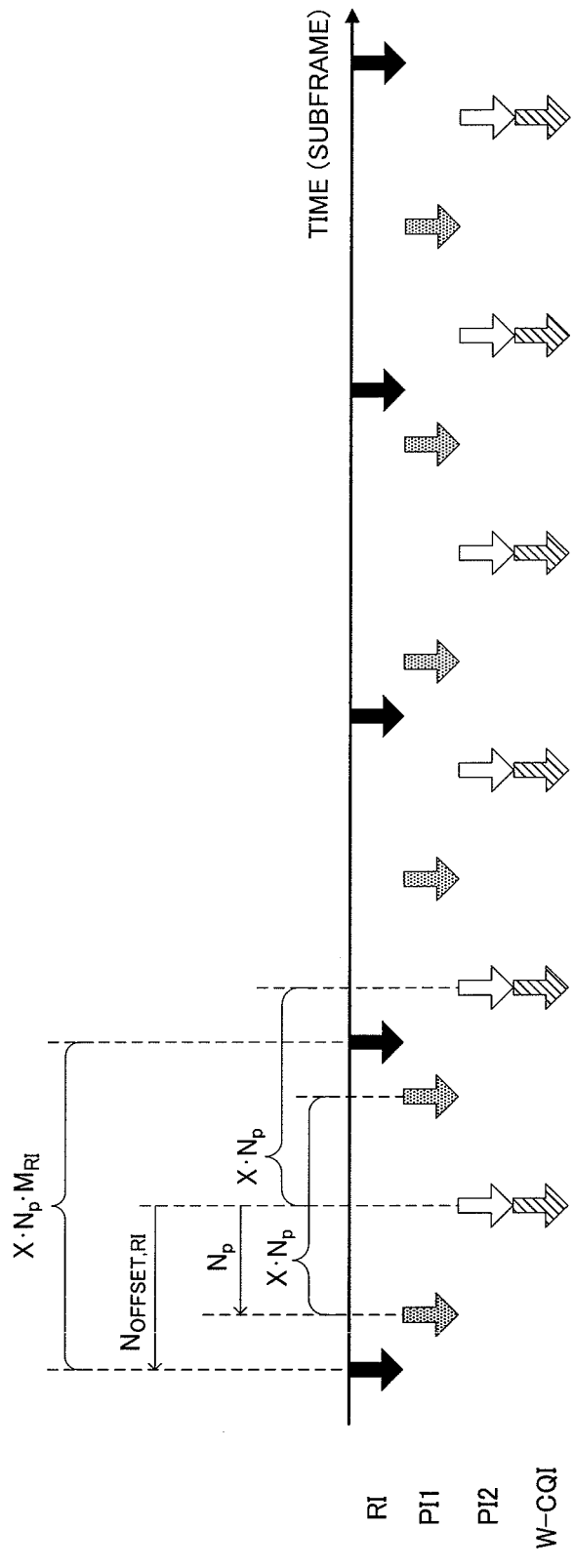
FIG. 17 represents still another exemplary feedback mode according to the first embodiment of the present invention.

FIG. 17 represents still another exemplary feedback mode according to the present embodiment (feedback mode 1C), Feedback mode 1C of FIG. 17 is an extended feedback mode (second feedback mode). In this feedback mode IC, RI, PI1, PI2, and W-CQI are reported periodically. More specifically, in the subframe meeting equation (7), W-CQI and PI2 are fed back; in the subframe meeting equation (5), RI is fed back; in the subframe meeting equation (8), PI1 is fed back.

$$(10 \times n_f + \lfloor n_s/2 \rfloor - N_{OFFSET,CQI}) \bmod (X \cdot N_P) = 0 \quad (7)$$

$$(10 \times n_f + \lfloor n_s/2 \rfloor - N_{OFFSET,CQI} - N_P) \bmod (X \cdot N_P) = 0 \quad (8)$$

When X is set at 1, equation (7) and equation (8) both become equivalent to equation (2). The parameter setting of RI, W-CQI (W-PMI) in feedback mode 1 coincides with the parameter setting of RI, W-CQI (PI1, PI2) in feedback mode 1C. Here, in the subframe in which W-CQI is transmitted, PI1 may be transmitted together with W-CQI, or not transmitted. When X is set at 2, the transmission interval of W-CQI becomes two times the transmission interval in feedback mode 1, leading to an extended version of transmitting PI1 in an available subframe. Thus, in feedback mode 1C, W-CQI, PI1, and PI2 are reported using the resource of W-CQI or W-PMI reporting in feedback mode 1 that is a backward compatible feedback mode. Thus, the overhead of the uplink required for reporting can be alleviated. Furthermore, the collision between the reports of different terminal devices can be reduced. In addition, since the reporting frequency of PI1 and/or PI2 can be increased as compared to RI, precoding processing corresponding to channel variation is allowed.

Figure 18:
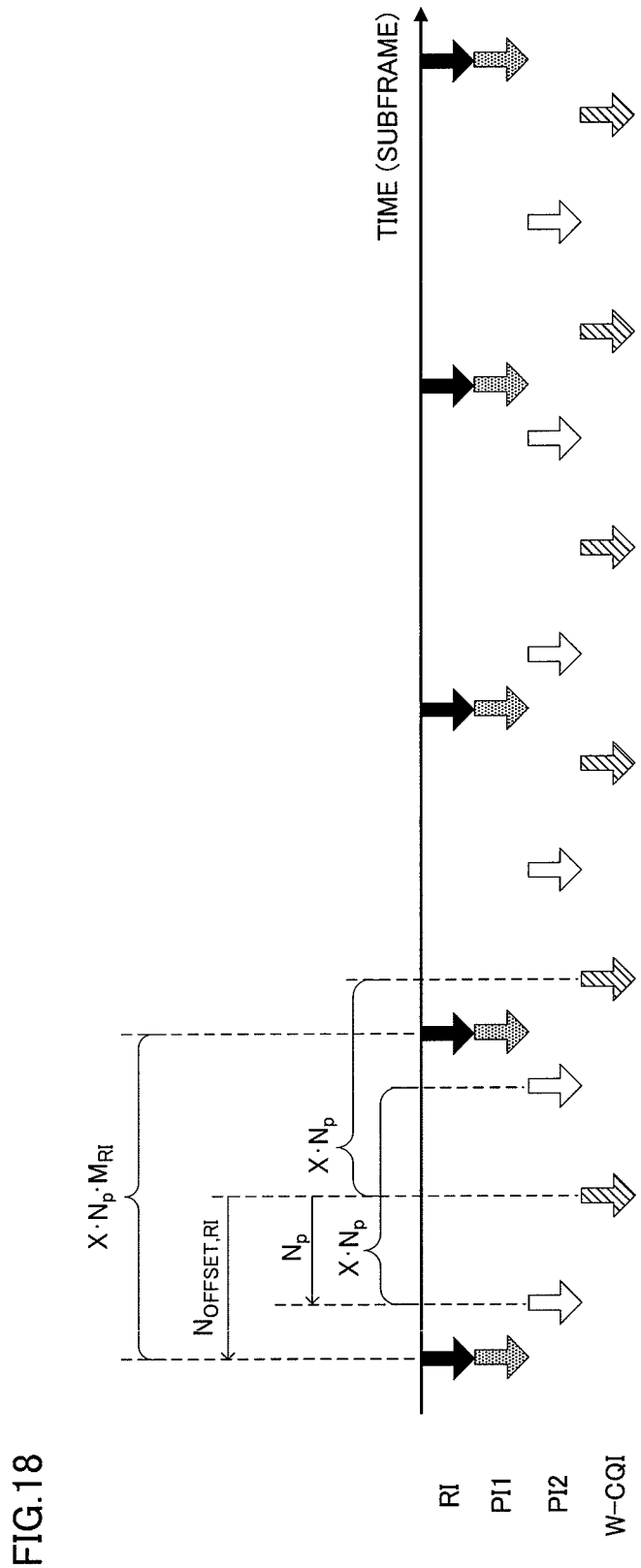
FIG. 18 represents still another exemplary feedback mode according to the first embodiment of the present invention.

FIG. 18 represents still another example (feedback mode 1D) according the present embodiment. Feedback mode 1D of FIG. 18 is an extended feedback mode (second feedback mode). In this feedback mode 1D, RI, PI1, PI2, and W-CQI are reported periodically. More specifically, in the subframe meeting equation (7), W-CQI is fed back; in the subframe meeting equation (5), RI and PI1 are fed back; in the subframe meeting equation (8), PI2 is fed back.

When X is set at 1, equation (7) and equation (8) both become equivalent to equation (2). The parameter setting of RI, W-CQI (W-PMI) in feedback mode 1 coincides with the parameter setting of RI (PI1), and W-CQI (PI2) in feedback mode 1D. Here, in the subframe in which W-CQI is transmitted, PI1 may be transmitted together with W-CQI, or not transmitted. When X is set at 2, the transmission interval of W-CQI becomes two times the transmission interval in feedback mode 1, leading to an extended version of transmitting PI1 in an available subframe. Thus, in feedback mode 1D, R1 and PI1 are reported using the resource of RI reporting in feedback mode 1 that is a backward compatible feedback mode, and W-CQI and PI2 are reported using the resource of W-CQI and W-PMI reporting in feedback mode 1. Thus, the overhead of the uplink required for reporting can be alleviated. Furthermore, the collision between the reports of different terminal devices can be reduced. In addition, since the amount of information of PI2 to be reported in one subframe can be increased, a report of detailed partial precoder information is allowed.

Figure 19:
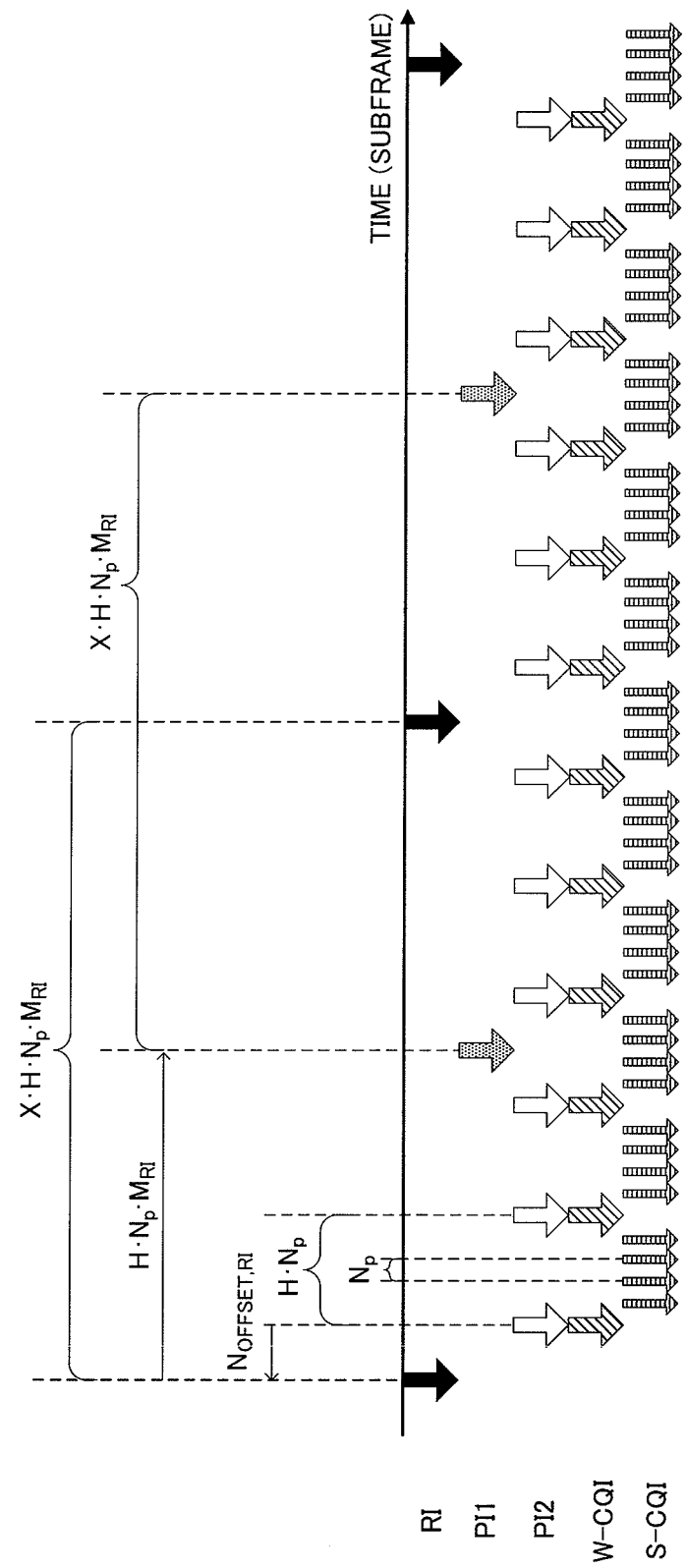
FIG. 19 represents still another exemplary feedback mode according to the first embodiment of the present invention.

FIG. 19 represents a further another exemplary feedback mode according to the present embodiment (feedback mode 2A). Feedback mode 2A of FIG. 19 is an extended feedback mode (second feedback mode). In this feedback mode 2A, RI, PI1, PI2, W-CQI and S-CQI are reported periodically. More specifically, in the subframe meeting equation (3), W-CQI and PI2 are fed back; in the subframe meeting equation (9), RI is fed back; in the subframe meeting equation (10), PI1 is fed back.

$$(10 \times n_f + \lfloor n_s/2 \rfloor - N_{OFFSET,CQI} - N_{OFFSET,RI}) \bmod (X \cdot H \cdot N_P \cdot M_{RI}) = 0 \quad (9)$$

$$(10 \times n_f + \lfloor n_s/2 \rfloor - N_{OFFSET,CQI} - N_{OFFSET,RI} - (H \cdot N_P M_{RI})) \bmod (X \cdot H \cdot N_P M_{RI}) = 0 \quad (10)$$

When X is set at 1, equation (9) and equation (10) both become equivalent to equation (4). The parameter setting of RI, W-CQI (W-PMI) and S-CQI in feedback mode 2 coincide with the parameter setting of RI (PI1), W-CQI (PI2) and S-CQI in feedback mode 2A. Here, in the subframe in which RI is transmitted, PI1 may be transmitted together with RI, or not transmitted. When X is set at 2, the transmission interval of RI becomes two times the transmission interval in feedback mode 2, leading to an extended version of transmitting PI1 in an available subframe. Here, H=J·K+1 is established. In feedback mode 2A, likewise with feedback mode 2, the reporting of CQI (S-CQI) in the J BPs is repeated for K cycles. Thus, in feedback mode 2A, PI2 is reported instead of W-PMI in feedback mode 2 that is a backward compatible feedback mode, and RI and PI1 are reported using the resource of RI reporting in feedback mode 2. Accordingly, the overhead of the uplink required for reporting can be alleviated. Furthermore, the collision between the reports of different terminal devices can be reduced. In addition, since the report period of PI1 and PI2 can be configured different from each other, efficient feedback of partial precoder information conforming to the role of respective partial precoder information is allowed.

Figure 20:
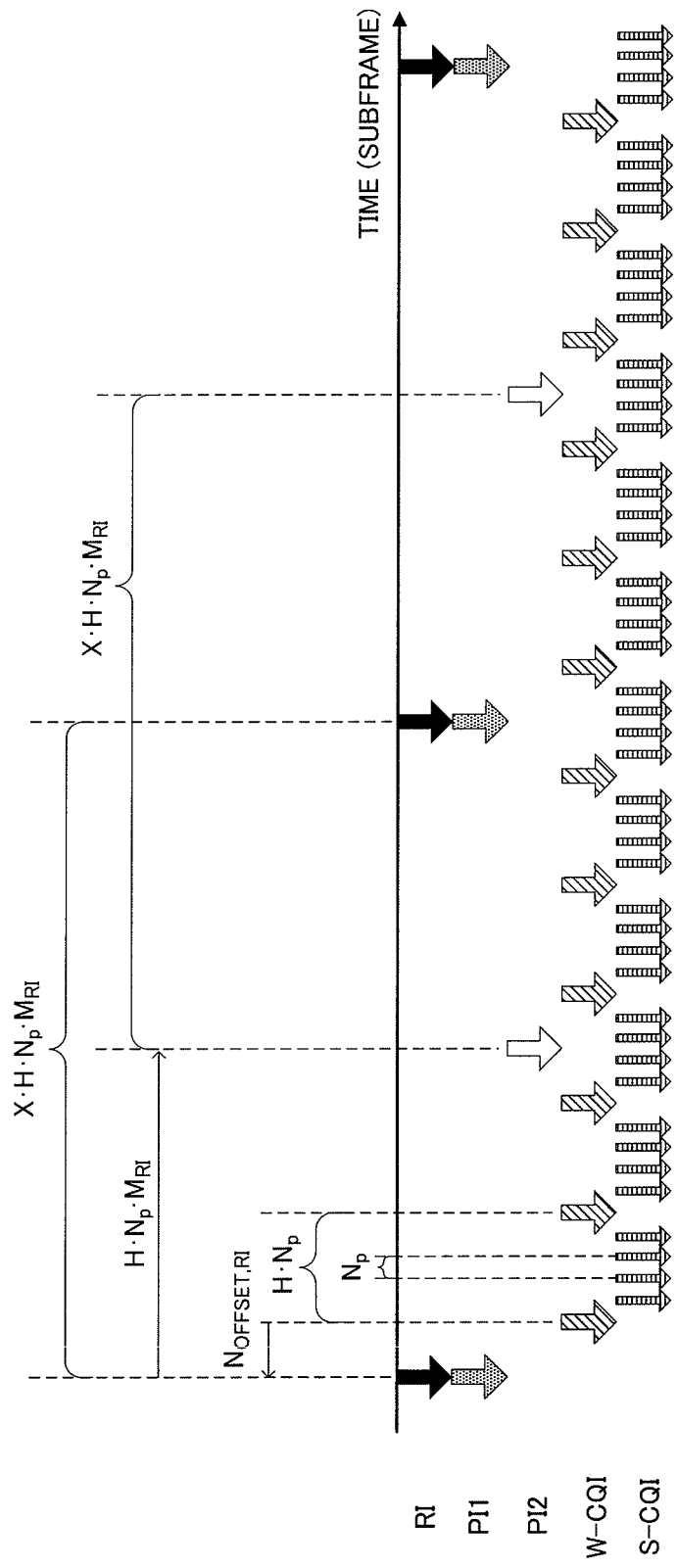
FIG. 20 represents still another exemplary feedback mode according to the first embodiment of the present invention.

FIG. 20 represents a further another exemplary feedback mode according to the present embodiment (feedback mode 2B). Feedback mode 2B of FIG. 20 is an extended feedback mode (second feedback mode). In this feedback mode 2B, RI, PI1, PI2, W-CQI, and S-CQI are reported periodically. More specifically, in the subframe meeting equation (3), W-CQI is fed back; in the subframe meeting equation (9), RI and PI1 are fed back; in the subframe meeting equation (10), PI2 is fed back.

When X is set at 1, equation (9) and equation (10) both become equivalent to equation (4). The parameter setting of RI, W-CQI (W-PMI) and S-CQI in feedback mode 2 coincides with the parameter setting of RI (PI1, PI2), W-CQI and S-CQI in feedback mode 2B. Here, in the subframe in which RI is transmitted, PI1 or PI2 may be transmitted together with RI, or not transmitted. When X is set at 2, the transmission interval of RI becomes two times the transmission interval in feedback mode 2, leading to an extended version of transmitting PI2 in an available subframe. Here, H=J·K+1 is established. In feedback mode 2B, likewise with feedback mode 2, the reporting of CQI (S-CQI) in the J BPs is repeated for K cycles. Thus, in feedback mode 2B, RI, PI1 and PI2 are reported using the resource of RI reporting in feedback mode 2 that is a backward compatible feedback mode. Thus, the overhead of the uplink required for reporting can be alleviated. Furthermore, the collision between the reports of different terminal devices can be reduced. In addition, since the amount of information of PI2 can be increased, as compared to PI1 reported simultaneous to RI, efficient feedback of partial precoder information conforming to the role of respective partial precoder information is allowed.

Figure 21:
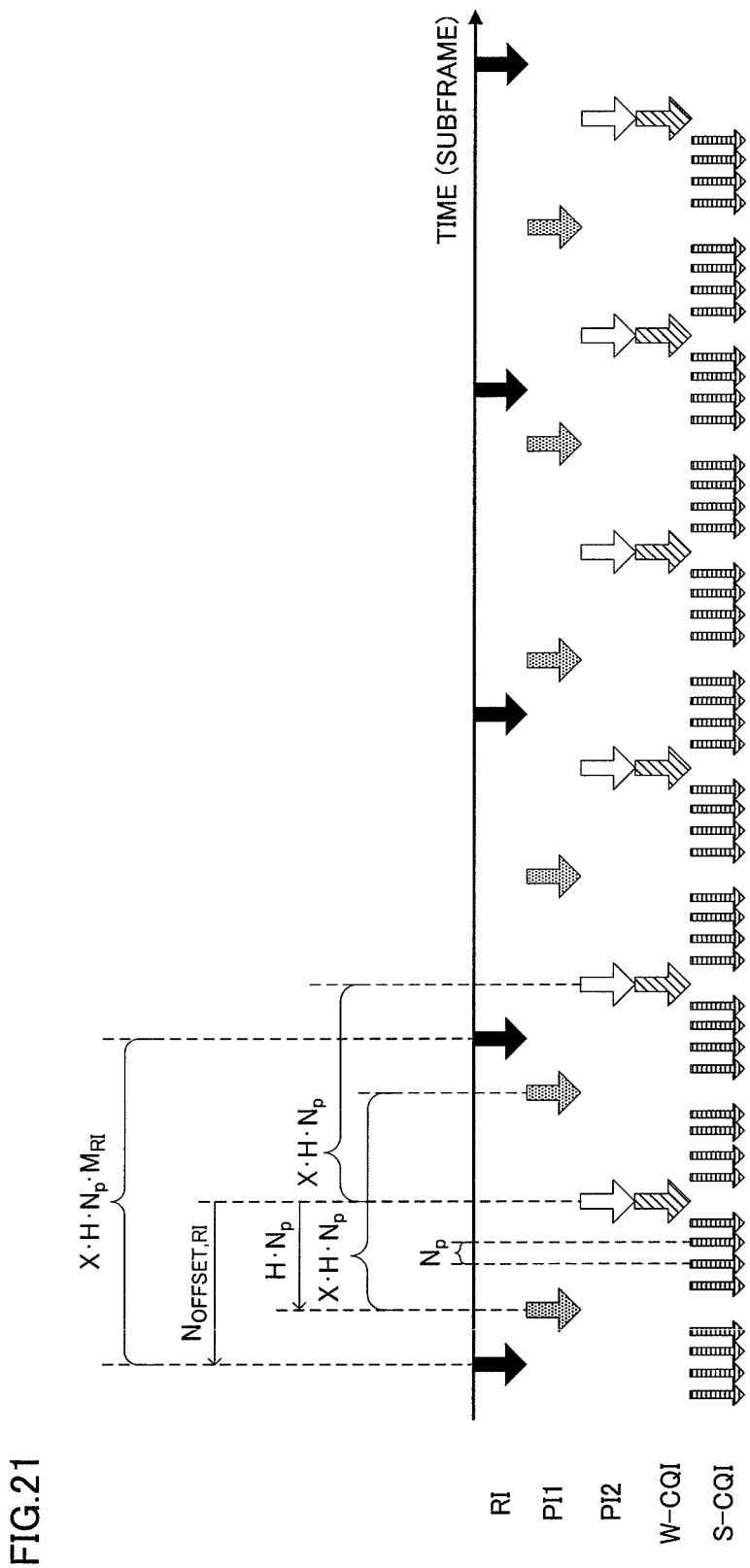
FIG. 21 represents still another exemplary feedback mode according to the first embodiment of the present invention.

FIG. 21 represents a further another exemplary feedback mode according to the present embodiment (feedback mode 2C). Feedback mode 2C of FIG. 21 is an extended feedback mode (second feedback mode). In this feedback mode 2C, RI, PI1, PI2, W-CQI, and S-CQI are reported periodically. More specifically, in the subframe meeting equation (11), W-CQI and PI2 are fed back; in the subframe meeting equation (9), RI is fed back; in the subframe meeting equation (12), PI1 is fed back.

$$(10 \times n_f + \lfloor n_s/2 \rfloor - N_{OFFSET,CQI}) \mod(X \cdot H \cdot N_P) = 0 \quad (11)$$

$$(10 \times n_f + \lfloor n_s/2 \rfloor - N_{OFFSET,CQI} - H \cdot N_P) \mod(X \cdot H \cdot N_P) = 0 \quad (12)$$

When X is set at 1, equation (11) and equation (12) both become equivalent to equation (3). The parameter setting of RI, W-CQI (W-PMI) and S-CQI in feedback mode 2 coincides with the parameter setting of RI, W-CQI (PI1, PI2) and S-CQI in feedback mode 2C. Here, in the subframe in which W-CQI is transmitted, PI1 may be transmitted together with W-CQI, or not transmitted. When X is set at 2, the transmission interval of W-CQI becomes two times the transmission interval in feedback mode 2, leading to an extended version of transmitting PI1 in an available subframe. Here, H=J·K+1 is established. In feedback mode 2C, likewise with feedback mode 2, the reporting of CQI (S-CQI) in the J BPs is repeated for K cycles. It is to be noted that, in feedback mode 2C, K cycles will be repeated between the report of PI1 and the report of W-CQI (PI2). From a different point of view, X·K cycles will be repeated between the reports of W-CQI (PI2). Thus, in feedback mode 2C, W-CQI, PI1, and PI2 are reported using the resource of the W-CQI or W-PMI report in feedback mode 2 that is a backward compatible feedback mode. Thus, the overhead of the uplink required for reporting can be alleviated. Furthermore, the collision between the reports of different terminal devices can be reduced. In addition, since the reporting frequency of PI1 and/or PI2 can be increased as compared to RI, precoding processing corresponding to channel variation is allowed.

Figure 22:
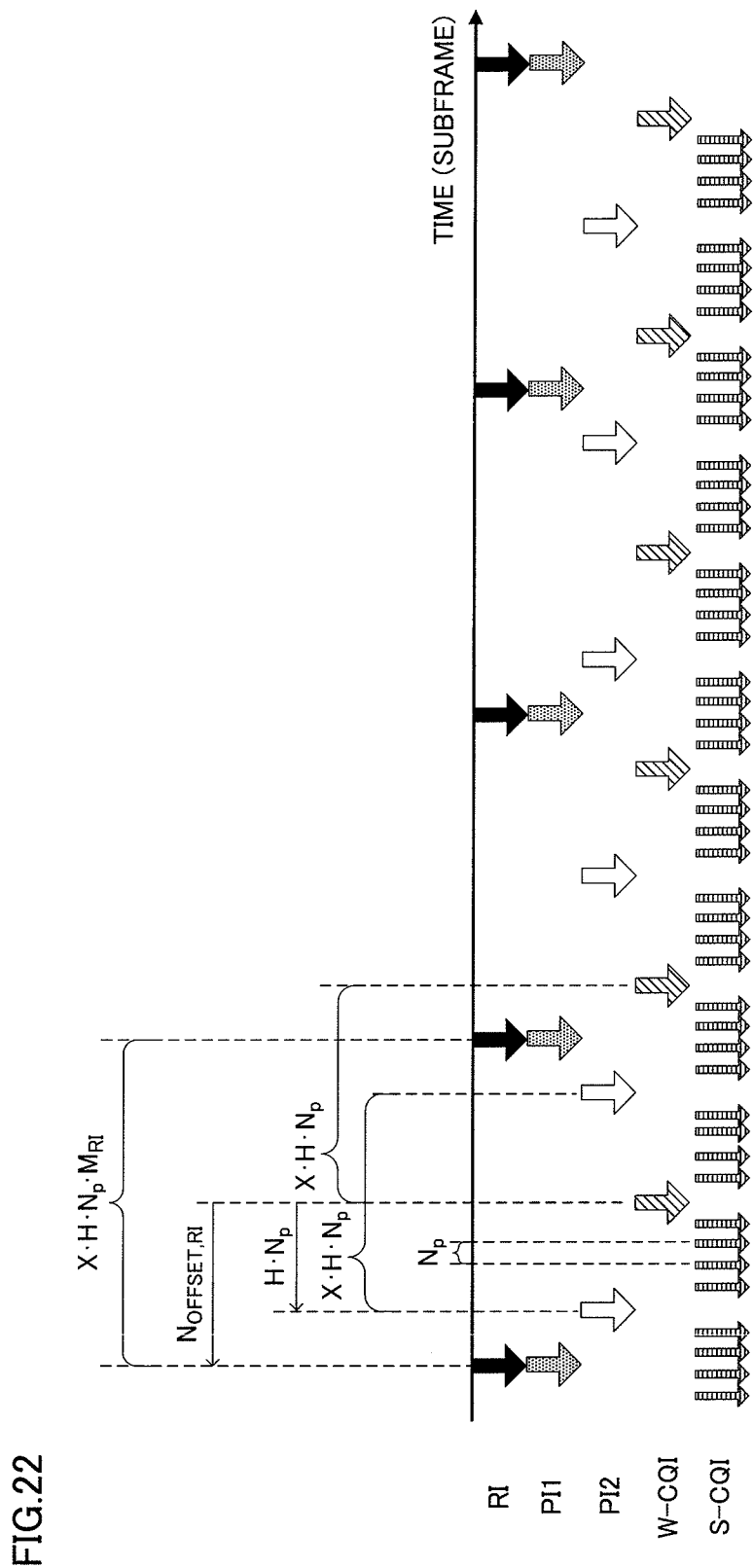
FIG. 22 represents still another exemplary feedback mode according to the first embodiment of the present invention.

FIG. 22 represents a further another exemplary feedback mode according to the present embodiment (feedback mode 2D). Feedback mode 2D of FIG. 22 is an extended feedback mode (second feedback mode). In this feedback mode 2D, RI, PI1, PI2, W-CQI, and S-CQI are reported periodically. More specifically, in the subframe meeting equation (11), W-CQI is fed back; in the subframe meeting equation (9), RI and PI1 are fed back; in the subframe meeting equation (12), PI2 is fed back.

When X is set at 1, equation (11) and equation (12) both become equivalent to equation (3). The parameter setting of RI, W-CQI (W-PMI) and S-CQI in feedback mode 2 coincides with the parameter setting of RI (PI1), W-CQI (PI2) and S-CQI in feedback mode 2C. Here, in the subframe in which W-CQI is transmitted, PI2 may be transmitted together with W-CQI, or not transmitted. When X is set at 2, the transmission interval of W-CQI becomes two times the transmission interval in feedback mode 2, leading to an extended version of transmitting PI2 in an available subframe. Here, H=J·K+1 is established. In feedback mode 2D, likewise with feedback mode 2, the reporting of CQI (S-CQI) in the J BPs is repeated for K cycles. It is to be noted that, in feedback mode 2D, K cycles will be repeated between the report of PI2 and the report of W-CQI. From a different point of view, X·K cycles will be repeated between the reports of W-CQI. Thus, in feedback mode 2D, RI and PI1 are reported using the resource of RI reporting in feedback mode 2 that is a backward compatible feedback mode, and W-CQI and PI2 are reported using the resource of the W-CQI and W-PMI report in feedback mode 2. Thus, the overhead of the uplink required for reporting can be alleviated. Furthermore, the collision between the reports of different terminal devices can be reduced. In addition, since the amount of information of PI2 to be reported in one subframe can be increased, a report of detailed partial precoder information is allowed.

Figure 23:
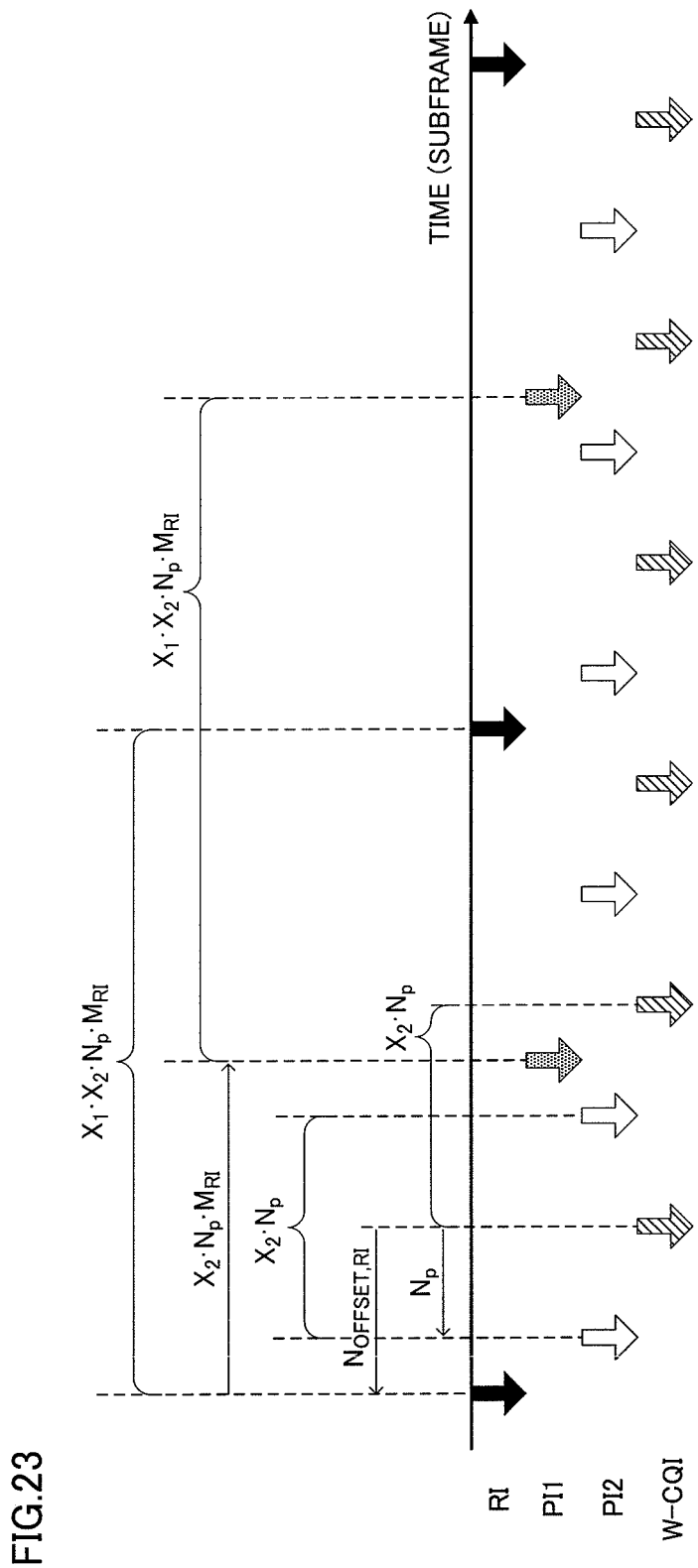
FIG. 23 represents still another exemplary feedback mode according to the first embodiment of the present invention.

FIG. 23 represents a further another exemplary feedback mode according to the present embodiment (feedback mode 1E). Feedback mode 1E of FIG. 23 is an extended feedback mode (second feedback mode). In this feedback mode 1E, RI, PI1, PI2, and W-CQI are reported periodically. More specifically, in the subframe meeting equation (13), W-CQI is fed back; in the subframe meeting equation (14), RI is fed back; in the subframe meeting equation (15), PI1 is fed back; in the subframe meeting equation (16), PI2 is fed back.

$$(10 \times n_f + \lfloor n_s/2 \rfloor - N_{OFFSET,CQI}) \mod(X_2 \cdot N_P) = 0 \quad (13)$$

$$(10 \times n_f + \lfloor n_s/2 \rfloor - N_{OFFSET,CQI} - N_{OFFSET,RI}) \mod(X_1 \cdot X_2 \cdot N_P \cdot M_{RI}) = 0 \quad (14)$$

$$(10 \times n_f + \lfloor n_s/2 \rfloor - N_{OFFSET,CQI} - N_{OFFSET,RI} - (X_2 \cdot N_P \cdot M_{RI})) \mod(X_1 \cdot X_2 \cdot N_P \cdot M_{RI}) = 0 \quad (15)$$

$$(10 \times n_f + \lfloor n_s/2 \rfloor - N_{OFFSET,CQI} - N_P) \mod(X_2 N_P) = 0 \quad (16)$$

In the equations, $X_1$ and $X_2$ are values corresponding to whether the mode is an extended feedback mode or a backward compatible feedback mode (a parameter indicating either an extended feedback mode or a backward compatible feedback mode). By way of example, $X_1$ and $X_2$ are set to the value of 2 or 1.

When $X_1$ and $X_2$ are both set at 1, equation (13) and equation (16) both become equivalent to equation (1). Equation

(14) and equation (15) both become equivalent to equation (2). The parameter setting of RI and W-CQI (W-PMI) in feedback mode 1 coincides with the parameter setting of RI (PI1) and W-CQI (PI2) in feedback mode 1E. Here, in the subframe in which RI is transmitted, PI1 may be transmitted together with RI, or not transmitted. In the subframe in which W-CQI is transmitted, PI2 may be transmitted together with W-CQI, or not transmitted. When $X_2$ is set at 2, the transmission interval of W-CQI becomes two times the transmission interval in feedback mode 1, leading to an extended version of transmitting PI2 in an available subframe. Further, when $X_1$ is set at 2 and $X_2$ is set at 1, the transmission interval of RI becomes two times the transmission interval in feedback mode 1, leading to an extended version of transmitting PI1 in an available subframe. Further, when $X_1$ and $X_2$ are both set at 2, the transmission interval of W-CQI becomes two times the transmission interval in feedback mode 1, and the transmission interval of W-CQI becomes four times the transmission interval in feedback mode 1, leading to an extended version of transmitting PI1 and PI2 in an available subframe. Thus, in feedback mode 1E, PI2 is reported instead of W-PMI in feedback mode 1 that is a backward compatible feedback mode, and RI and PI1 are reported using the resource of RI reporting in feedback mode 1. Accordingly, the overhead of the uplink required for reporting can be alleviated. Furthermore, the collision between the reports of different terminal devices can be reduced. In addition, since the report period of PI1 and PI2 can be configured different from each other, efficient feedback of partial precoder information conforming to the role of respective partial precoder information is allowed.

$X_1$ or $X_2$ may be set at the terminal device in step S1401 of FIG. 14. $X_1$ and $X_2$ may be set individually, or set to always have the same value. Alternatively, they may be set in association with another parameter such as the transmission mode. For example, processing such that the terminal device sets the value of $X_1$ and $X_2$ at 2 when the base station terminal sets an extended transmission mode for the terminal device, and the terminal device sets the value of $X_1$ and $X_2$ at 1 when the backward compatible transmission mode is set may be carried out. Accordingly, $X_1$ or $X_2$ does not have to be specified individually.

Figure 24:
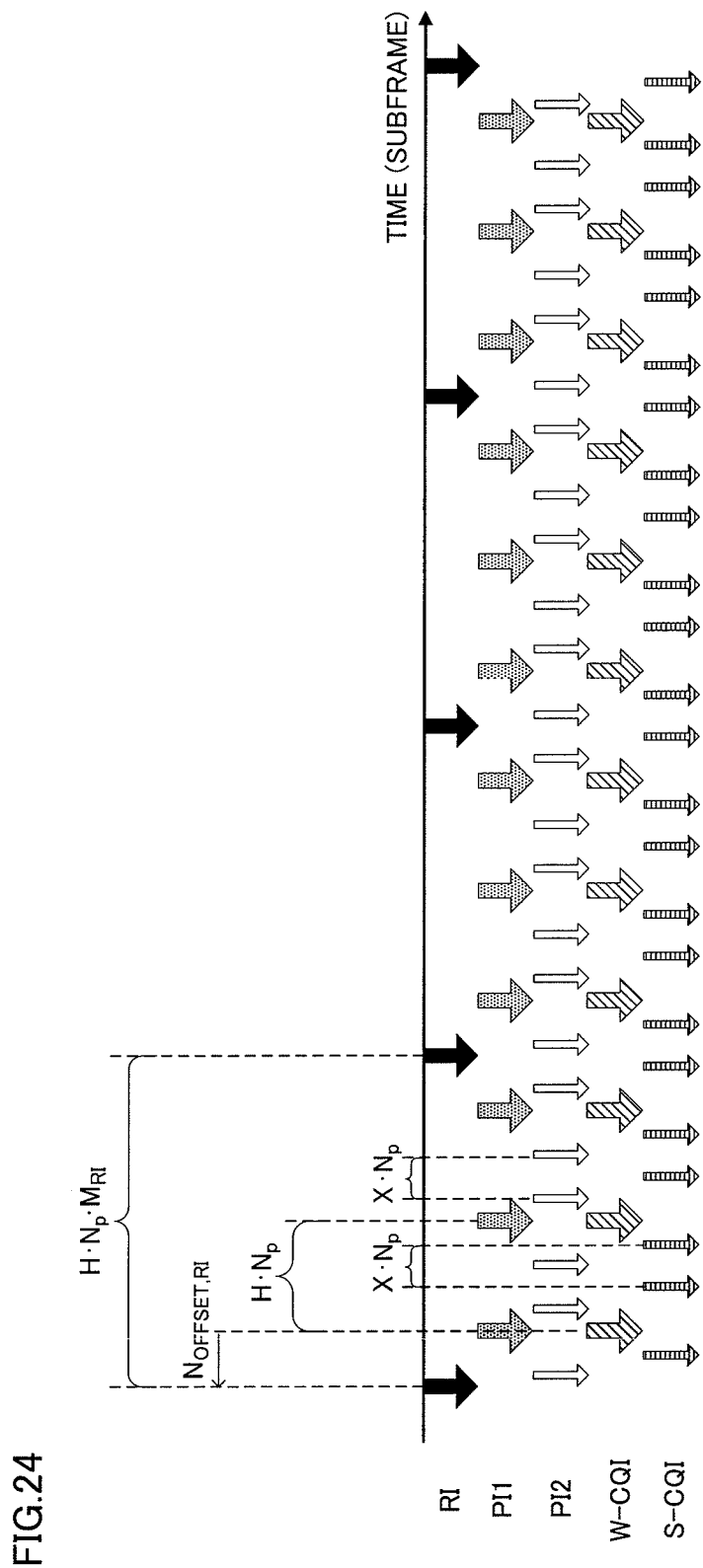
FIG. 24 represents still another exemplary feedback mode according to the first embodiment of the present invention.

FIG. 24 represents a further another exemplary feedback mode according to the present embodiment (feedback mode 2E). Feedback mode 2E of FIG. 24 is an extended feedback mode (second feedback mode). In this feedback mode 2E, RI, PI1, PI2, W-CQI, and S-CQI are reported periodically. More specifically, in the subframe meeting equation (3), W-CQI and PI1 are fed back; in the subframe meeting equation (4), RI is fed back. S-CQI and PI2 are reported alternately in the period of $H \cdot N_P$ subframes that is the report period of W-CQI. Each of S-CQI and PI2 is reported J·K times in the period of $X \cdot N_P$. Here, H=X·J·K+1 is established. Each of S-CQI and PI2 reported J·K times is the CQI and PI typical of BP. The CQI or PI in the J BPs is sequentially reported alternately, starting from the CQI or PI in the BP of lower frequency. This report of CQI or PI is carried out J times to cover the downlink bandwidth. By further repeating the report of J times for K cycles, the report of J·K times is carried out during the term of $H \cdot N_P$ subframes.

When X is set at 1, the parameter setting of RI, W-CQI (W-PMI) and S-CQI in feedback mode 2 coincides with the parameter setting of RI, W-CQI (PI1) and S-CQI (PI2) in feedback mode 2E. Here, in the subframe in which W-CQI is transmitted, PI1 may be transmitted together with W-CQI, or not transmitted. Furthermore, in the subframe in which S-CQI is transmitted, PI2 may be transmitted together with S-CQI, or not transmitted. When X is set at 2, the transmission interval of W-CQI becomes the transmission interval K+1) $N_P$ to (2·J·K+1) $N_P$ in feedback mode 2, leading to an extended version of transmitting PI2 in an available subframe. Thus, in feedback mode 2E, PI1 is reported instead of W-PMI in feedback mode 2 that is a backward compatible feedback mode, and S-CQI and PI2 are reported using the resource of S-CQI reporting in feedback mode 2. Thus, the overhead of the uplink required for reporting can be alleviated. Furthermore, the collision between the reports of different terminal devices can be reduced. In addition, since the report period of PI1 and PI2 can be configured different from each other, efficient feedback of partial precoder information conforming to the role of respective partial precoder information is allowed. This is suitable for reporting PI2 in the BP unit since more reporting opportunity can be scheduled for PI2.

Figure 25:
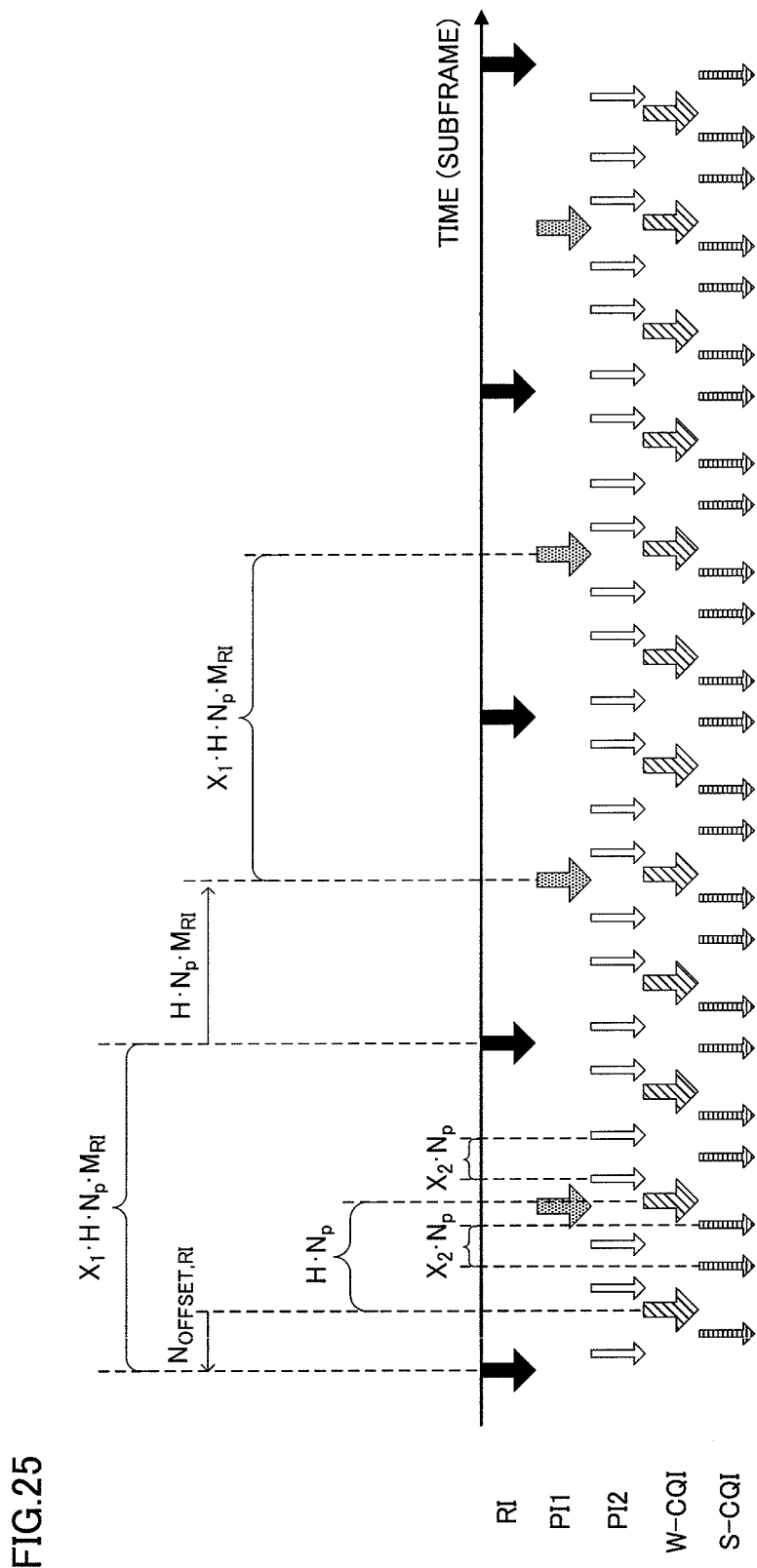
FIG. 25 represents still another exemplary feedback mode according to the first embodiment of the present invention.

FIG. 25 represents a further another exemplary feedback mode according to the present embodiment (feedback mode 2F). Feedback mode 2F of FIG. 25 is an extended feedback mode (second feedback mode). In this feedback mode 2F, RI, PI1, PI2, W-CQI, and S-CQI are reported periodically. More specifically, in the subframe meeting equation (3), W-CQI is fed back; in the subframe meeting equation (17), RI is fed back; in the subframe meeting equation (18), PI1 is fed back. S-CQI and PI2 are reported alternately in the period of $H \cdot N_P$ subframes that is the report period of W-CQI. Each of S-CQI and PI2 is reported J·K times in the period of $X_2 \cdot N_P$. Here, H=$X_2$·J·K+1 is established. Each of S-CQI and PI2 reported J·K times is the CQI and PI typical of BP. The CQI or PI in the J BPs is sequentially reported alternately, starting from the CQI or PI in the BP of lower frequency. This report of CQI or PI is carried out J times to cover the downlink bandwidth. By further repeating the report of J times for K cycles, the report of J·K times is carried out during the term of $H \cdot N_P$ subframes.

$$(10 \times n_f + \lfloor n_s/2 \rfloor - N_{OFFSET,CQI} - N_{OFFSET,RI}) \bmod (X_1 \cdot H \cdot N_P \cdot M_{RI}) = 0 \quad (17)$$

$$(10 \times n_f + \lfloor n_s/2 \rfloor - N_{OFFSET,CQI} N_{OFFSET,RI} - (H \cdot N_P \cdot M_{RI})) \bmod (X_1 \cdot H \cdot N_P \cdot M_{RI}) = 0 \quad (18)$$

When $X_1$ and $X_2$ are both set at 1, equation (17) and equation (18) both become equivalent to equation (4). The parameter setting of RI, W-CQI (W-PMI) and S-CQI in feedback mode 2 coincides with the parameter setting of RI (PI1), W-CQI and S-CQI (PI2) in feedback mode 2F. Here, in the subframe in which RI is transmitted, PI1 may be transmitted together with RI, or not transmitted. In the subframe in which S-CQI is transmitted, PI2 may be transmitted together with S-CQI, or not transmitted. When $X_2$ is set at 2, the transmission interval of W-CQI becomes the transmission interval (J·K+1) $N_P$ to (2·J·K+1) $N_P$ in feedback mode 2, leading to an extended version of transmitting PI2 in an available subframe. Further, when $X_1$ is set at 2 and $X_2$ is set at 1, the transmission interval of RI becomes two times the transmission interval in feedback mode 2, leading to an extended version of transmitting PI1 in an available subframe. Further, when $X_1$ and $X_2$ are both set at 2, the transmission interval of W-CQI becomes the transmission interval (J·K+1) $N_P$ to (2·J·K+1) $N_P$ of W-CQI in feedback mode 2, and the transmission interval of RI becomes the transmission interval (J·K+1) $N_P \cdot M_{RI}$ to 2·(2·J·K+1) $N_P \cdot M_{RI}$ in feedback mode 2, leading to an extended version of transmitting PI1 and PI2 in an available subframe. Thus, in feedback mode 2F, RI and PI1 are reported using the resource of RI reporting in feedback mode 2 that is a backward compatible feedback mode, and S-CQI and PI2 are reported using the resource of S-CQI reporting in feedback mode 2. Accordingly, the overhead of the uplink required for reporting can be alleviated. Furthermore, the collision between the reports of different terminal devices can be reduced. In addition, since the report period of PI1 and PI2 can be configured different from each other, efficient feedback of partial precoder information conforming to the role of respective partial precoder information is allowed. This is suitable for reporting PI2 in the BP unit since more reporting opportunity can be scheduled for PI2.

$X_1$ or $X_2$ may be set at the terminal device in step S1401 of FIG. 14. $X_1$ and $X_2$ may be set individually, or set to always have the same value. Alternatively, they may be set in association with another parameter such as the transmission mode. For example, processing such that the terminal device sets the value of $X_1$ and $X_2$ at 2 when the base station terminal sets an extended transmission mode for the terminal device, and the terminal device sets the value of $X_1$ and $X_2$ at 1 when the backward compatible transmission mode is set may be carried out. Accordingly, $X_1$ or $X_2$ does not have to be specified individually.

Thus, the base station terminal sets for the terminal device a backward compatible feedback mode in which a precoding matrix is fed back, or an extended feedback mode in which a plurality of partial precoder information are fed back. At this stage, the parameters related to the period and offset value in the extended feedback mode are set identical to those of the backward compatible feedback mode. Furthermore, using an equation introducing the parameters corresponding to whether the mode is an extended feedback mode or a backward compatible feedback mode, the subframe for reporting is determined for each of the contents fed back (RI, PI1, PI2, W-CQI, and the like). Furthermore, in reporting partial precoder information, PI is reported using some of the resource for reporting RI or CQI in the backward compatible feedback mode. Furthermore, RI or CQI and PI are reported alternately. Accordingly, the switching between an extended feedback mode and a backward compatible feedback mode is facilitated. Furthermore, the overhead of signaling from the base station device to a terminal device can be reduced. Furthermore, any of the contents can be reported in an appropriate period.

Second Embodiment

The first embodiment was described based on the case where the parameters related to the period and offset value in an extended feedback mode are set identical to those of the backward compatible feedback mode. A second embodiment of the present invention is based on the case where the parameters related to the offset value in an extended feedback mode differs from the parameters in a backward compatible feedback mode. The second embodiment of the present invention will be described hereinafter with reference to the drawings. The procedure between the base station device and terminal device according to the present embodiment can be realized by a procedure similar to that of FIG. 14.

Figure 26:
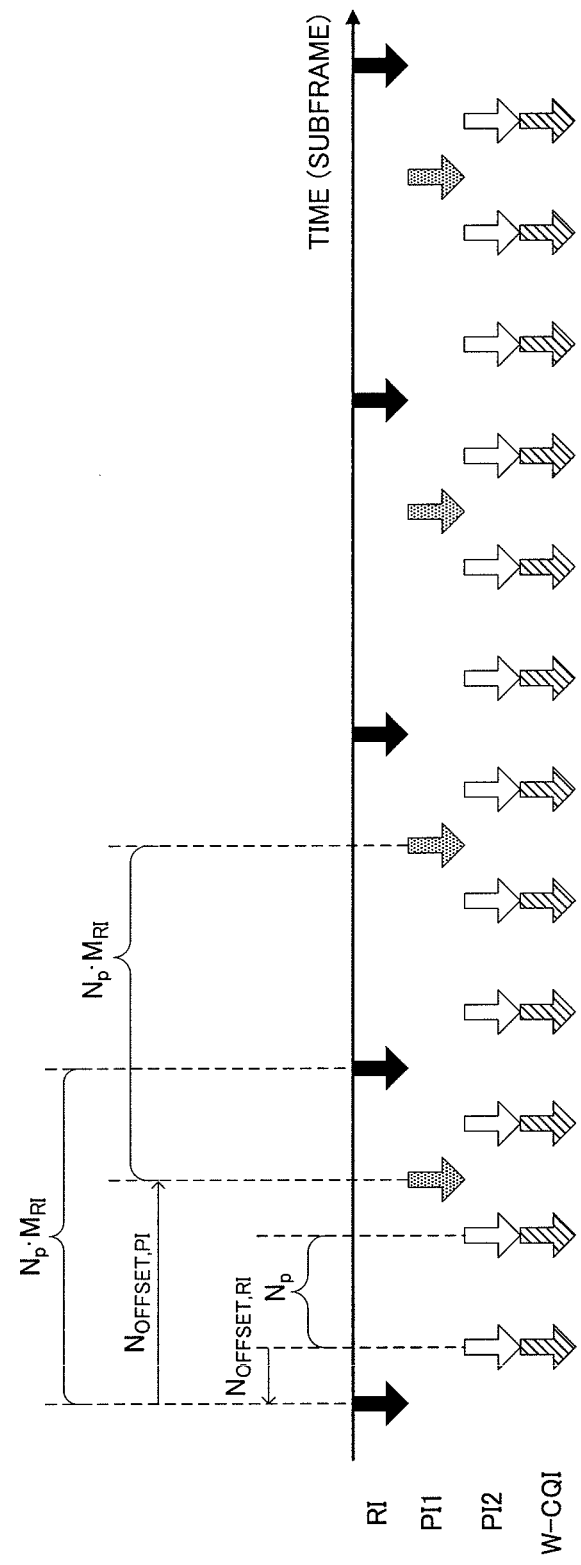
FIG. 26 represents an exemplary feedback mode according to a second embodiment of the present invention.

FIG. 26 represents an exemplary feedback mode (feedback mode IF) of the present embodiment. Feedback mode 1F shown in FIG. 26 is an extended feedback mode (second feedback mode). In this feedback mode 1F, RI, PI1, PI2, and W-CQI are reported periodically. More specifically, in the subframe meeting equation (1), W-CQI and PI2 are fed back; in the subframe meeting equation (2), RI is fed back; in the subframe meeting equation (19), PI1 is fed back.

$$(10 \times n_f + \lfloor n_s/2 \rfloor - N_{OFFSET,CQI} - N_{OFFSET,RI} - N_{OFFSET,PI}) \mod(N_P \cdot M_{RI}) = 0 \quad (19)$$

In the equation, $N_{OFFSET, PI}$ is a predetermined value.

In feedback mode 1F of FIG. 26, W-CQI and PI2 are reported in the period of $N_P$ subframes, and at a subframe shifted (offset) from the reference subframe by $N_{OFFSET, CQI}$. Further, RI is reported in the period of $N_P \cdot M_{RI}$ that is $M_{RI}$ times the period of W-CQI, and at a subframe shifted from the reference subframe by $N_{OFFSET, CQI} + N_{OFFSET, RI}$. In other words, RI is reported at a subframe further shifted from W-CQI by $N_{OFFSET, RI}$. PI1 is reported in a period of $N_P \cdot M_{RI}$ that is the same period as RI, and at a subframe shifted from the reference subframe by $N_{OFFSET, CQI} + N_{OFFSET, RI} + N_{OFFSET, PI}$. In other words, PI1 is reported at a subframe further shifted from RI by $N_{OFFSET, PI}$.

FIG. 27 represents an exemplary parameter table related to PI report according to the present embodiment. For the parameter table of CQI and RI, the parameter table shown in FIGS. 8 and 9 is used. The base station device and terminal device are sharing a parameter table. The base station device calculates Np and $N_{OFFSET, CQI} + N_{OFFSET, RI}$, $N_{OFFSET, PI}$ from the period and offset value of W-CQI, PI and RI preferred for any terminal device, based on the scheduling of the feedback resource between a plurality of terminal devices, the transition of the reception power value for each terminal device, and the like. The base station device refers to the parameter table to select and set at the terminal device $I_{CQI}$, $I_{RI}$, $I_{PI}$ (the second parameter indicating the offset in timing of reporting partial precoder information) corresponding to the calculated $N_P$ and $N_{OFFSET, CQI}$, $N_{OFFSET, RI}$, $N_{OFFSET, PI}$. The terminal device having $I_{CQI}$, $I_{RI}$, $I_{PI}$ set uses the set $I_{CQI}$, $I_{RI}$, $I_{PI}$ and the parameter table to obtain $N_P$ and $N_{OFFSET,CQI}$, $N_{OFFSET, RI}$, $N_{OFFSET, PI}$. The terminal device uses the obtained $N_P$ and $N_{OFFSET, CQI}$, $N_{OFFSET, RI}$, $N_{OFFSET, PI}$ to determine the subframe in which W-CQI, PI and RI are reported.

$N_{OFFSET, PI}$ can be configured at the terminal device in step S1401 of FIG. 14, Alternatively, $N_{OFFSET, PI}$ can be configured in association with another parameter such as a transmission mode, or may be fixed.

Thus, in feedback mode 1F, PI2 is reported instead of W-PMI in feedback mode 1 that is a backward compatible feedback mode, and the parameter related to the offset value of PI1 is set in addition to the parameter of feedback mode 1. Accordingly, the contents fed back in feedback mode 1 can be fed back in the same period and/or offset value in an extended feedback mode. Furthermore, by setting the period of PI1 identical to that of RI, collision between the reports of different contents can be reduced.

Figure 28:
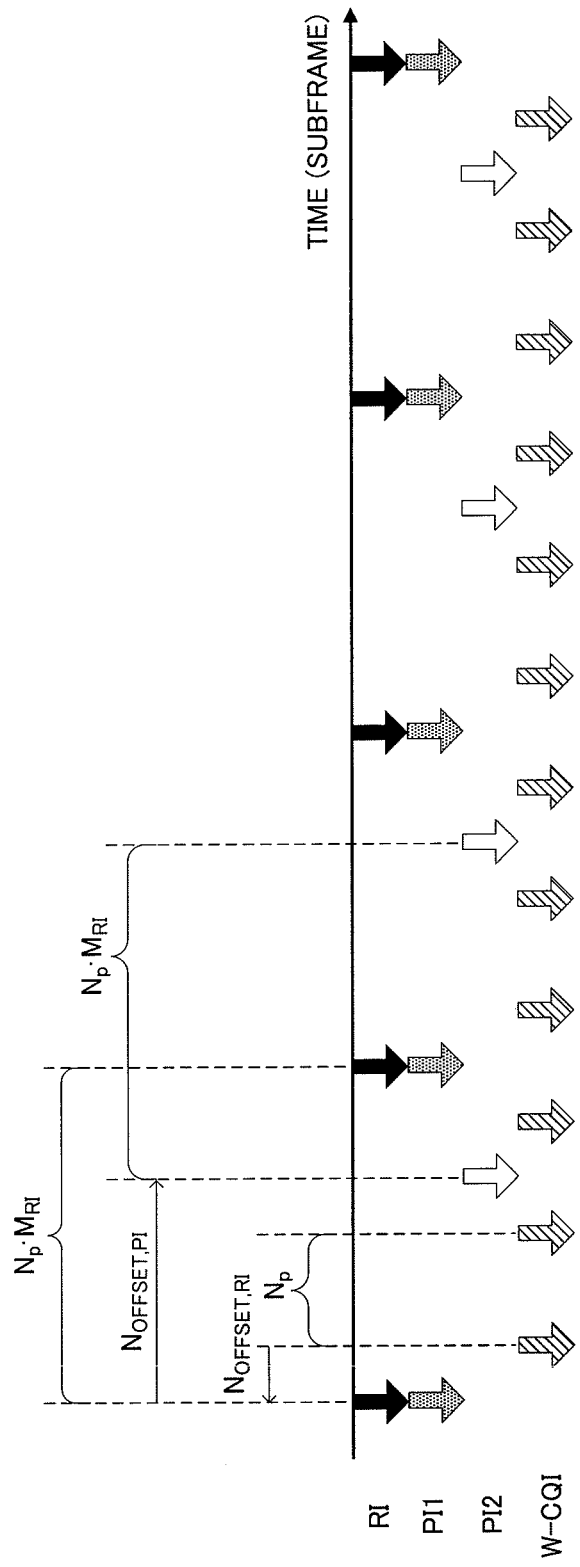
FIG. 28 represents another exemplary feedback mode according to the second embodiment of the present invention.

FIG. 28 represents a further another exemplary feedback mode according to the present embodiment (feedback mode 1G). Feedback mode 1G of FIG. 28 is an extended feedback mode (second feedback mode). In this feedback mode 1G, RI, PI1, PI2, and W-CQI are reported periodically. More specifically, in the subframe meeting equation (1), W-CQI is fed back; in the subframe meeting equation (2), RI and PI1 are fed back; in the subframe meeting equation (19), PI2 is fed back.

In feedback mode 1G shown in FIG. 28, W-CQI is reported in the period of $N_P$ subframes, and at a subframe shifted from the reference subframe by $N_{OFFSET, CQI}$. RI and PI1 are reported in a period of $N_P \cdot M_{RI}$ that is $M_{RI}$ times the period of W-CQI, and at a subframe shifted from the reference subframe by $N_{OFFSET, CQI} + N_{OFFSET, RI}$. In other words, RI and PI1 are reported at a subframe further shifted from W-CQI by $N_{OFFSET, RI}$. PI2 is reported in a period of $N_P \cdot M_{RI}$ that is the same period as RI, and at a subframe shifted from the reference subframe by $N_{OFFSET, CQI} + N_{OFFSET, PI}$. In other words, PI2 is reported at a subframe further shifted from W-CQI by $N_{OFFSET, PI}$.

Thus, in feedback mode 1G, RI and PI1 are reported using the resource of RI reporting in feedback mode 1 that is a backward compatible feedback mode, and the parameter related to the offset value of PI2 is set in addition to the parameter in feedback mode 1, Accordingly, the contents fed back in feedback mode 1 can be fed back in the same period and/or offset value in an extended feedback mode. Furthermore, by setting the period of PI2 identical to that of RI, collision between the reports of different contents can be reduced.

Figure 29:
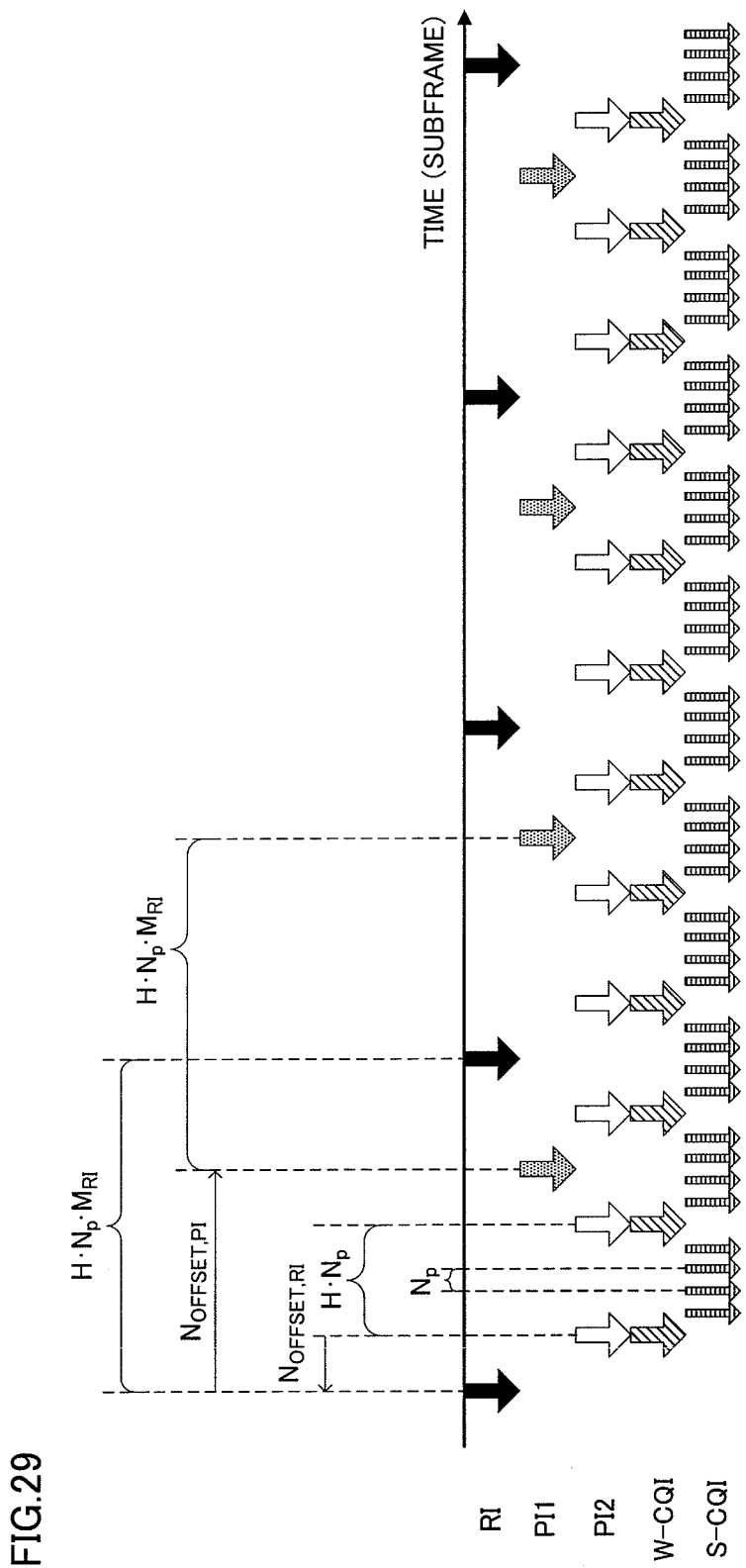
FIG. 29 represents still another exemplary feedback mode according to the second embodiment of the present invention.

FIG. 29 represents a further another exemplary feedback mode according to the present embodiment (feedback mode 2G), Feedback mode 2G of FIG. 29 is an extended feedback mode (second feedback mode), In this feedback mode 2G, RI, PI1, PI2, W-CQI, and S-CQI are reported periodically. More specifically, in the subframe meeting equation (3), W-CQI and PI2 are fed back; in the subframe meeting equation (4), RI is fed back; in the subframe meeting equation (20), PI1 is fed back.

$$10 \times n_f + \lfloor n_s/2 \rfloor - N_{OFFSET,CQI} - N_{OFFSET,RI} - N_{OFFSET,PI}) \mod(H \cdot N_P \cdot M_{RI}) = 0 \quad (20)$$

In feedback mode 2G shown in FIG. 29, W-CQI and PI2 are reported in the period of $H \cdot N_P$ subframes, and at a subframe shifted from the reference subframe by $N_{OFFSET,\ CQI}$. RI is reported in a period of $N_P \cdot M_{RI}$ that is $M_{RI}$ times the period of W-CQI, and at a subframe shifted from the reference subframe by $N_{OFFSET,\ CQI} + N_{OFFSET,\ RI}$. In other words, RI is reported at a subframe further shifted from W-CQI by $N_{OFFSET,\ RI}$. PI1 is reported, likewise with PI, in a period of $N_P \cdot M_{RI}$ that is $M_{RI}$ times the period of W-CQI, and at a subframe shifted from the reference subframe by $N_{OFFSET,\ CQI} + N_{OFFSET,\ RI} + N_{OFFSET,\ PI}$. In other words, PI1 is reported at a subframe further shifted from RI by $N_{OFFSET,\ PI}$. Here, H=J·K+1 is established. In feedback mode 2G, likewise with feedback mode 2, the report of CQI (S-CQI) in the J BPs is repeated for K cycles.

Thus, in feedback mode 26, PI2 is reported using the resource of W-PMI reporting in feedback mode 2 that is a backward compatible feedback mode, and the parameter related to the offset value of PI1 is set in addition to the parameter in feedback mode 2. Accordingly, the contents fed back in feedback mode 2 can be fed back in the same period and/or offset value in an extended feedback mode. Furthermore, by setting the period of PI1 identical to that of RI, collision between the reports of different contents can be reduced.

Figure 30:
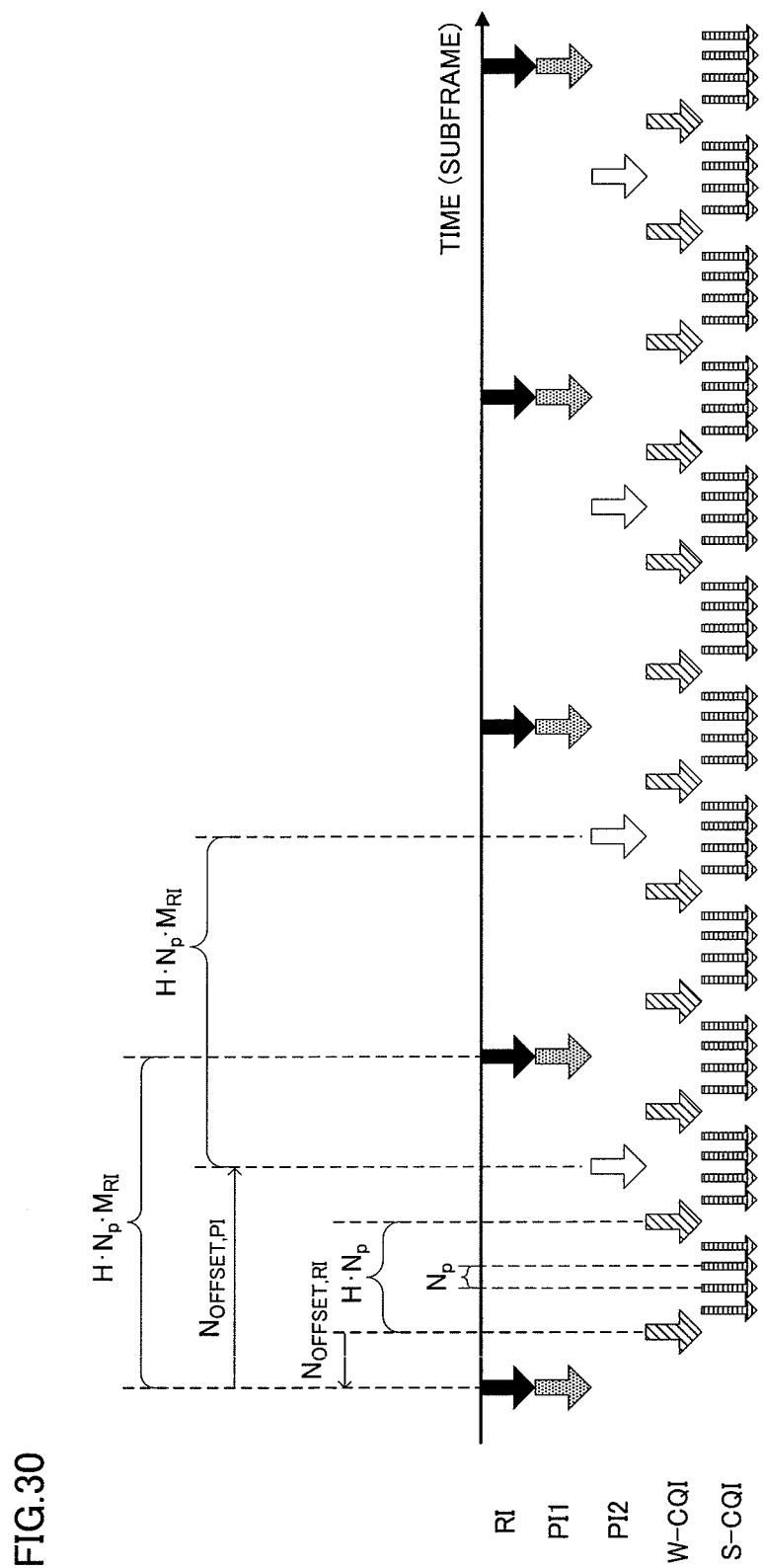
FIG. 30 represents still another exemplary feedback mode according to the second embodiment of the present invention.

FIG. 30 represents a further another exemplary feedback mode according to the present embodiment (feedback mode 2H). Feedback mode 2H of FIG. 30 is an extended feedback mode (second feedback mode). In this feedback mode 2H, RI, PI1, PI2, W-CQI, and S-CQI are reported periodically. More specifically, in the subframe meeting equation (3), W-CQI is fed back; in the subframe meeting equation (4), RI and PI1 are fed back; in the subframe meeting equation (20), PI2 is fed back.

In feedback mode 2H shown in FIG. 30, W-CQI is reported in the period of $H \cdot N_P$ subframes, and at a subframe shifted from the reference subframe by $N_{OFFSET,\ CQI}$. RI and PI1 are reported in a period of $H \cdot N_P \cdot M_{RI}$ that is $M_{RI}$ times the period of W-CQI, and at a subframe shifted from the reference subframe by $N_{OFFSET,\ CQI} + N_{OFFSET,\ RI}$. In other words, RI and PI1 are reported at a subframe further shifted from W-CQI by $N_{OFFSET,\ RI}$. PI2 is reported, likewise with PI, in a period of $H \cdot N_P \cdot M_{RI}$ that is $M_{RI}$ times the period of W-CQI, and at a subframe shifted from the reference subframe by $N_{OFFSET,\ CQI} N_{OFFSET,\ RI} + N_{OFFSET,\ PI}$. In other words, PI2 is reported at a subframe further shifted from RI by $N_{OFFSET,PI}$. Here, H=J·K+1 is established. In feedback mode 2H, likewise with feedback mode 2, the report of CQI (S-CQI) in the J BPs is repeated for K cycles.

Thus, in feedback mode 2H, RI and PI1 are reported using the resource of RI reporting in feedback mode 2 that is a backward compatible feedback mode, and the parameter related to the offset value of PI2 is set in addition to the parameter in feedback mode 2. Accordingly, the contents fed back in feedback mode 2 can be fed back in the same period and/or offset value in an extended feedback mode. Furthermore, by setting the period of PI2 identical to that of RI, collision between the reports of different contents can be reduced.

Figure 31:
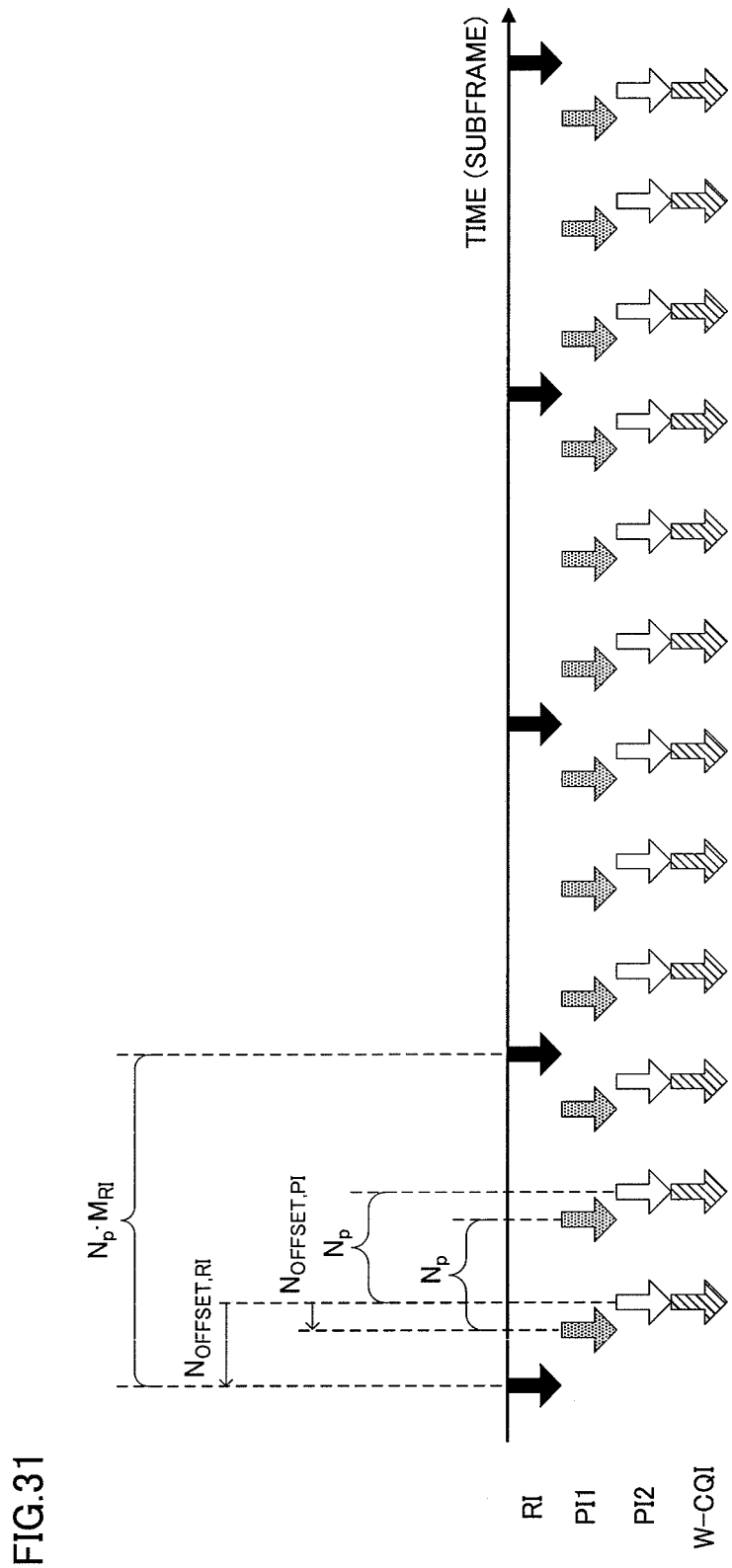
FIG. 31 represents still another exemplary feedback mode according to the second embodiment of the present invention.

FIG. 31 represents a further another exemplary feedback mode according to the present embodiment (feedback mode 2H). Feedback mode 1H of FIG. 31 is an extended feedback mode (second feedback mode). In this feedback mode 1H, RI, PI1, PI2, and W-CQI are reported periodically. More specifically, in the subframe meeting equation (1), W-CQI and PI2 are fed back; in the subframe meeting equation (2), RI is fed back; in the subframe meeting equation (21), PI1 is fed back.

$$(10 \times n_f + \lfloor n_s/2 \rfloor - N_{OFFSET,CQI} - N_{OFFSET,PI}) \mod N_P = 0 \quad (21)$$

In feedback mode 1H shown in FIG. 31, W-CQI and PI2 are reported in the period of $N_P$ subframes, and at a subframe shifted from the reference subframe by $N_{OFFSET,\ CQI}$. RI is reported in a period of $N_P \cdot M_{RI}$ that is $M_{RI}$ times the period of W-CQI, and at a subframe shifted from the reference subframe by $N_{OFFSET,\ CQI} + N_{OFFSET,\ RI}$. In other words, RI is reported at a subframe further shifted from W-CQI by $N_{OFFSET,\ RI}$. PI1 is reported in a period of $N_P$ that is the same period as W-CQI, and at a subframe shifted from the reference subframe by $N_{OFFSET,\ CQI} + N_{OFFSET,\ PI}$. In other words, PI1 is reported at a subframe further shifted from W-CQI by $N_{OFFSET,\ PI}$.

Thus, in feedback mode 1H, PI2 is reported using the resource of W-PMI reporting in feedback mode 1 that is a backward compatible feedback mode, and the parameter related to the offset value of PI1 is set in addition to the parameter in feedback mode 1. Accordingly, the contents fed back in feedback mode 1 can be fed back in the same period and/or offset value in an extended feedback mode. Furthermore, by setting the period of PI1 identical to that of W-CQI, collision between the reports of different contents can be reduced.

Figure 32:
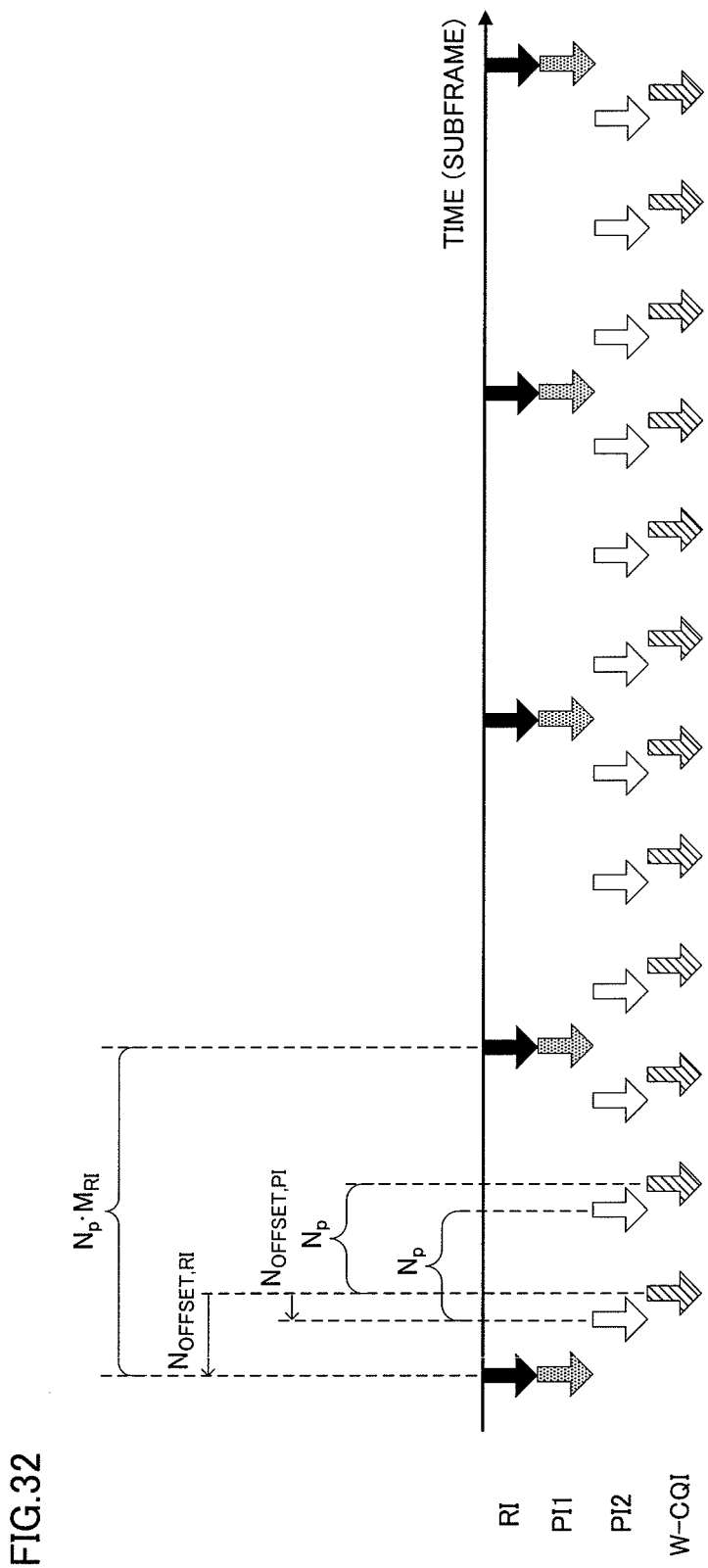
FIG. 32 represents still another exemplary feedback mode according to the second embodiment of the present invention.

FIG. 32 represents a further another exemplary feedback mode according to the present embodiment (feedback mode 11). Feedback mode 11 of FIG. 32 is an extended feedback mode (second feedback mode). In this feedback mode 1I, RI, PI1, PI2, and W-CQI are reported periodically. More specifically, in the subframe meeting equation (1), W-CQI is fed back; in the subframe meeting equation (2), RI and PI1 are fed back; in the subframe meeting equation (21), PI2 is fed back.

In feedback mode 1I shown in FIG. 32, W-CQI and PI2 are reported in the period of $N_P$ subframes, and at a subframe shifted from the reference subframe by $N_{OFFSET,\ CQI}$. RI and PI1 are reported in a period of $N_P \cdot M_{RI}$ that is $M_{RI}$ times the period of W-CQI, and at a subframe shifted from the reference subframe by $N_{OFFSET,\ CQI} + N_{OFFSET,\ RI}$. In other words, RI and PI1 are reported at a subframe further shifted from W-CQI by $N_{OFFSET,\ RI}$. PI2 is reported in a period of $N_P$ that is the same period as W-CQI, and at a subframe shifted from the reference subframe by $N_{OFFSET,\ CQI} + N_{OFFSET,\ PI}$. In other words, RI and PI2 are reported at a subframe further shifted from W-CQI by $N_{OFFSET,\ PI}$.

Thus, in feedback mode 1I, RI and PI1 are reported using the resource of RI reporting in feedback mode 1 that is a backward compatible feedback mode, and the parameter related to the offset value of PI2 is set in addition to the parameter in feedback mode 1. Accordingly, the contents fed back in feedback mode 1 can be fed back in the same period and/or offset value in an extended feedback mode. Furthermore, by setting the period of PI2 identical to that of W-CQI, collision between the reports of different contents can be reduced.

Figure 33:
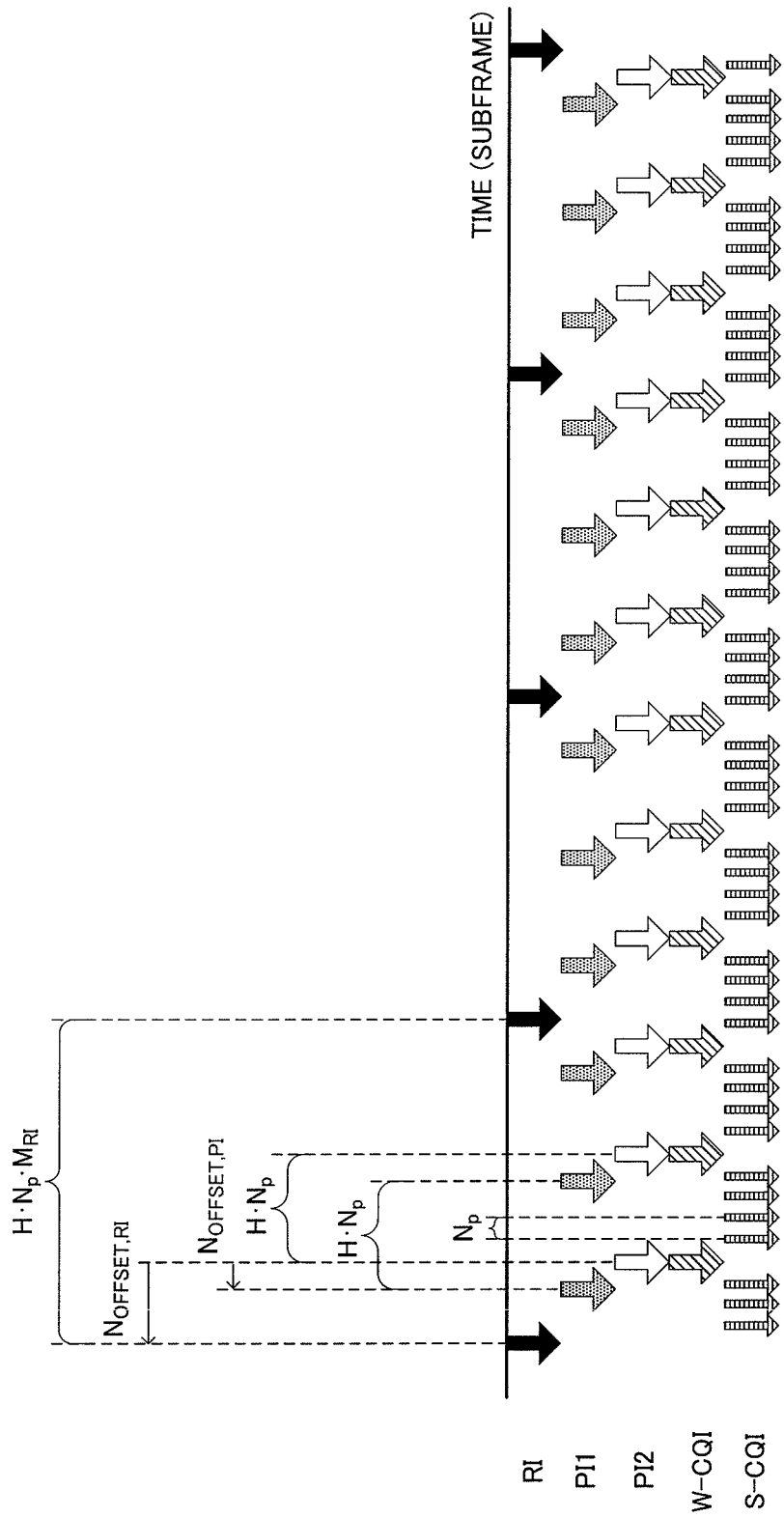
FIG. 33 represents still another exemplary feedback mode according to the second embodiment of the present invention.

FIG. 33 represents a further another exemplary feedback mode according to the present embodiment (feedback mode 2I). Feedback mode 2I of FIG. 33 is an extended feedback mode (second feedback mode). In this feedback mode 2I, RI, PI1, PI2, W-CQI, and S-CQI are reported periodically. More specifically, in the subframe meeting equation (3), W-CQI and PI2 are fed back; in the subframe meeting equation (4), RI is fed back; in the subframe meeting equation (22), PI1 is fed back. Here, H=J·K+1 is established. In feedback mode 21, likewise with feedback mode 2, the reporting of CQI (S-CQI) in the J BPs is repeated for K cycles.

$$(10 \times n_f + \lfloor n_s/2 \rfloor - N_{OFFSET,CQI} - N_{OFFSET,PI}) \mod (H \cdot N_P) = 0 \quad (22)$$

In feedback mode 21 shown in FIG. 33, W-CQI and PI2 are reported in the period of $H \cdot N_P$ subframes, and at a subframe shifted from the reference subframe by $N_{OFFSET,CQI}$. RI is reported in a period of $H \cdot N_P \cdot M_{RI}$ that is $M_{RI}$ times the period of W-CQI, and at a subframe shifted from the reference subframe by $N_{OFFSET, CQI} + N_{OFFSET, RI}$. In other words, RI is reported at a subframe further shifted from W-CQI by $N_{OFFSET, RI}$. PI1 is reported in a period of $H \cdot N_P$ that is the same period as W-CQI, and at a subframe shifted from the reference subframe by $N_{OFFSET, CQI} + N_{OFFSET, PI}$. In other words, PI1 is reported at a subframe further shifted from W-CQI by $N_{OFFSET, PI}$.

Thus, in feedback mode 21, PI2 is reported using the resource of W-PMI reporting in feedback mode 2 that is a backward compatible feedback mode, and the parameter related to the offset value of PI1 is set in addition to the parameter in feedback mode 2. Accordingly, the contents fed back in feedback mode 2 can be fed back in the same period and/or offset value in an extended feedback mode. Furthermore, by setting the period of PI1 identical to that of W-CQI, collision between the reports of different contents can be reduced.

Figure 34:
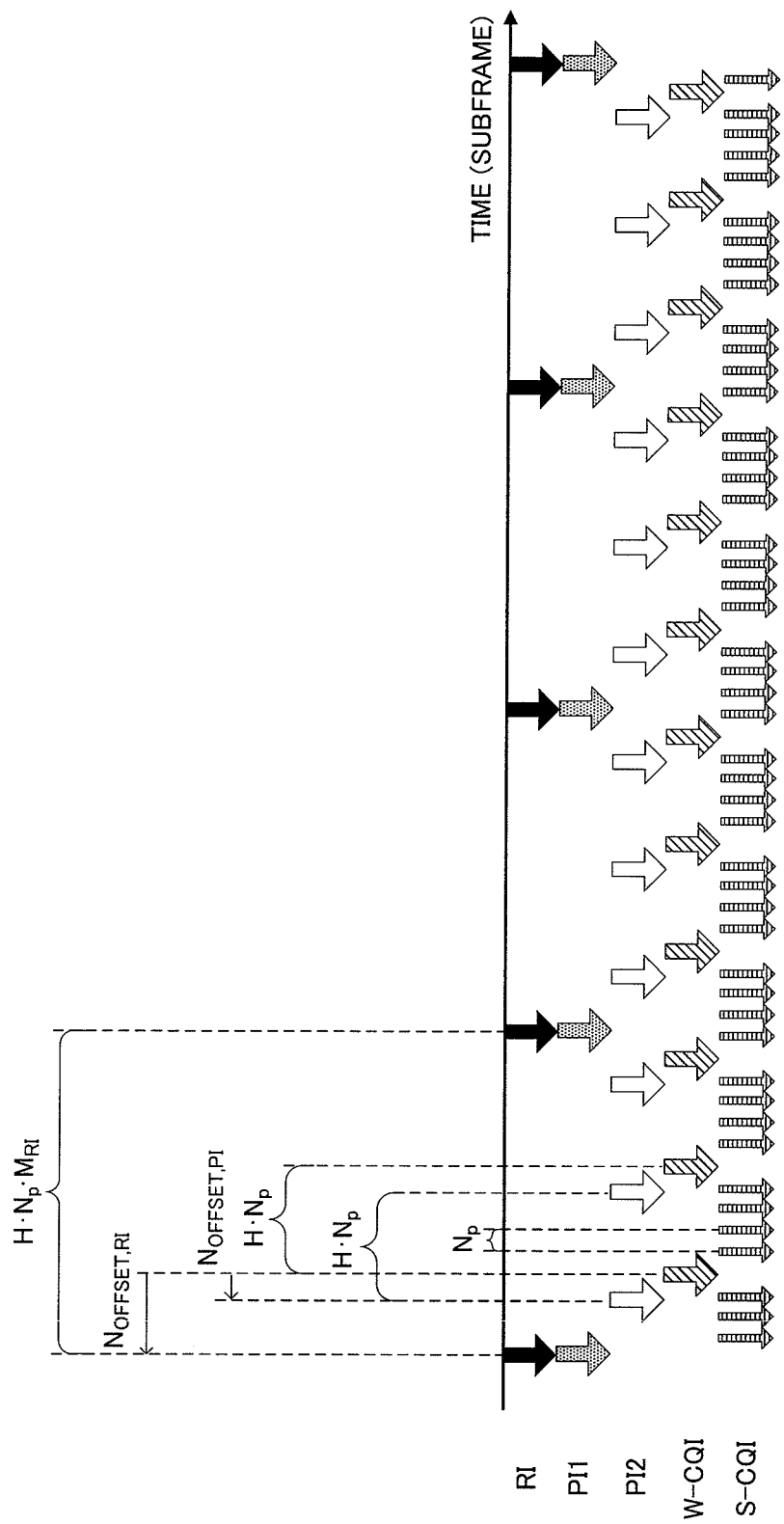
FIG. 34 represents still another exemplary feedback mode according to the second embodiment of the present invention.

FIG. 34 represents a further another exemplary feedback mode according to the present embodiment (feedback mode 2J). Feedback mode 2J of FIG. 34 is an extended feedback mode (second feedback mode). In this feedback mode 2J, RI, PI1, PI2, W-CQI, and S-CQI are reported periodically. More specifically, in the subframe meeting equation (3), W-CQI is fed back; in the subframe meeting equation (4), RI and PI1 are fed back; in the subframe meeting equation (22), PI2 is fed back. Here, H=J·K+1 is established. In feedback mode 2J, likewise with feedback mode 2, the reporting of CQI (S-CQI) in the J BPs is repeated for K cycles.

In feedback mode 2J shown in FIG. 34, W-CQI is reported in the period of $H \cdot N_P$ subframes, and at a subframe shifted from the reference subframe by $N_{OFFSET, CQI}$. RI and PI1 are reported in a period of $H \cdot N_P \cdot M_{RI}$ that is $M_{RI}$ times the period of W-CQT, and at a subframe shifted from the reference subframe by $N_{OFFSET, CQI} + N_{OFFSET, RI}$. In other words, RI and PI1 are reported at a subframe further shifted from W-CQI by $N_{OFFSET, RI}$. PI2 is reported in a period of $H \cdot N_P$ that is the same period as W-CQI, and at a subframe shifted from the reference subframe by $N_{OFFSET, CQI} + N_{OFFSET, PI}$. In other words, PI2 is reported at a subframe further shifted from W-CQI by $N_{OFFSET, PI}$.

Thus, in feedback mode 2J, RI and PI1 are reported using the resource of RI reporting in feedback mode 2 that is a backward compatible feedback mode, and the parameter related to the offset value of PI2 is set in addition to the parameter in feedback mode 2. Accordingly, the contents fed back in feedback mode 2 can be fed back in the same period and/or offset value in an extended feedback mode. Furthermore, by setting the period of PI2 identical to that of W-CQI, collision between the reports of different contents can be reduced.

Figure 35:
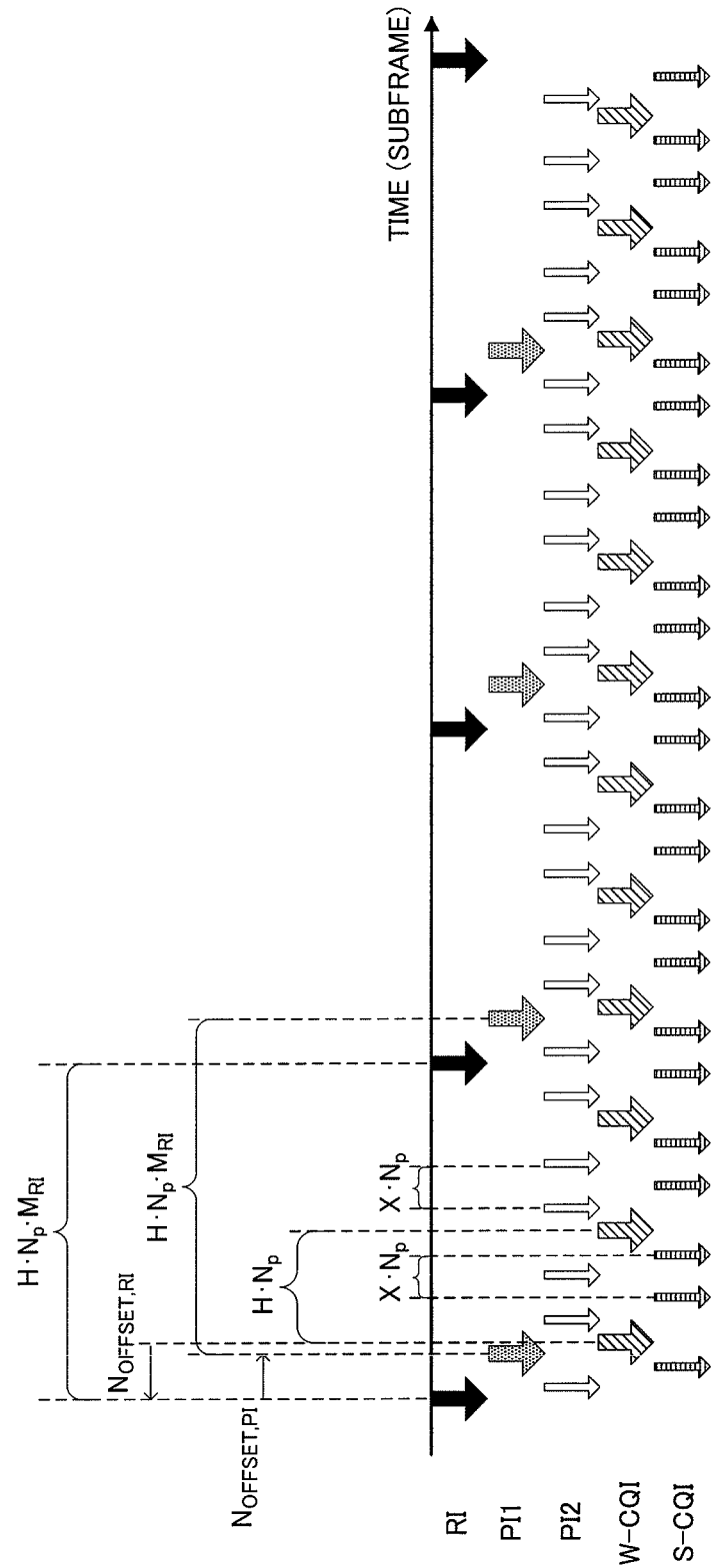
FIG. 35 represents still another exemplary feedback mode according to the second embodiment of the present invention.

FIG. 35 represents a further another exemplary feedback mode according to the present embodiment (feedback mode 2K). Feedback mode 2K of FIG. 35 is an extended feedback mode (second feedback mode). In this feedback mode 2K, RI, PI1, PI2, W-CQI, and S-CQI are reported periodically. More specifically, in the subframe meeting equation (3), W-CQI is fed back; in the subframe meeting equation (4), RI is fed back; in the subframe meeting equation (20), PI1 is fed back. Each of S-CQI and PI2 is reported J·K times each in the period of $X \cdot N_P$. Here, H=X·J·K+1 is established. S-CQI or PI2 reported J·K times is the CQI or PI typical of BP. The CQI or PI in the J BPs is sequentially reported alternately, starting from the CQI or PI in the BP of lower frequency. This report of CQI or PI is carried out J times to cover the downlink bandwidth. By further repeating the report of J times for K cycles, the report of J·K times is carried out during the term of $H \cdot N_P$ subframes.

In feedback mode 2K shown in FIG. 35, W-CQI is reported in the period of $H \cdot N_P$ subframes, and at a subframe shifted from the reference subframe by $N_{OFFSET, CQI}$. RI is reported in a period of $H \cdot N_P \cdot M_{RI}$ that is $M_{RI}$ times the period of W-CQI, and at a subframe shifted from the reference subframe by $N_{OFFSET, CQI} + N_{OFFSET, RI}$. In other words, RI is reported at a subframe further shifted from W-CQI by $N_{OFFSET, RI}$. PI1 is reported in a period of $H \cdot N_P \cdot M_{RI}$ that is the same period as RI, and at a subframe shifted from the reference subframe by $N_{OFFSET, CQI} + N_{OFFSET, RI} + N_{OFFSET, PI}$. In other words, PI1 is reported at a subframe further shifted from RI by $N_{OFFSET, PI}$.

Thus, in feedback mode 2K, S-CQI and PI1 are reported using the resource of S-CQI reporting in feedback mode 2 that is a backward compatible feedback mode, and the parameter related to the offset value of PI1 is set in addition to the parameter in feedback mode 2. Accordingly, the contents fed back in feedback mode 2 can be fed back in the same period and/or offset value in an extended feedback mode. Furthermore, by setting the period of PI1 identical to that of RI, collision between the reports of different contents can be reduced.

Figure 36:
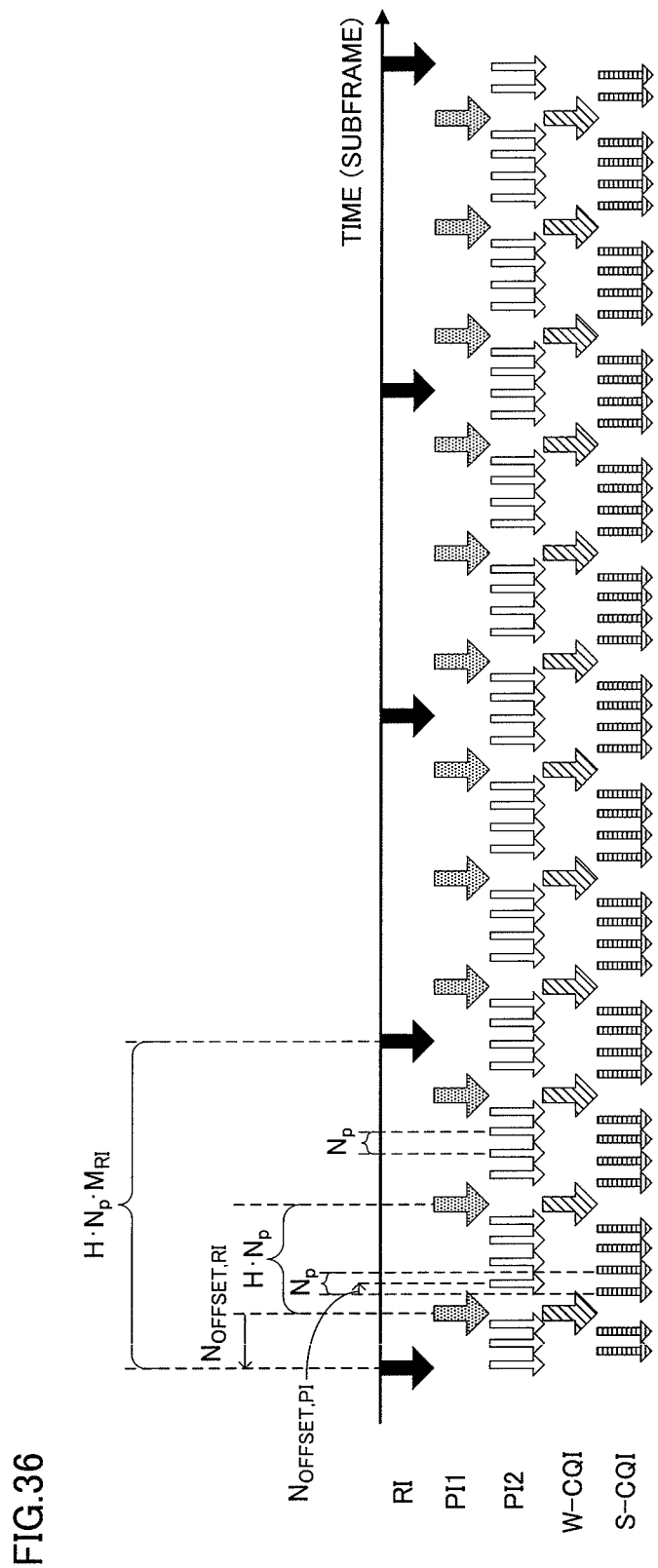
FIG. 36 represents still another exemplary feedback mode according to the second embodiment of the present invention.

FIG. 36 represents a further another exemplary feedback mode according to the present embodiment (feedback mode 2L). Feedback mode 2L of FIG. 36 is an extended feedback mode (second feedback mode). In this feedback mode 2L, RI, PI1, PI2, W-CQI, and S-CQI are reported periodically. More specifically, in the subframe meeting equation (3), W-CQI and PI1 are fed back; in the subframe meeting equation (4), RI is fed back. Each of S-CQI and PI2 is reported J·K times each in the period of $N_P$. Here, H=J·K+1 is established. The S-CQI or PI2 reported J·K times is the CQI or PI typical of BP. The CQI or PI in the J BPs is sequentially reported, starting from the CQI or PI in the BP of lower frequency. This report of CQI is carried out J times to cover the downlink bandwidth. By further repeating the report of J times for K cycles, the report of J·K times is carried out during the term of $H \cdot N_P$ subframes.

In feedback mode 2L shown in FIG. 36, W-CQI and PI1 are reported in the period of $H \cdot N_P$ subframes, and at a subframe shifted from the reference subframe by $N_{OFFSET, CQI}$. RI is reported in a period of $H \cdot N_P \cdot M_{RI}$ that is $M_{RI}$ times the period of W-CQI, and at a subframe shifted from the reference subframe by $N_{OFFSET, CQI} + N_{OFFSET, RI}$. In other words, RI is reported at a subframe further shifted from W-CQI by $N_{OFFSET, RI}$. PI2 is reported in a period of $N_P$ that is the same period as S-CQI, and at a subframe shifted from the subframe in which S-CQI is reported by $N_{OFFSET, PI}$.

Thus, in feedback mode 2L, PI1 is reported using the resource of W-PMI reporting in feedback mode 2 that is a backward compatible feedback mode, and the parameter related to the offset value of PI2 is set in addition to the parameter in feedback mode 2. Accordingly, the contents fed back in feedback mode 2 can be fed back in the same period and/or offset value in an extended feedback mode. Furthermore, by setting the period of PI2 identical to that of S-CQI, collision between the reports of different contents can be reduced.

Figure 37:
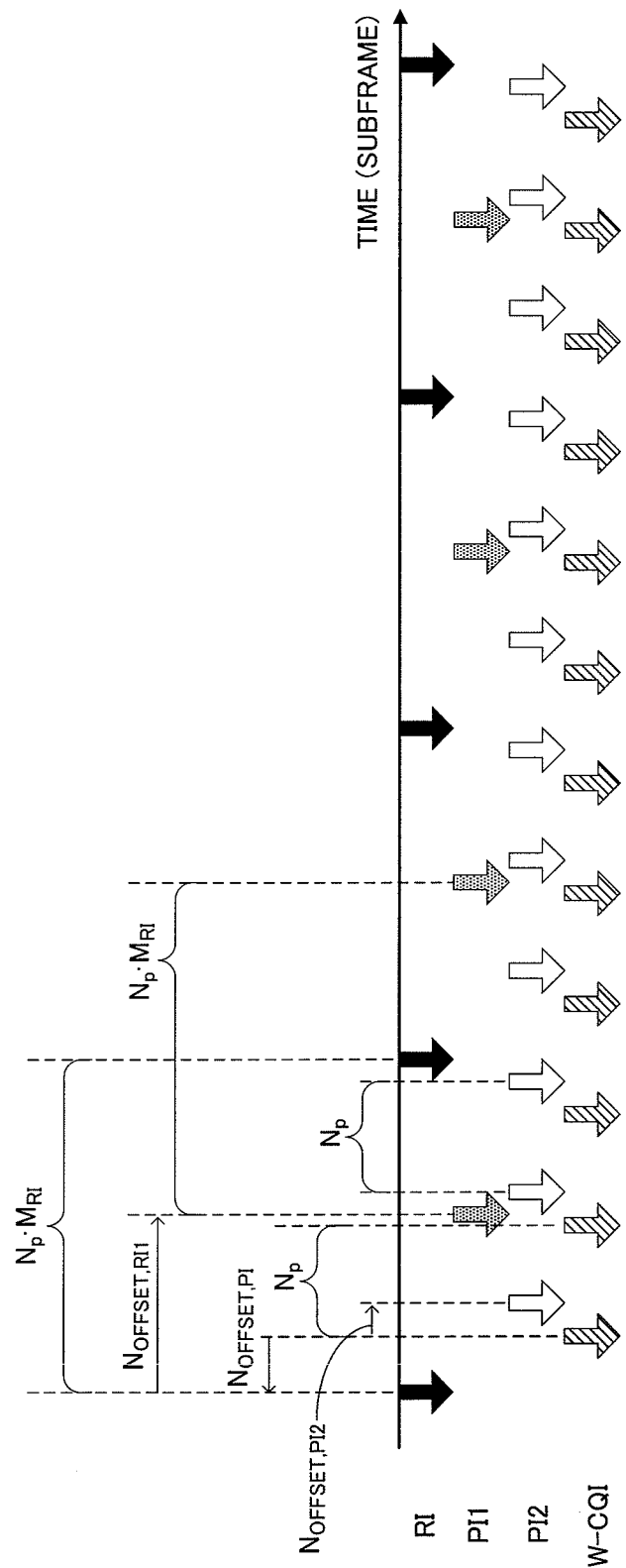
FIG. 37 represents still another exemplary feedback mode according to the second embodiment of the present invention.

FIG. 37 represents a further another exemplary feedback mode according to the present embodiment (feedback mode 1J). Feedback mode 1J of FIG. 37 is an extended feedback mode (second feedback mode). In this feedback mode 1J, RI, PI1, PI2, and W-CQI are reported periodically. More specifically, in the subframe meeting equation (1), W-CQI is fed back; in the subframe meeting equation (2), RI is fed back; in the subframe meeting equation (23), PI1 is fed back; in the subframe meeting equation (24), PI2 fed back.

$$(10 \times n_f + \lfloor n_s/2 \rfloor - N_{OFFSET,CQI} - N_{OFFSET,RI} - N_{OFFSET,PI1}) \bmod (N_P \cdot M_{RI}) = 0 \quad (23)$$

$$(10 \times n_f + \lfloor n_s/2 \rfloor - N_{OFFSET,CQI} - N_{OFFSET,PI2}) \bmod N_P = 0 \quad (24)$$

In the equations, $N_{OFFSET,PI1}$ and $N_{OFFSET,PI2}$ are predetermined values.

In feedback mode 1J shown in FIG. 37, W-CQI is reported in the period of $N_P$ subframes, and at a subframe shifted from the reference subframe by $N_{OFFSET, CQI}$. RI is reported in a period of $N_P \cdot M_{RI}$ that is $M_{RI}$ times the period of W-CQI, and at a subframe shifted from the reference subframe by $N_{OFFSET, CQI} + N_{OFFSET, RI}$. In other words, RI is reported at a subframe further shifted from W-CQI by $N_{OFFSET, RI}$. PI1 is reported in a period of $N_P \cdot M_{RI}$ that is the same period as RI, and at a subframe shifted from the reference subframe by $N_{OFFSET, CQI} + N_{OFFSET, RI}$. In other words, PI1 is reported at a subframe further shifted from RI by $N_{OFFSET, PI}$. PI2 is reported in a period of $N_P$ that is the same period as W-CQI, and at a subframe shifted from the reference subframe by $N_{OFFSET, CQI} + N_{OFFSET, PI2}$. In other words, PI2 is reported at a subframe further shifted from W-CQI by $N_{OFFSET, PI2}$.

$N_{OFFSET, PI1}$ and $N_{OFFSET, PI2}$ can be configured at the terminal device in step S1401 of FIG. 14. Alternatively, they can be configured in association with another parameter such as a transmission mode, or may be fixed.

Thus, in feedback mode 1J, the parameter related to the offset value of PI1 and/or PI2 is set, in addition to the parameter in feedback mode 1 that is a backward compatible feedback mode. Accordingly, the contents fed back in feedback mode 1 can be fed back at the same period and/or offset value even in an extended feedback mode. Furthermore, by setting the period of PI1 and PI2 identical to that of RI and W-CQI, the collision in reporting between different contents can be reduced.

Furthermore, whether the mode is an extended feedback mode or a backward compatible feedback mode may be switched depending on whether $I_{PI}$ is set or not. For example, in the RRC signaling in FIG. 14 (step S1401), the terminal devices uses the extended feedback mode for feeding back when $I_{PI}$ set, and uses the backward compatible feedback mode for feeding back when $I_{PI}$ is not set.

Thus, the base station device sets for the terminal device a backward compatible feedback mode in which a precoding matrix is fed back, or an extended feedback mode in which a plurality of partial precoder information are fed back. At this stage, the parameter related to the period in the extended feedback mode is set identical to that of the backward compatible feedback mode, whereas the offset value in the partial precoder information is set different from that in the backward compatible feedback mode. This facilitates the switching between an extended feedback mode and a backward compatible feedback mode. Furthermore, the collision between the reports of different contents can be reduced.

Third Embodiment

The first and second embodiments were described based on the case where the reception quality information of one downlink component carrier is reported. The third embodiment of the present invention is based on the case where the reception quality information of a plurality of downlink component carriers is reported. The third embodiment of the present invention will be described hereinafter with reference to the drawings.

Figure 38:
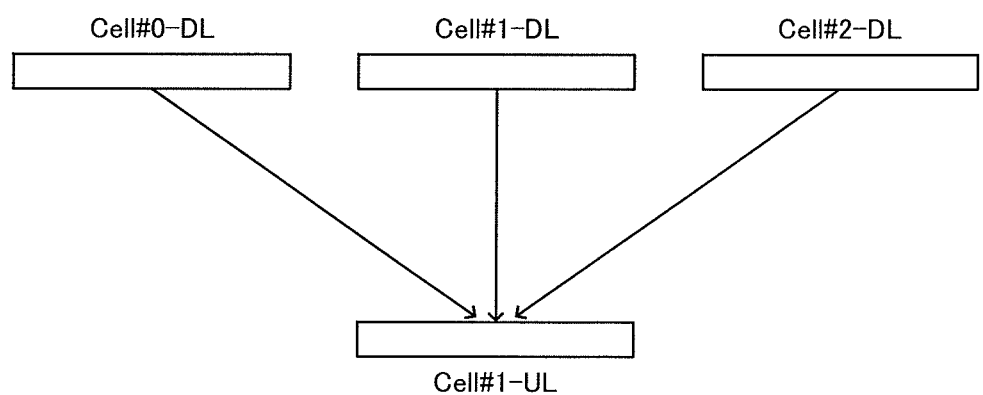
FIG. 38 represents an exemplary component carrier configuration according to a third embodiment of the present invention.

FIG. 38 represents an exemplary component carrier configuration according to the present embodiment. It is assumed that the terminal device is connected to cells covered in three downlink component carriers differing from each other (Cell#0, Cell#1, Cell#2). Description is provided corresponding to the case where the terminal device, under such state, reports the reception quality information of three downlinks (Cell#0-DL, Cell#1-DL, Cell#2-DL) through one uplink (Cell#1-UL).

Figure 39:
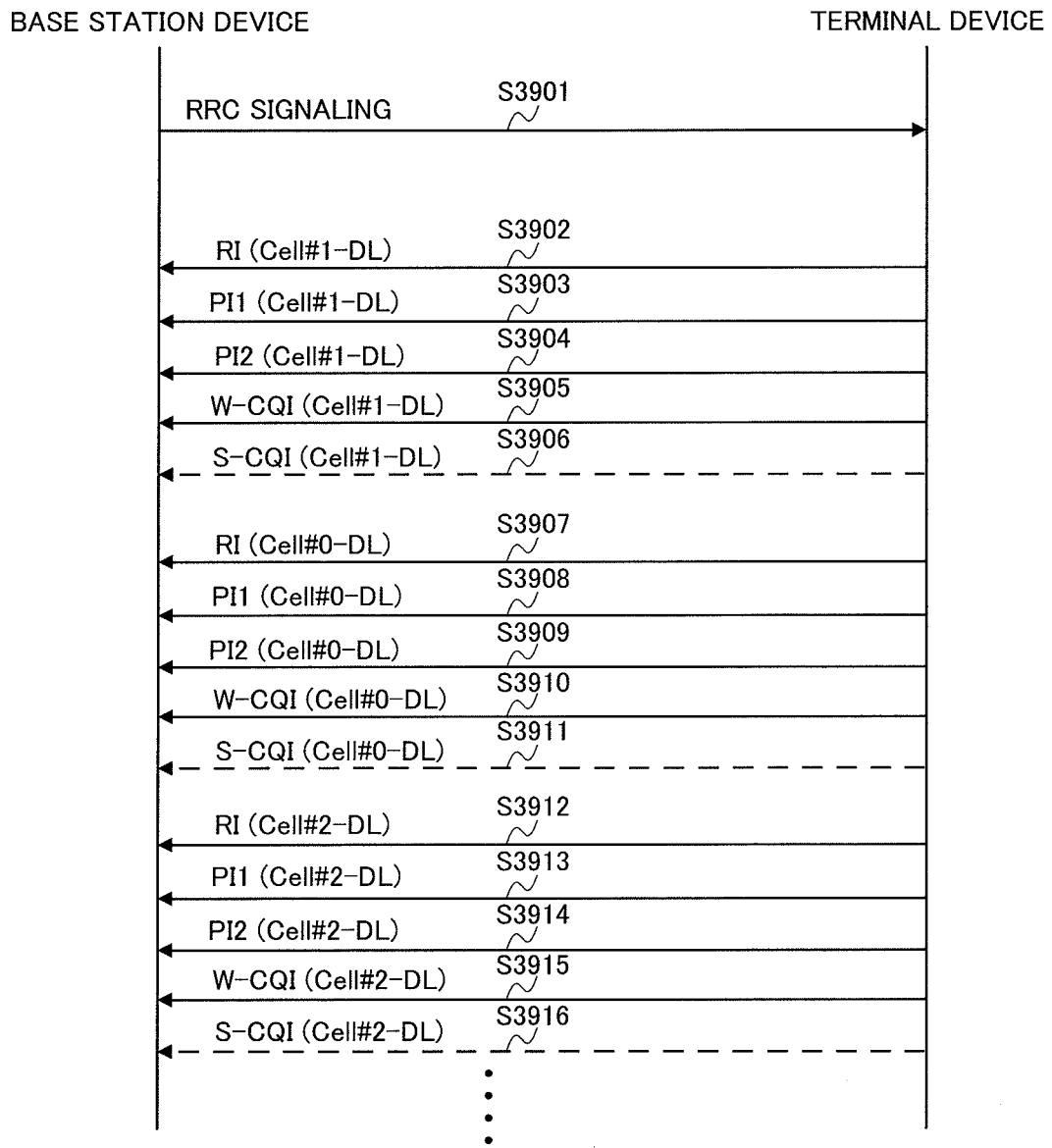
FIG. 39 represents an exemplary procedure according to the third embodiment of the present invention.

FIG. 39 represents an exemplary procedure according to the present embodiment. The procedure of FIG. 39 is an example of the procedure in an extended feedback mode. First, the base station uses RRC signaling to set the parameter for a feedback in the terminal device at each cell, and designates a periodic feedback at each cell (step S3901). The case where periodic feedback is designated at the three downlinks of Cell#0-DL, Cell#1-DL, Cell#2-DL will be described. For the parameter of a feedback in a terminal device at each cell, the parameters shown in FIGS. 8, 9 and 27 can be employed. The terminal device having a periodic feedback designated at Cell#1-DL reports the RI of Cell#1-DL (step S3902), PI of Cell#1-DL (step S3903), PI2 of Cell#1-DL (step 3904), and W-CQI of Cell#1-DL (step S3905) periodically to the base station device according to the set parameter ($I_{CQI}$, $I_{RI}$, $I_{PI}$ of Cell#1-DL). In the case of an extended feedback mode in which S-CQI is fed back, the terminal device reports S-CQI of Cell#1-DL periodically (step S3906). Similarly, the terminal device having a periodic feedback designated at Cell#0-DL reports periodically to the base station device the RI of Cell#0-DL (step S3907), PI1 of Cell#0-DL (step S3908), PI2 of Cell#0-DL (step S3909) and W-CQI of Cell#0-DL (step S3910) according to the set parameter ($I_{CQI}$, $I_{RI}$, $I_{PI}$, of Cell#0-DL). In the case of an extended feedback mode in which S-CQI is fed back, the terminal device further reports periodically S-CQI of Cell#0-DL (step S3911). Further, the terminal device having the periodic feedback designated at Cell#2-DL reports periodically to the base station device the RI of Cell#2-DL (step S3912), PI1 of Cell#2-DL (step S3913), PI2 of Cell#2-DL (step S3914), and W-CQI of Cell#2-DL (step S3915), according to the set parameter ($I_{CQI}$, $I_{RI}$, $I_{PI}$ of Cell#2-DL). In the case of an extended feedback mode in which S-CQI is fed back, the terminal device further reports periodically S-CQI of Cell#2-DL (step S3916).

$I_{CQI}$, $I_{RI}$, $I_{PI}$ of Cell#0-DL, $I_{CQI}$, $I_{RI}$, $I_{PI}$ of Cell#1-DL, and $I_{CQI}$, $I_{RI}$, $I_{PI}$ of Cell#2-DL may be configured to take different values. Alternatively, an arrangement may be made such that some of the parameters are common between a plurality of cells to have the parameter set common to the relevant cell.

There may be the case where the subframe in which W-CQI or S-CQI is reported and the subframe in which PI1 or PI2 is reported (or the subframe in which RI is reported) coincide with each other among the plurality of cells. In this case, the terminal device sets a priority level for the contents to be fed back, and reports the contents given a higher priority. As an example of setting such priority level, the order of RI>PI1>PI2>W-CQI>S-CQI, the order of RI>W-CQI>PI1>PI2>S-CQI, or the order of RI>PI1>W-CQI>PI2>S-CQI may be cited. Accordingly, even in the case where the subframes for reporting coincide over a plurality of cells, which contents is to be reported can be determined in one-to-one correspondence. Furthermore, since the priority level can be configured according to the level of importance of the contents over a plurality of cells, the contents with a higher level of importance can be reported by priority. Alternatively, a priority level is set to the cell that feeds back such as in the order of Cell#1>Cell#0>Cell#2 for reporting the contents of the cell given higher priority. Accordingly, even in the case where the reporting subframes coincide over a plurality of cells, which contents is to be reported can be determined in one-to-one correspondence. Alternatively, the priority level can be configured taking into account both the cell and contents.

Alternatively, when the base station terminal sets the parameters such as $I_{CQI}$, $I_{RI}$, and $I_{PI}$ for the terminal device, a set of parameters that reduces collision between reporting of component carriers may be configured. For example, when the value of 7-316 is set in the table of FIG. 8 for $I_{CQI}$ of one component carrier, setting the value of 318 to 541 can be prohibited by setting the value of 0 to 316 for the $I_{CQI}$ in another component carrier. In contrast, when the value of 318 to 541 is set for $I_{CQI}$ in one component carrier, setting the value of 2 to 6 can be prohibited by setting the value from 0 to 1, or from 318 to 541 for $I_{CQI}$ in another component carrier. More preferably, setting the value from 2 to 316 is to be prohibited. Thus, by setting the values such that the prime factor of the period is common in a plurality of component carriers, collision between the reports of component carriers can be reduced. Furthermore, by using such limitation, the amount of information required for setting the parameters in a plurality of component carriers can be reduced.

Furthermore, in the RRC signaling at step S3901, the setting may be established such that RI, PI1 or PI2 is not fed back in each of the cells. Such setting may be established individually for RI, PI1 or PI2, or set together by one index.

Furthermore, in the RRC signaling at step S3901, whether the mode is an extended feedback mode or a backward compatible feedback mode can be configured individually for each cell. For example, by setting X (or, $X_1$, $X_2$) described in the first embodiment or $I_{PI}$ described in the second embodiment individually for each cell, whether the mode is an extended feedback mode or a backward compatible feedback mode can be configured individually for each cell. Alternatively, whether the mode is an extended feedback mode or a backward compatible feedback mode can be configured common between the cells. For example, by setting X (or, $X_1$, $X_2$) described in the first embodiment or $I_{PI}$ described in the second embodiment common between the cells, whether the mode is an extended feedback mode or a backward compatible feedback mode can be configured common between the cells. In the cell having an extended feedback mode set, W-PMI may be reported instead of RI1 and RI2.

Although the description is based on the case where the reception quality information of three downlinks (Cell#0-DL, Cell#2-DL, Cell#3-DL) is reported through one uplink (Cell#1-UL), the present invention is not limited thereto. For example, the present embodiment is similarly applicable to the case where the reception quality information of an arbitrary number of downlink component carriers is reported, independent of the number of uplink component carriers used for reporting, such as the case where the reception quality information of four downlinks is reported through two uplinks.

Thus, the base station device sets for the terminal device a backward compatible feedback mode in which a precoding matrix is fed back or an extended feedback mode in which a plurality of partial precoder information are fed back, at a plurality of downlink component carriers. During this setting, the parameter related to the period in the extended feedback mode of each downlink component carrier, or the offset value in the partial precoder information is set at the offset value in the backward compatible feedback mode. Accordingly, at a plurality of downlink component carriers, the switching between an extended feedback mode and a backward compatible feedback mode is facilitated. Furthermore, collision between reports related to different component carriers can be reduced.

Fourth Embodiment

The third embodiment was described based on the case where the reception quality information of a plurality of downlink component carriers is reported. The fourth embodiment of the present invention is directed to the case where the reception quality information related to a plurality of downlink transmission points (for example, a base station device, remote radio transmission device, relay device, compact base station device, and the like) is reported. The fourth embodiment of the present invention will be described hereinafter with reference to the drawings.

Figure 40:
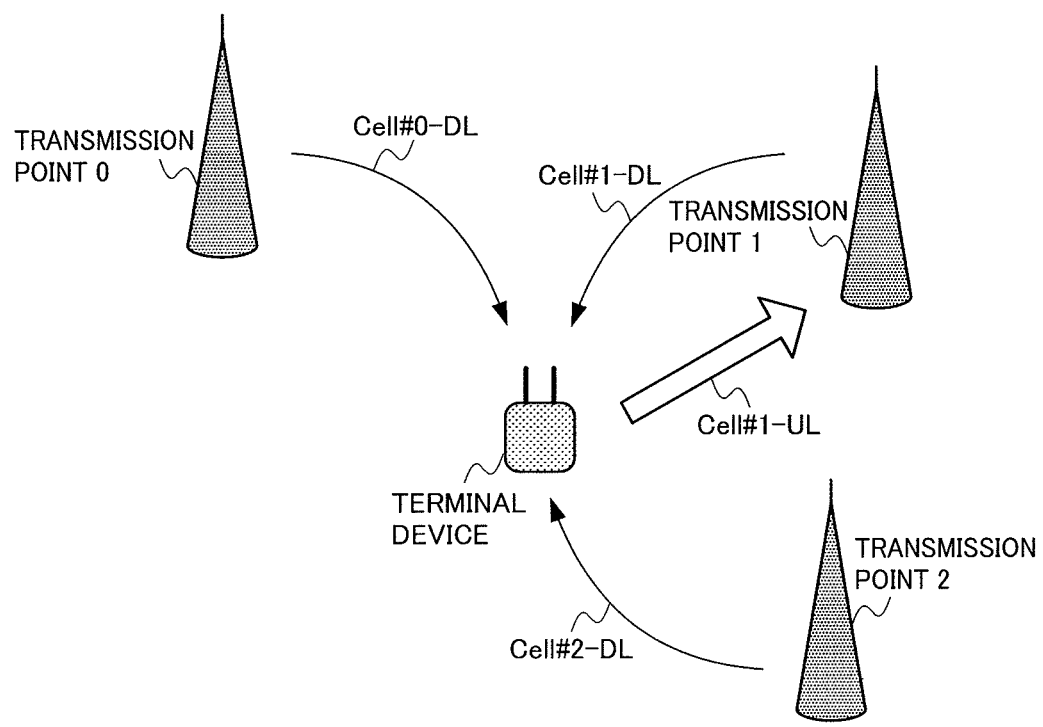
FIG. 40 represents an exemplary transmission point configuration according to a fourth embodiment of the present invention.

FIG. 40 represents an example of a transmission point configuration according to the present embodiment. It is assumed that the terminal device measures the reception quality at the cells (Cell#0, Cell#1, Cell#2) covered at three transmission points differing from each other (transmission point 0, transmission point 1, transmission point 2), Description is provided corresponding to the case where the terminal device, under such state, reports the reception quality information of three downlinks (Cell#0-DL, Cell#1-DL, Cell#2-DL) through one uplink (Cell#1-UL).

For the procedure according to the present embodiment, the procedures similar to those of FIG. 39 can be employed. By substituting the cells of a plurality of component carriers in the third embodiment with the cells at the plurality of transmission points in the present embodiment, an advantage similar to that described in the third embodiment can be obtained. Furthermore, since the parameter setting method of a plurality of component carriers can be applied to the parameter setting of a plurality of transmission points, the extension of the feedback mode to a system supporting a plurality of transmission points is facilitated.

Thus, the base station device sets for the terminal device a backward compatible feedback mode in which a precoding matrix is fed back or an extended feedback mode in which a plurality of partial precoder information are fed back, at a plurality of transmission points. During this setting, the parameter related to the period in the extended feedback mode of each downlink component carrier, or the offset value in the partial precoder information is set at the offset value in the backward compatible feedback mode. Accordingly, at a plurality of transmission points, the switching between an extended feedback mode and a backward compatible feedback mode is facilitated. Furthermore, collision between reports related to different transmission points can be reduced.

Fifth Embodiment

In the fifth embodiment of the present invention, a functional block of the base station device and terminal device according to an aspect of the present invention will be described. The fifth embodiment of the present invention will be described referring to the drawings.

Figure 41:
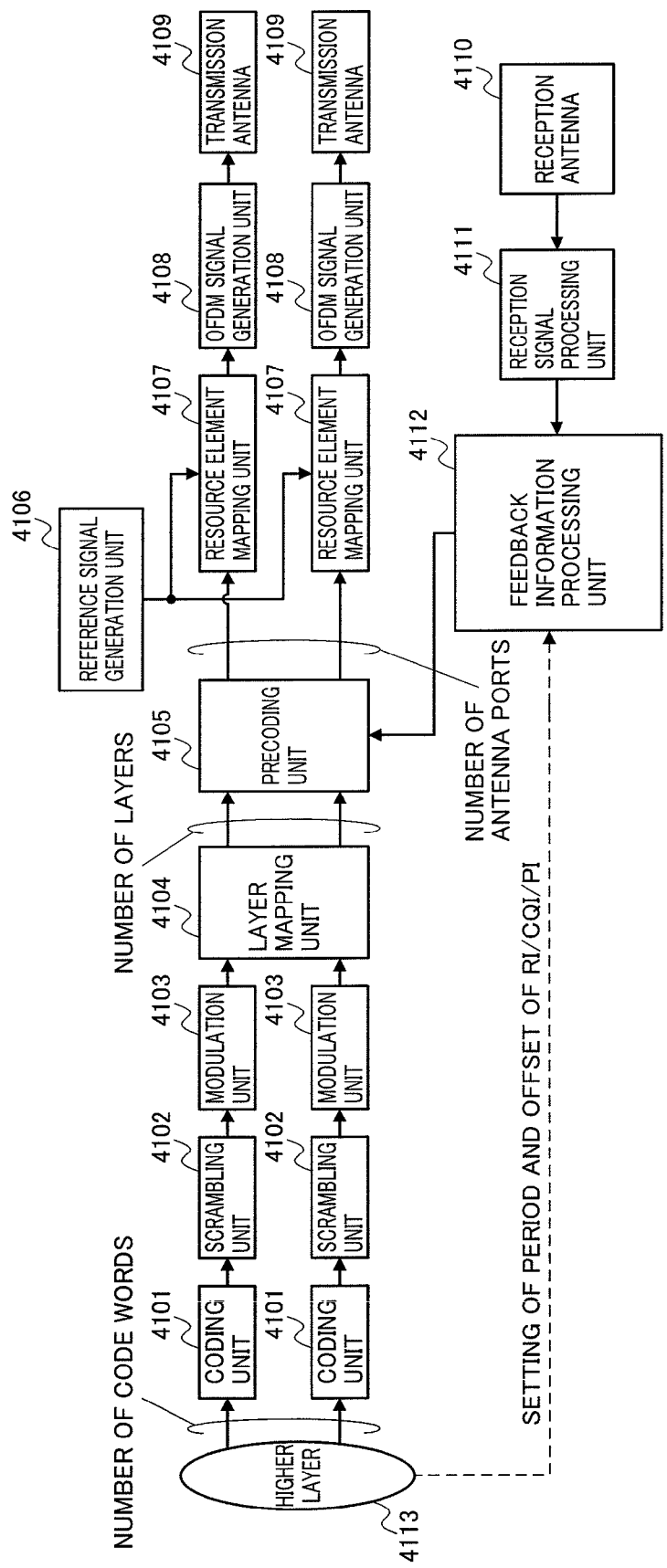
FIG. 41 schematically represents an exemplary configuration of a base station device according to a fifth embodiment of the present invention.

FIG. 41 schematically represents an example of a configuration of a base station device according to the present embodiment. The base station device includes a coding unit 4101, a scrambling unit 4102, a modulation unit 4103, a layer mapping unit 4104, a precoding unit 4105, a reference signal generation unit 4106, a resource element mapping unit 4107, an OFDM signal generation unit 4108, a transmission antenna (base station transmission antenna) 4109, a reception antenna (base station reception antenna) 4110, a reception signal processing unit 4111, a feedback information processing unit 4112, and a higher layer 4113.

Each transmission data (bit sequence) for every codeword (transmission data sequence) transmitted from higher layer 4113 is subjected to error correction coding and rate matching at coding unit 4101, multiplied by a scrambling code at scrambling unit 4102, and subjected to modulation processing such as PSK (Phase Shift Keying) modulation or QAM (Quadrature Amplitude Modulation) at modulation unit 4103. At this stage, the transmission data sequence transmitted from higher layer 4113 includes control data for RRC signaling. Layer mapping unit 4104 distributes the modulation symbol sequence output from modulation unit 4103 for each layer. Precoding unit 4105 applies precoding on the modulation symbol sequence for every layer. Specifically, precoding unit 4105 multiplies a precoding matrix by the modulation symbol sequence for every layer.

Reference signal generation unit 4106 generates a downlink RS. Resource element mapping unit 4107 maps the modulation symbol sequence precoded at precoding unit 4105 and the RS generated at reference signal generation unit 4106 at a predetermined resource element.

OFDM signal generation unit 4108 converts the resource block group output from resource element mapping unit 4107 into an OFDM signal. The OFDM signal is transmitted from transmission antenna 4109 as a downlink transmission signal.

An uplink reception signal received at reception antenna 4110 is subjected to predetermined signal processing at reception signal processing unit 4111, and then the feedback information is transmitted to feedback information processing unit 4112. Feedback information processing unit 4112 uses the partial precoder information reported from a terminal device to determine a precoding matrix to be used at precoding unit 4105.

As described in each of the embodiments set forth above, the timing for reporting each of the contents may be configured individually for each terminal device. Therefore, by higher layer 4113, the period and offset of RI, CQI and PI at feedback information processing unit 4112 are set. Feedback information processing unit 4112 identifies what contents and in which terminal device the signal transmitted from reception signal processing unit 4111 at an arbitrary timing includes, allowing a preferred precoder to be reproduced for each terminal device.

Figure 42:
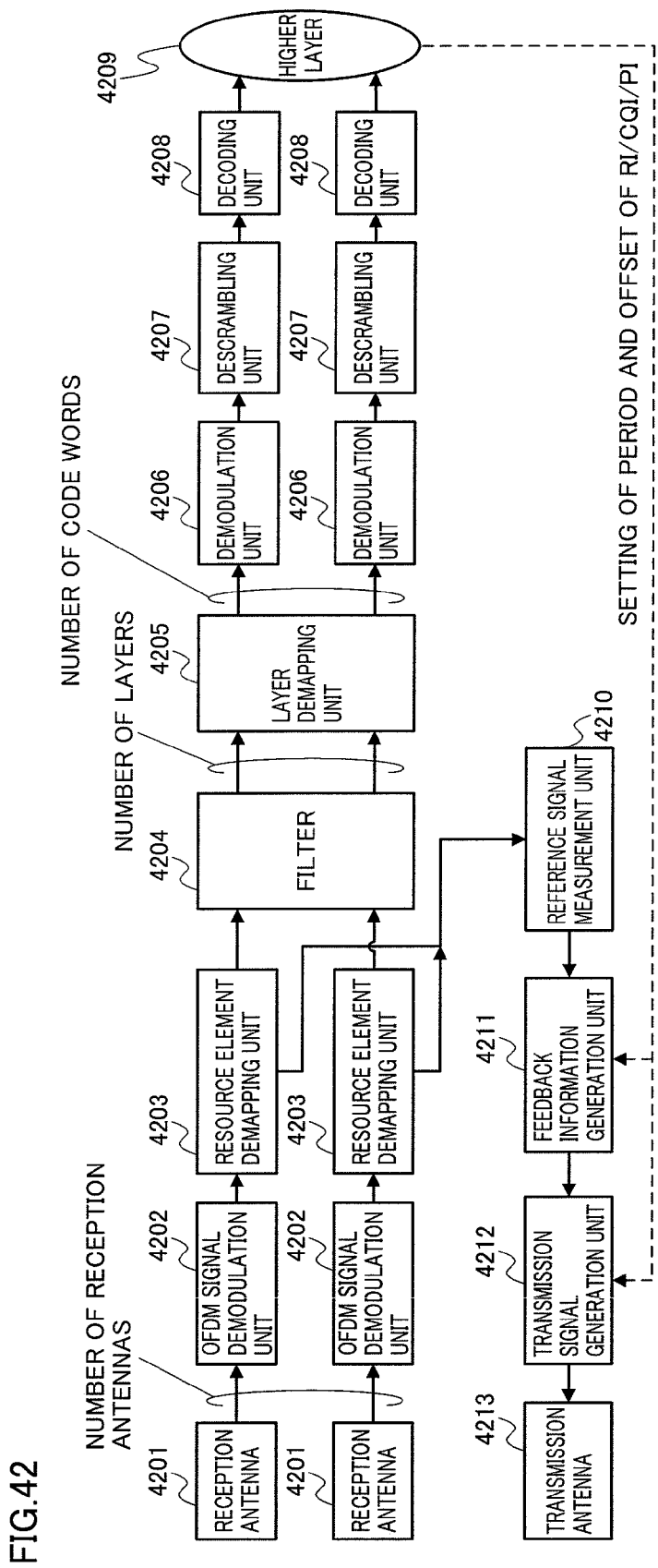
FIG. 42 schematically represents an exemplary configuration of a terminal device according to the fifth embodiment of the present invention.
Figure 43:
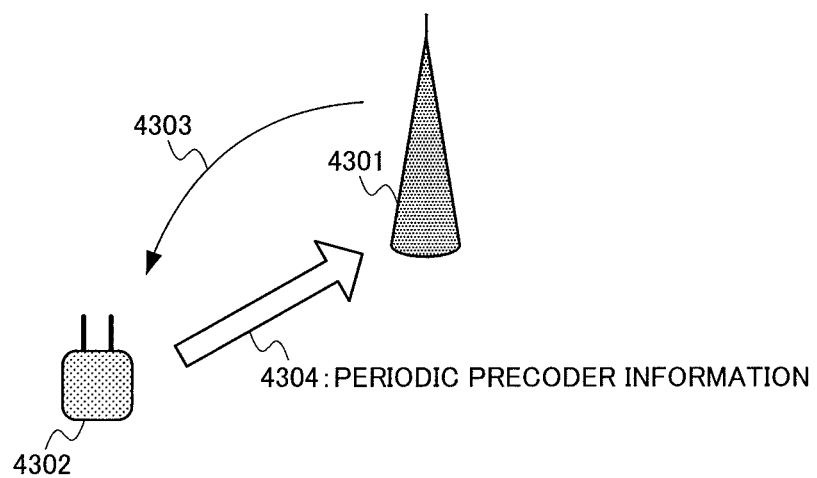
FIG. 43 is a schematic view of a configuration of a communication system.

FIG. 42 schematically represents an exemplary configuration of a terminal device (reception device) according to the present embodiment. The terminal device includes a reception antenna (terminal reception antenna) 4201, an OFDM signal demodulation unit 4202, a resource element demapping unit 4203, a filter 4204, a layer demapping unit 4205, a demodulation unit 4206, a descrambling unit 4207, a decoding unit 4208, a higher layer 4209, a reference signal measurement unit 4210, a feedback information generation unit 4211, a transmission signal generation unit 4212, and a transmission antenna (terminal transmission antenna) 4213.

The downlink reception signal received at reception antenna 4201 is subjected to OFDM demodulation processing at OFDM signal demodulation unit 4202, and a resource block group is output. Resource element demapping unit 4203 outputs RS to reference signal measurement unit 4210, and outputs a reception signal of a resource element other than the resource element mapped with RS to filter 4204. Filter 4204 applies filtering to the reception signal output from resource element demapping unit 4203. The filtered signal is in a state already subjected to deprecoding processing corresponding to the precoding at precoding unit 4105, and a signal for every layer is output from filter 4204. Layer demapping unit 4205 executes coupling processing corresponding to layer mapping unit 4104 to convert the signal for every layer into a signal for every code word. Demodulation unit 4206 executes demodulation processing corresponding to the modulation processing at modulation unit 4103 on the signal converted for every codeword. Descrambling unit 4207 multiplies the signal subjected to demodulation by a conjugate code of the scrambling code used at scrambling unit 4102 (divided by a scrambling code). Decoding unit 4208 executes rate demapping and error correction coding on the output from descrambling unit 4207. The reception data for every codeword, obtained by decoding unit 4208, is transmitted to higher layer 4209. The reception data transmitted to higher layer 4209 includes control data for RRC signaling. Higher layer 4209 obtains an instruction from the base station device by RRC signaling.

As used herein, the filtering processing of filter 4204 may be carried out on a reception signal for every reception antenna 4201 using methods such as ZF (Zero Forcing), MMSE (Minimum Mean Square Error), and MLD (Maximum Likelihood Detection) to detect a signal for every layer in FIG. 41.

At reference signal measurement unit 4210, the RS obtained at resource element demapping unit 4203 is measured. The measured result is output to feedback information generation unit 4211. Feedback information generation unit 4211 uses the measurement result of RS output from reference signal measurement unit 4210 to generate feedback information such as partial precoder information (PI), RI, CQI, and the like according to the feedback mode.

The feedback information generated at feedback information generation unit 4211 is converted into a transmission signal at transmission signal generation unit 4212, and transmitted via transmission antenna 4123 as an uplink transmission signal.

As described in each of the embodiments set forth above, the timing of reporting each contents for every terminal device can be configured individually. Therefore, by higher layer 4209, the period and the offset of RI, CQI and PI at feedback information generation unit 4211 and transmission signal generation unit 4212 are set. Feedback information processing unit 4112 identifies at what timing and what signal including an arbitrary content is to be generated. Further, transmission signal generation unit 4212 identifies at what timing and what signal including an arbitrary content is to be transmitted.

Although each embodiment has been described based on the case where a preferred precoder is reported to the base station, the precoding processing at a base station may be carried out efficiently by using a similar processing even for reporting a precoder not preferred. For example, taking into consideration the propagation path, the method of selecting a precoder from the code book such that the reception signal power is lowered can be used.

The processing of each element may be carried out by storing a program for realizing all of or a part of the function of the base station device of FIG. 41 and/or all of or a part of the function of the terminal device of FIG. 42 into a computer readable storage medium, and causing a computer system to read out and execute the program stored in the storage medium. The "computer system" referred to includes an OS and hardware of a peripheral or the like.

Further, "computer system" also includes a home page presenting environment (or display environment), when utilizing a WWW system.

Furthermore, "computer readable storage medium" refers a storage device such as a portable medium including a flexible disk, magneto optical disk, ROM, CD-ROM, and also a hard disk or the like incorporated in a computer system. Furthermore, "computer readable storage medium" is a medium that retains a program dynamically for a short period of time like a communication wire when a program is to be transmitted via a network such as the Internet or a communication line such as the telephone line, and a medium that retains a program for a predetermined time such as a volatile memory in a computer system functioning as a server or client in such a case. Moreover, the aforementioned program may be directed to realizing the aforementioned function partially, or the aforementioned function may be realized by combining with a program already stored in the computer system.

Furthermore, all of or a part of the function of the base station device of FIG. 41 and/or all of or a part of the function of the terminal device of FIG. 42 may be integrated in an integrated circuit to be realized. Each functional block of the base station device and/or terminal device may be provided individually as a chip, or some of or all of the functional block may be united in a chip. The scheme of achieving an integrated circuit is not limited to LSI (Large Scale Integration), and may be realized by a dedicated circuit or general purpose processor. Furthermore, when development in the semiconductor art sees the approach of achieving an integrated circuit replacing an LSI, an integrated circuit based on such approach may be employed.

Although the embodiments of the present invention have been described in detail with reference to the drawings, it is to be understood that the specific configuration is not limited by the embodiments disclosed, and is intended to include any design or the like within the scope and meaning equivalent to the terms of the claims in the present invention.

REFERENCE SIGNS LIST

101, 4301 base station; 102, 4302 terminal device; 103, 4303 downlink transmission signal; 104, 4304 uplink channel; 4101 coding unit; 4102 scrambling unit; 4103 modulation unit; 4104 layer mapping unit; 4105 precoding unit; 4106 reference signal generation unit; 4107 resource element mapping unit; 4108 OFDM signal generation unit; 4109, 4213 transmission antenna; 4110, 4201 reception antenna; 4111 reception signal processing unit; 4112 feedback information processing unit; 4113, 4209 higher layer; 4202 OFDM signal demodulation unit; 4203 resource element demapping unit; 4204 filter; 4205 layer demapping unit; 4206 demodulation unit; 4207 descrambling unit; 4208 decoding unit; 4210 reference signal measurement unit; 4211 feedback information generation unit; 4212 transmission signal generation unit.

The invention claimed is:

1. A terminal device communicating with a base station device, said terminal device comprising:
    a switching part for switching between a first feedback mode in which one precoder information specifying a preferred precoder and a reception quality indicator specifying a preferred transmission rate are reported periodically to said base station device, and a second feedback mode in which first partial precoder information among first and second partial precoder information specifying said preferred precoder and a set of said second partial precoder information and said reception quality indicator are reported periodically to said base station device; and
    a report part using, in said second feedback mode, a periodic resource for reporting said precoder information and said reception quality indicator in said first feedback mode, for reporting one of said first partial precoder information and the set of said second partial precoder information and said reception quality indicator alternately and the reporting one of said first partial precoder information has a period length that is twice the period length of the reporting said precoder information and said reception quality indicator in said first feedback mode and the reporting the set of said second partial precoder information and said reception quality indicator has a period length that is twice the period length of the reporting said precoder information and said reception quality indicator in said first feedback mode.

2. The terminal device according to claim 1, wherein said reception quality indicator is for a downlink component carrier bandwidth.

3. The terminal device according to claim 1, wherein said first partial precoder information and said second partial precoder information are for a downlink component carrier bandwidth.

4. The terminal device according to claim 1, further comprising an obtaining part for obtaining control data indicating a period and an offset in timing of said periodic resource used in reporting said reception quality indicator.

5. A base station device communicating with a terminal device,
    said base station device comprising:
    a setting part for setting a parameter indicating one of a first feedback mode and a second feedback mode at said terminal device, wherein said terminal device reports periodically one precoder information specifying a preferred precoder and a reception quality indicator specifying a preferred transmission rate in said first feedback mode, and said terminal device reports periodically first partial precoder information among first and second partial precoder information specifying said preferred precoder and a set of said second partial precoder information and said reception quality indicator in said second feedback mode; and
    a reception part for receiving one of said first partial precoder information and the set of said second partial precoder information and said reception quality indicator alternately and the reporting one of said first partial precoder information has a period length that is twice the period length of the reporting said precoder information and said reception quality indicator in said first feedback mode and the reporting the set of said second partial precoder information and said reception quality indicator has a period length that is twice the period length of the reporting said precoder information and said reception quality indicator in said first feedback mode via a periodic resource for reporting said precoder information and said reception quality indicator in said first feedback mode.

6. The base station device according to claim 5, wherein said reception quality indicator is for a downlink component carrier bandwidth.

7. The base station device according to claim 5, wherein said first partial precoder information and said second partial precoder information are for a downlink component carrier bandwidth.

8. The base station device according to claim 5, wherein said setting part is adapted to set a period and an offset in timing of said periodic resource used for reporting said reception quality indicator.

9. A communication system in which a base station device and a terminal device communicate with each other, said base station device including:
a setting part for setting a parameter indicating one of a first feedback mode and a second feedback mode at the terminal device, wherein said terminal device reports periodically one precoder information specifying a preferred precoder and a reception quality indicator specifying a preferred transmission rate in said first feedback mode, and said terminal device reports periodically first partial precoder information among first and second partial precoder information specifying said preferred precoder and a set of said second partial precoder information and said reception quality indicator in said second feedback mode; and
a reception part for receiving, in said second feedback mode, one of the first partial precoder information and the set of said second partial precoder information and said reception quality indicator alternately via a periodic resource for reporting said precoder information and said reception quality indicator in said first feedback mode and the reporting one of said first partial precoder information has a period length that is twice the period length of the reporting said precoder information and said reception quality indicator in said first feedback mode and the reporting the set of said second partial precoder information and said reception quality indicator has a period length that is twice the period length of the reporting said precoder information and said reception quality indicator in said first feedback mode;
said terminal device including:
a switching part for switching between said first feedback mode and said second feedback mode; and
a report part using said periodic resource, in said second feedback mode, for reporting one of said first partial precoder information and the set of said second partial precoder information and said reception quality indicator alternately and, the reporting one of said first partial precoder information has a period length that is twice the period length of the reporting said precoder information and said reception quality indicator in said first feedback mode and the reporting the set of said second partial precoder information and said reception quality indicator has a period length that is twice the period length of the reporting said precoder information and said reception quality indicator in said first feedback mode.

10. A communication method at a terminal device communicating with a base station device, the communication method comprising:
switching between a first feedback mode in which one precoder information specifying a preferred precoder and a reception quality indicator specifying a preferred transmission rate are reported periodically to said base station device and a second feedback mode in which first partial precoder information among first and second partial precoder information specifying said preferred precoder and a set of said second partial precoder information and said reception quality indicator are reported periodically to said base station device; and
reporting, in said second feedback mode, using a periodic resource for reporting said precoder information and said reception quality indicator in said first feedback mode, one of said first partial precoder information and the set of said second partial precoder information and said reception quality indicator alternately and, the reporting one of said first partial precoder information has a period length that is twice the period length of the reporting said precoder information and said reception quality indicator in said first feedback mode and the reporting the set of said second partial precoder information and said reception quality indicator has a period length that is twice the period length of the reporting said precoder information and said reception quality indicator in said first feedback mode.

11. A communication method at a base station device communicating with a terminal device, the communication method comprising:
setting a parameter indicating one of a first feedback mode and a second feedback mode at said terminal device, wherein said terminal device reports periodically one precoder information specifying a preferred precoder and a reception quality indicator specifying a preferred transmission rate in said first feedback mode, and said terminal device reports periodically first partial precoder information among first and second partial precoder information specifying said preferred precoder and a set of said second partial precoder information and said reception quality indicator in said second feedback mode; and
receiving, in said second feedback mode, one of said first partial precoder information and the set of said second partial precoder information and said reception quality indicator alternately via a periodic resource for reporting said precoder information and said reception quality indicator in said first feedback mode, the reporting one of said first partial precoder information has a period length that is twice the period length of the reporting said precoder information and said reception quality indicator in said first feedback mode and the reporting the set of said second partial precoder information and said reception quality indicator has a period length that is twice the period length of the reporting said precoder information and said reception quality indicator in said first feedback mode.

* * * * *